United States Patent
Goodson et al.

(10) Patent No.: US 10,778,119 B2
(45) Date of Patent: Sep. 15, 2020

(54) ELECTRIC MACHINE WITH ELECTRODES HAVING MODIFIED SHAPES

(71) Applicant: TransVolt International Energy Corporation, Kirkland, WA (US)

(72) Inventors: David B. Goodson, Kirkland, WA (US); Tracy A. Prevo, Kirkland, WA (US)

(73) Assignee: TransVolt International Energy Corporation, Kirkland, WA (US)

( * ) Notice: Subject to any disclaimer, the term of this patent is extended or adjusted under 35 U.S.C. 154(b) by 190 days.

(21) Appl. No.: 16/125,596

(22) Filed: Sep. 7, 2018

(65) Prior Publication Data

US 2019/0081577 A1  Mar. 14, 2019

Related U.S. Application Data

(60) Provisional application No. 62/556,931, filed on Sep. 11, 2017.

(51) Int. Cl.
| | |
|---|---|
| *H02N 1/00* | (2006.01) |
| *H02N 1/08* | (2006.01) |
| *H02K 7/02* | (2006.01) |

(52) U.S. Cl.
CPC ............. *H02N 1/006* (2013.01); *H02K 7/025* (2013.01); *H02N 1/004* (2013.01); *H02N 1/08* (2013.01)

(58) Field of Classification Search
CPC ............. H02K 7/02; H02N 1/08; H02N 1/004
USPC .................... 310/309, 310, 323.06; 361/293
See application file for complete search history.

(56) References Cited

U.S. PATENT DOCUMENTS

| | | | | |
|---|---|---|---|---|
| 2,318,935 | A * | 5/1943 | Fisher | H02N 1/08 361/289 |
| 3,175,134 | A * | 3/1965 | Matsui | 361/293 |
| 3,202,890 | A * | 8/1965 | Matsui | 361/293 |
| 3,225,275 | A * | 12/1965 | Uchida | 361/293 |
| 8,441,167 | B2 * | 5/2013 | Verkoglyad | H02N 1/08 310/309 |
| 2010/0085843 | A1 | 4/2010 | Bisig | |
| 2010/0164322 | A1 | 7/2010 | Sashida | |

(Continued)

OTHER PUBLICATIONS

International Search Report and Written Opinion, dated Mar. 20, 2019, for International Application No. PCT/US2018/050045, 9 pages.

*Primary Examiner* — Jose A Gonzalez Quinones
(74) *Attorney, Agent, or Firm* — Seed Intellectual Property Law Group LLP

(57) ABSTRACT

Systems and methods for modified dimensions, configurations, and structure for rotor electrodes and stator electrodes to improve power transfer between such electrodes. Swept-forward, swept-backward, and Yin-Yang shaped electrodes can be used to shift the power response of the motor forwards or backwards in the rotation of the rotor electrode. Modifying the leading edge of the rotor electrode and/or the pitches of the rotor and/or stator electrodes relative to one another may be used to further change various characteristics of the motor, including the power transfer efficiency, the relative locations of the peak overlap between electrodes, and locations of maximum and minimum mechanical strain on the rotors. A curved power feed structure associated with the rotor electrode may be used to distribute the electric charges over a larger area and protect against arcing from the rotor electrode.

20 Claims, 34 Drawing Sheets

(56) References Cited

U.S. PATENT DOCUMENTS

2011/0031844 A1    2/2011   Post
2013/0300252 A1   11/2013   Johnson
2017/0054386 A1    2/2017   Post

* cited by examiner

ELECTRIC MACHINE WITH ELECTRODES HAVING MODIFIED SHAPES

TECHNICAL FIELD

This description generally relates to electric machines, for instance, electric machines that have electrodes, carried by rotor and/or stator discs, with modified shapes.

BACKGROUND

Description of the Related Art

Electrostatic machines are conventionally comprised of at least one rotor and one corresponding stator, in which the rotor and stator are separated from each other by a distance. In some implementations, an electrostatic machine may include multiple stators with an interleaving rotor located between each pair of stators. Each rotor and adjacent stator may have corresponding opposing surfaces with each opposing surface including one or more conductive sections (e.g., metallic sections) included on or incorporated into the surface. The conductive sections on each of the faces may carry electric charges, and the interaction of these electric charges may be used to rotate a central shaft that extends through the rotors and stators. In some implementations, brushes may contact the rotor blade shaft to electrically couple the conductive sections on the rotors. In some implementations, the electrostatic machine 100 may be used to generate power, such as, for example, by mechanical rotation of the central shaft, which results in a current being induced via the electrodes in the rotors and stators. In some implementations, the electrostatic machine may be used as a motor in which varying charges applied to the electrodes in the rotors and/or stators result in the rotors rotating, thereby causing a rotational force to be applied to the central shaft.

FIG. 1 shows a conventional electrostatic machine 100 having a rotor disc 101 with two electrodes 102a and 102b (collectively, "electrode 102") that rotate around a central shaft 104 relative to a stator (not shown). Such a machine 100 may include, for example, a Trump, Type 10, motor. In some implementations, the rotor disc 101 may rotate relative to the stator in a vacuum environment. Each of the electrodes 102 includes an outer curved edge 106a, 106b that is located a first distance from the central shaft 104, and an inner curved edge 108a, 108b that is located radially inward from the outer curved edge 106a, 106b, respectively, at a second distance from the central shaft 104. Each of the electrodes 102 may have a leading edge 110a, 110b (collectively, "leading edges 110") and a trailing edge 112a, 112b (collectively, "trailing edges 112"), relative to the direction of rotation 114 of the rotor 101. Each of the leading edges 110 and the trailing edges 112 may be located substantially along or proximate to one or more radii that extend outward from the central shaft 104.

BRIEF SUMMARY

Conventional electrostatic motors face limitations regarding the mechanical output and the timing for the transfer of power between the electrodes on the rotor and the electrodes on the stator. Accordingly, contoured electrode surfaces may be used to optimize a balance between the electrostatic forces that arise between the electrodes on the rotor and the stator to better meet the power transfer and timing needs of various applications. Such contoured electrode surfaces may also result in an increase or decrease in the amount of electrostatic charge and force between the various electrodes on the rotor and stator.

An electric machine may be summarized as including: a first set of stator electrodes arrayed about an axis, each of the stator electrodes of the first set of stator electrodes having a respective profile when viewed along the axis, the respective profile of the stator electrodes of the first set of stator electrodes including an outer curved edge and an inner curved edge, the inner curved edge spaced radially inward of the outer curved edge with respect to the axis, the inner curved edge of the stator electrodes of the first set of stator electrodes having a respective length and a respective radius of curvature; and a first set of rotor electrodes arrayed about the axis and rotatable about the axis with respect to the stator electrodes of the first set of stator electrodes, each of the rotor electrodes of the first set of rotor electrodes having a respective profile when viewed along the axis, the respective profile of the rotor electrodes of the first set of rotor electrodes including an outer curved edge and an inner curved edge, the inner curved edge spaced radially inward of the outer curved edge with respect to the axis, and the inner curved edge of the rotor electrodes of the first set of rotor electrodes having a respective length and a respective radius of curvature, the respective radius of curvature of the inner curved edge of the rotor electrodes of the first set of rotor electrodes which continually varies with respect to the axis along at least a non-zero portion of the length of the inner curved edge thereof.

The at least a non-zero portion of the length of the respective inner curved edge of the rotor electrodes of the first set of rotor electrodes may be a portion of an involute with respect to the axis. The respective radius of curvature of the inner curved edge of the stator electrodes of the first set of stator electrodes may vary with respect to the axis along a non-zero portion of the length of the inner curved edge thereof. The at least a non-zero portion of the respective inner curved edge of the stator electrodes of the first set of stator electrodes may be a portion of a volute with respect to the axis. The outer curved edge of the rotor electrodes of the first set of rotor electrodes may include a respective length and a respective radius of curvature, the respective radius of curvature of the outer curved edge of the rotor electrodes of the first set of rotor electrodes may be constant with respect to the axis along the length of the outer curved edge thereof. In profile, the outer curved edge of the rotor and the inner curve edge of the rotor may meet at a point. The rotor electrodes of the first set of rotor electrodes may rotate about the axis in a first rotational direction, and the point at which the outer curved edge and the inner curve edge of the rotor electrodes of the first set of rotor electrodes meet may be at a trailing portion of the rotor electrode with respect to the first rotational direction. As such, the phase of the power band phase angle may shift, which may allow for optimized power transfer and storage. Such phase shifts may alter the effective dielectric strength of the material located in the gap (including a vacuum) between electrode pairs through a real dependence on the frequency (e.g., $\varepsilon_r(\omega)$) and an imaginary dependence upon the frequency dependent ionic conductivity (e.g., $\sigma(\omega)$). In some implementations, the output voltage may be stabilized, and/or the material strain on the rotor reduced. In profile, the inner edge of each of the rotor electrodes of the first set of rotor electrodes may include a singularity or point of inflection along a length thereof, may include a constant radius of curvature to a first side of the singularity or point of inflection and a constantly varying radius of curvature to a second side of the singularity or point of inflection. In profile, each of the rotor electrodes of the first set of rotor electrodes may include a leading edge, the leading edge which may extend between the outer curved edge of the rotor and the inner curve edge of the rotor electrode at a leading portion of the rotor with respect to the first rotational direction. The leading edge of each of the rotor electrodes of the first set of rotor electrodes may be a curved edge as viewed in profile. There may be no point of inflection or singularity between the leading edge and the outer edge of each of the rotor electrodes of the first set of rotor electrodes is a curved edge as viewed in profile. The outer curved edge of the stator electrodes of the first set of stator electrodes may have a respective length and a respective radius of curvature, the respective radius of curvature of the outer curved edge of the stator electrodes of the first set of stator electrodes may be constant with respect to the axis along the length of the outer curved edge thereof. The outer curved edge of the stator electrodes of the first set of stator electrodes may have a respective length and a respective radius of curvature, the respective radius of curvature of the outer curved edge of the stator electrodes of the first set of stator electrodes may be constant with respect to the axis along the length of the outer curved edge thereof. In profile, the outer curved edge of the stator and the inner curve edge of the stator of the first set of stator electrodes may meet at a point. In profile, the inner edge of each of the stator electrodes of the first set of stator electrodes may include a singularity or point of inflection along a length thereof, may have a constant radius of curvature to a first side of the singularity or point of inflection and a constantly varying radius of curvature to a second side of the singularity or point of inflection. In profile, each of the stator electrodes of the first set of stator electrodes may include a connecting edge, the connecting which may extend between the outer curved edge of the stator electrode and the inner curve edge of the stator electrode. The connecting edge of each of the stator electrodes of the first set of stator electrodes may be a curved edge as viewed in profile. The respective profile of each of the stator electrodes of the first set of stator electrodes may match the respective profile of each of the rotor electrodes of the first set of rotor electrodes. The electric machine may further include: a first rotor disc, the rotor electrodes of the first set of rotor electrodes carried by the first rotor disc. The first rotor disc may include a first major face and a second major face, the second major face opposed across a thickness of the respective rotor disc from the first major face thereof. The electric machine may further include: a first stator disc, the stator electrodes of the first set of stator electrodes carried by the first stator disc. The first stator disc may include a first major face and a second major face, the second major face opposed across a thickness of the first stator disc from the first major face thereof, and at least one of the first or the second major faces of the first stator disc parallel with at least one of the first or the second major faces of the first rotor disc. The rotor electrodes of the first set of rotor electrodes may be arrayed about the axis in a single plane. The stator electrodes of the first set of stator electrodes may be arrayed about the axis in a single plane that is parallel to, and laterally spaced from the single plane in which the rotor electrodes of the first set of rotor electrodes reside.

In some implementations, the electrostatic motor may use charge relaxation, which may be due to, for example, the use of one or more of dielectrics, semiconductors, polarization, and/or triple-layer conductors, to distribute charges on the rotor surface that lag behind an applied electric field, such that the characteristics of the electrostatic motor can be modified to reduce torque fluctuations. In some implementations, the rotor electrodes may be skewed to increase the relative power output of the electrostatic motor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with scan engines, imagers, decoding circuitry, and/or machine-readable symbol readers have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
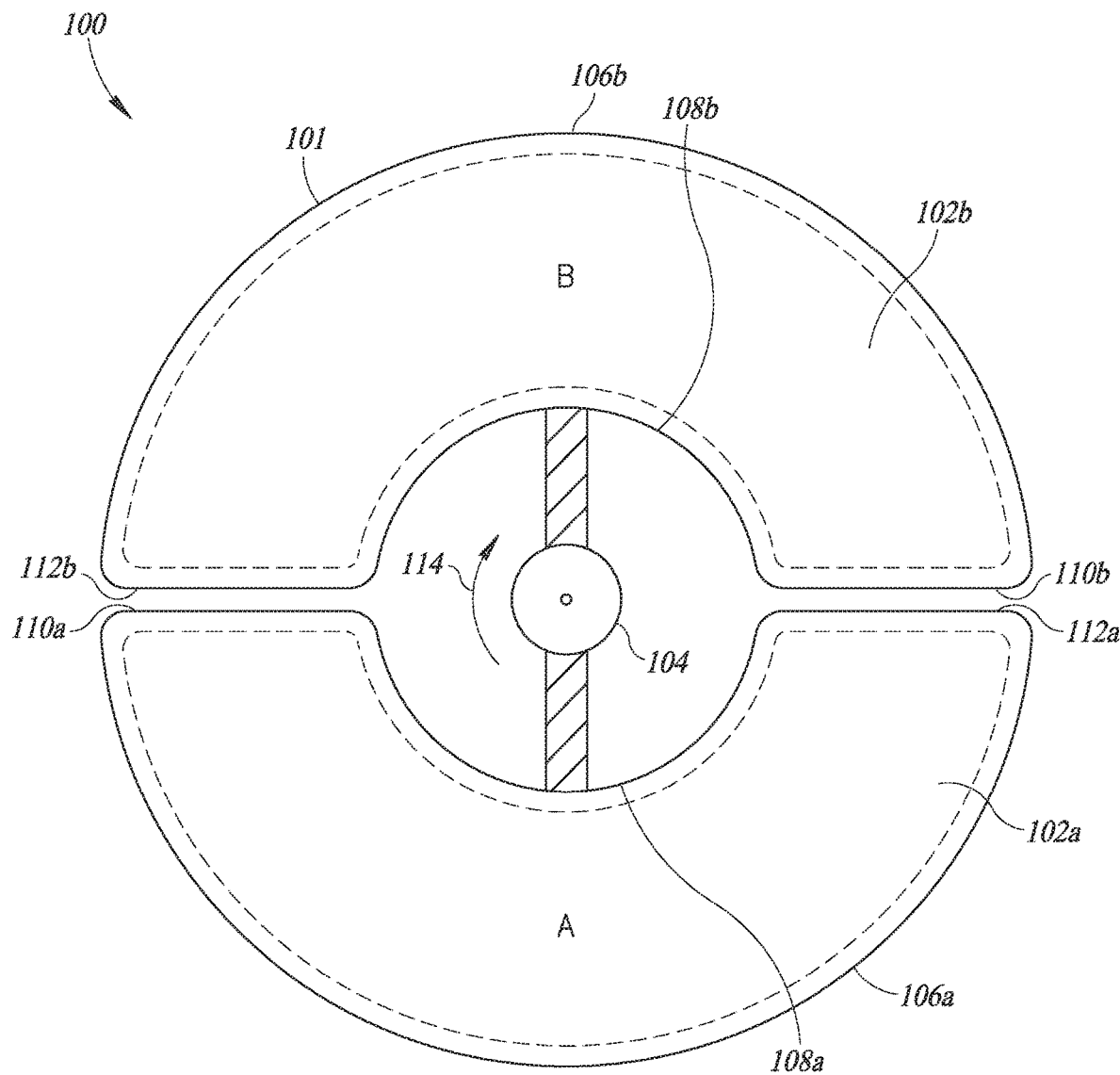
FIG. 1 is a plan view of a profile of a conventional rotor having two electrodes with each electrode having side edges that extend radially from an axis of rotation for the electrode.
Figure 2A:
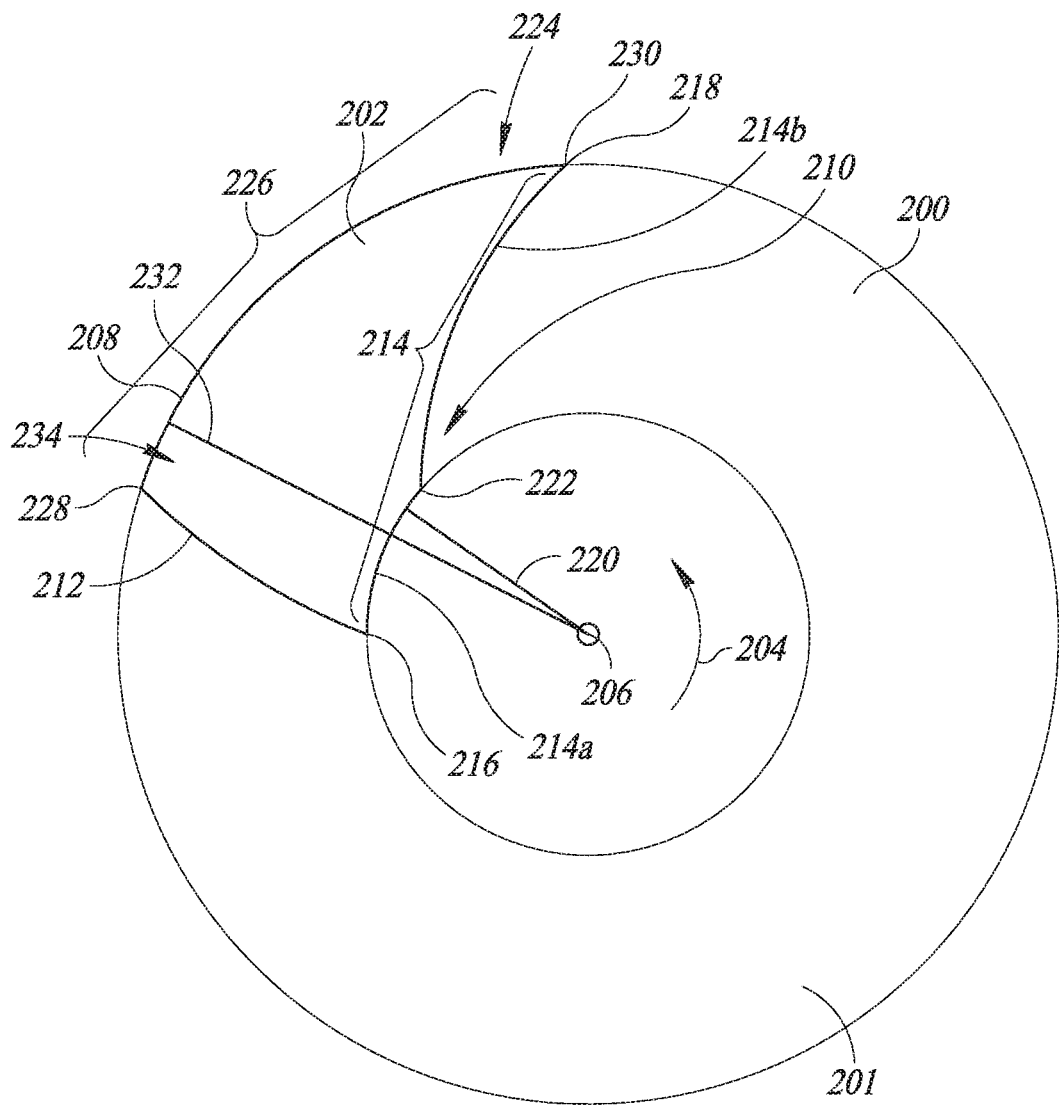
FIG. 2A is a plan view of a profile of a rotor having a rotor electrode with at least one edge that is swept backwards in relation to a direction of rotation of the rotor, according to at least one illustrated implementation.

FIG. 2A shows a profile of a rotor 200 that includes a rotor disc 201 and one or more rotor electrode 202, and rotates in a counter-clockwise direction 204 around a central axis 206.

Figure 2B:
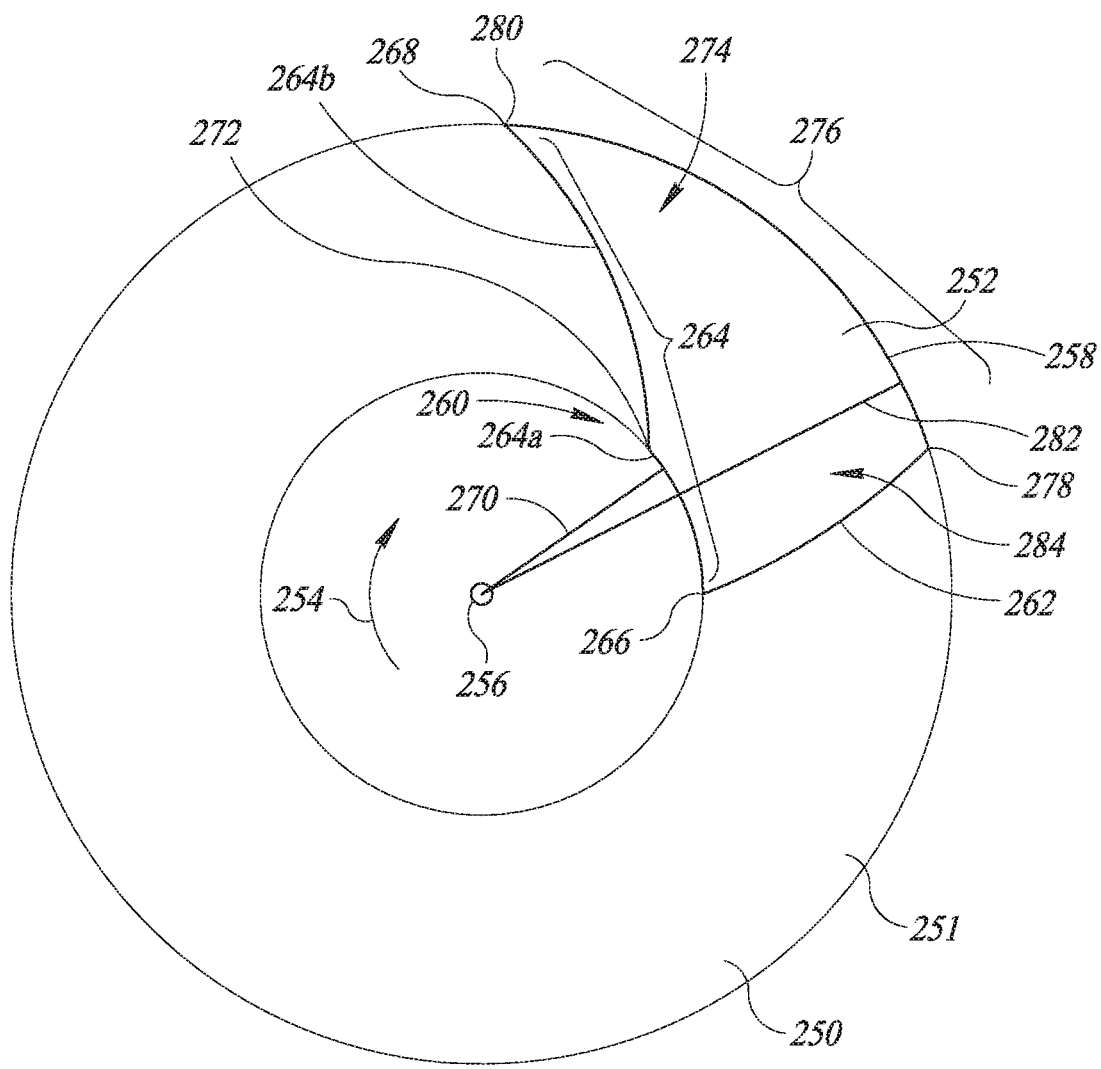
FIG. 2B is a plan view of a profile of a stator having a stator electrode with at least one edge that is swept forwards in relation to the direction of rotation of a corresponding rotor, according to at least one illustrated implementation.

Although only one rotor electrode 202 is shown in FIG. 2A, the rotor 200 may include multiple electrodes along the same surface that contains the rotor electrode 202. In some implementations, one or more of the rotor electrodes 202 may be formed by conductive and/or semi-conductive material deposited onto the surface of the rotor disc 201. In some implementations, one or more of the rotor electrodes 202 may be formed by conductive and/or semi-conductive material that has been incorporated into the surface of the rotor disc 201. The rotor disc 201 may rotate about the central axis 206 in the rotational direction 204 with respect to one or more stators (FIG. 2B).

The rotor electrode 202 may include an outer curved edge 208, an inner curved edge 210, and a leading edge 212. The inner curved edge 210 may have a length 214 that extends from a first end 216 that joins the leading edge 212 to a second end 218 that joins the outer curved edge 208. The inner curved edge 210 may be spaced radially inward of the outer curved edge 208 with respect to the central axis 206. In some implementations, the inner curved edge 210 may have a radius of curvature 220 corresponding to a distance of the inner curved edge 210 from the central axis 206 along the length 214 of the inner curved edge 210. In some implementations, the length 214 of the inner curved edge 210 may include two separate portions, a constant portion 214a having a constant radius of curvature 220 and a variable portion 214b having a variable radius of curvature 220, where the constant portion 214a and the variable portion 214b meet at a singularity or point of inflection 222. In such an implementation, each point along the constant portion 214a of the length 214 may be located the same distance from the central axis 206, thereby forming an arc relative to the central axis 206. Each point along the variable portion 214b of the length 214, by contrast, may be located at a variable distance from the central axis 206 where the radius of curvature 220 changes when progressing along the variable portion 214b away from the point of inflection 222.

The relative positions of the constant portion 214a and the variable portion 214b of the inner curved edge 210. For example, in some implementations, the constant portion 214a may be located proximate the leading edge 212 of the rotor electrode 202 in a relatively leading portion 234 of the rotor electrode 202 with respect to the rotational direction 204. The variable portion 214b may be located relatively further away from the leading edge 212 and may form a swept-backward configuration in which the variable portion 214b moves radially away from the central axis 206 when progressing along the variable portion 214b from the point of inflection 222 towards the second end 218. In such an implementation, the inner curved edge 210 and the outer curved edge 208 may meet at a point located at the second end 218 of the length 214 along a trailing portion 224 of the rotor electrode 202 with respect to the rotational direction 204. Although FIG. 2A shows the length 214 of the inner curved edge 210 comprised of the constant portion 214a and the variable portion 214b, in some implementations, the entire length 214 of the inner curved edge 210 may have a variable radius of curvature 220.

The outer curved edge 208 of the rotor electrode 202 may have a length 226 that extends from a first end 228 that joins the leading edge 212 to a second end 230 that joins the inner curved edge 210. The outer curved edge 208 may have a radius of curvature 232 that defines a distance from the central axis 206 to each of the points along the length 226 of the outer curved edge 208. In some implementations, the radius of curvature 232 may be substantially constant along the entire length 226, such that the outer curved edge 208 forms an arc relative to the central axis 206. In some implementations, at least a portion of the outer curved edge 208 may have a variable radius of curvature 232 (not shown) in which the distance from the central axis 206 to the outer curved edge 208 varies when moving along the outer curved edge 208 between the first end 228 and the second point 230. For example, in some implementations, the outer curved edge 208 may be in a swept-backwards configuration in which the radius of curvature 232 of the outer curved edge 208 decreases, and the outer curved edge 208 moves closer to the central axi 206, when moving along the outer curved edge 208 towards the second point 230.

The rotor electrode 202 may include a leading edge 212 that extends from the first end 216 of the inner curved edge 210 to the first end 228 of the outer curved edge 208 at a leading portion 234 of the rotor electrode 202. In some implementations, the leading edge 212 may be located substantially along a line (i.e., a radius) extending outward from the central axis 206. In some implementations, the leading edge 212 may be curved, and may, for example, bow inward or outward relative to the rotational direction 204 of the rotor electrode 202.

FIG. 2B shows a profile of a stator 250 having a stator disc 251 that includes a stator electrode 252 and a central axis 256. The portion of the stator disc 251 shown in FIG. 2B may oppose and be separated by a distance from the portion of the rotor disc 201 shown in FIG. 2A. The stator 250 remains stationary as the rotor 200 rotates along a rotational direction 254 relative to the stator 250. The stator electrode 252 may form a mirror image of the rotor electrode 202 relative to the rotation of the rotor disc 201. Although only one stator electrode 252 is shown in FIG. 2B, the stator 250 may include multiple stator electrodes along the same surface that contains the stator electrode 252. In some implementations, one or more of the stator electrodes 252 may be formed by conductive and/or semi-conductive material deposited onto the surface of the stator disc 251. In some implementations, one or more of the stator electrodes 252 may be formed by conductive material that has been incorporated into the surface of the stator disc 251.

The stator electrode 252 may include an outer curved edge 258, an inner curved edge 260, and a connecting edge 262. The inner curved edge 260 may have a length 264 that extends from a first end 266 that joins the connecting edge 262 to a second end 268 that joins the outer curved edge 258. The inner curved edge 260 may be spaced radially inward of the outer curved edge 258 with respect to the central axis 256. In some implementations, the inner curved edge 260 may have a radius of curvature 270 corresponding to a distance of the inner curved edge 260 from the central axis 256 along the length 264 of the inner curved edge 260. In some implementations, the length 264 of the inner curved edge 260 may include two separate portions, a constant portion 264a having a constant radius of curvature 270 and a variable portion 264b having a variable radius of curvature 270, where the constant portion 264a and the variable portion 264b meet at a singularity or point of inflection 272. In such an implementation, each point along the constant portion 264a of the length 264 may be located the same distance from the central axis 256, thereby forming an arc relative to the central axis 256. Each point along the variable portion 264b of the length 264, by contrast, may be located at a variable distance from the central axis 256 where the radius of curvature 270 changes when progressing along the variable portion 264b away from the point of inflection 272.

In some implementations, the constant portion 264a may be located proximate the connecting edge 262 of the stator electrode 252 in a relatively rearward location of the stator electrode 252 with respect to the rotational direction 254 of the rotor disc 201. The variable portion 264b may be located relatively further away from the connecting edge 262 and may form a swept configuration in which the variable portion 264b moves radially away from the central axis 256 when progressing along the variable portion 264b from the point of inflection 272 towards the second end 268. As such, the inner curved edge 260 and the outer curved edge 258 may meet at a point located at the second end 268 of the length 264 along a leading portion 274 of the stator electrode 252 with respect to the rotational direction 254 of the rotor disc 201. Although FIG. 2B shows the length 264 of the inner curved edge 260 comprised of the constant portion 264a and the variable portion 264b, in some implementations, the entire length 264 of the inner curved edge 260 may have a variable radius of curvature 270.

The outer curved edge 258 of the stator electrode 252 may have a length 276 that extends from a first end 278 that joins the connecting edge 262 to a second end 280 that joins the inner curved edge 260. The outer curved edge 258 may have a radius of curvature 282 that defines a distance from the central axis 256 to each point along the length 276 of the outer curved edge 258. In some implementations, the radius of curvature 282 may be substantially constant along the entire length 276, such that the outer curved edge 258 forms an arc relative to the central axis 256. In some implementations, at least a portion of the outer curved edge 258 may have a variable radius of curvature 282 (not shown) in which the distance from the central axis 256 to the outer curved edge 258 varies when moving along the outer curved edge 258 between the first end 278 and the second end 280. For example, in some implementations, the outer curved edge 258 may be in a swept configuration in which the radius of curvature 282 of the outer curved edge 258 decrease, and the outer curved edge 258 moves closer to the central axis 256, when moving along the outer curved edge 258 towards the second end 280.

The stator electrode 252 may include a connecting edge 262 that extends between the first end 266 of the inner curved edge 260 and the first end 278 of the outer curved edge 258 at a trailing portion 284 of the stator electrode 252. In some implementations, the connecting edge 262 may be located substantially along a line (i.e., a radius) extending outward from the central axis 256. In some implementations, the connecting edge 262 may be curved, and may, for example, bow inward or outward relative to the rotational direction 254 of the rotor disc 201.

FIGS. 3A, 3B, 3C, 3D, and 3E show the profile of a rotor 300 that includes a rotor disc 301 with a rotor electrode 302 and a corresponding stator 304 that includes a stator disc 305 with a stator electrode 306 at different points in time as the rotor electrode 302 approaches (FIGS. 3A, 3B), aligns with (FIG. 3C), and withdraws from (FIGS. 3D, 3E) the corresponding stator electrode 306. The dotted line portion of the rotor electrode 302 shown in FIGS. 3A-3E is included on a surface of the rotor disc 300 that is parallel to and opposite a surface of the stator 304 that shows in solid line the complementary stator electrode 306. The stator electrode 306 may be approximately the same size and dimensions as the rotor electrode 302. The rotor 300 rotates in a counter-clockwise direction 310 about a central axis 312 relative to the stator 304. The charge or polarity on the rotor electrode 302 and/or the stator electrode 306 may change to facilitate the rotation of the rotor 300 about the central axis 312. In some implementations, for example, the polarity on the stator electrode 306 may be kept constant, while the polarity on the rotor electrode 302 alternates between the opposite polarity to the polarity on the stator electrode 306 when the rotor electrode 302 approaches the stator electrode 306 and the same polarity to the polarity on the stator electrode 306 when the rotor electrode 302 withdraws from the stator electrode 306.

Figure 3A:
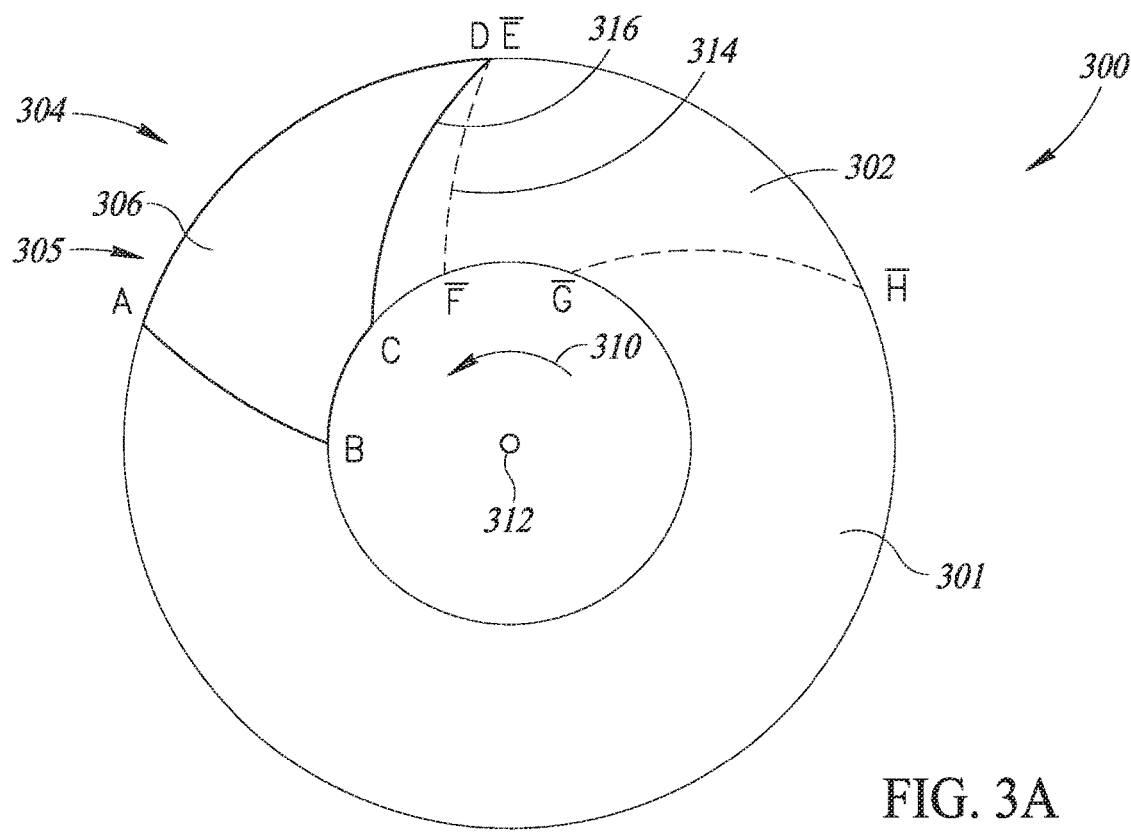
FIG. 3A is a plan view of a profile of a dotted line representation of a rotor electrode on a rotor approaching a correspondingly shaped stator electrode on a stator, in which both the rotor electrode and the stator electrode include swept portions along their respective inner curved edges, according to at least one illustrated implementation.
Figure 3B:
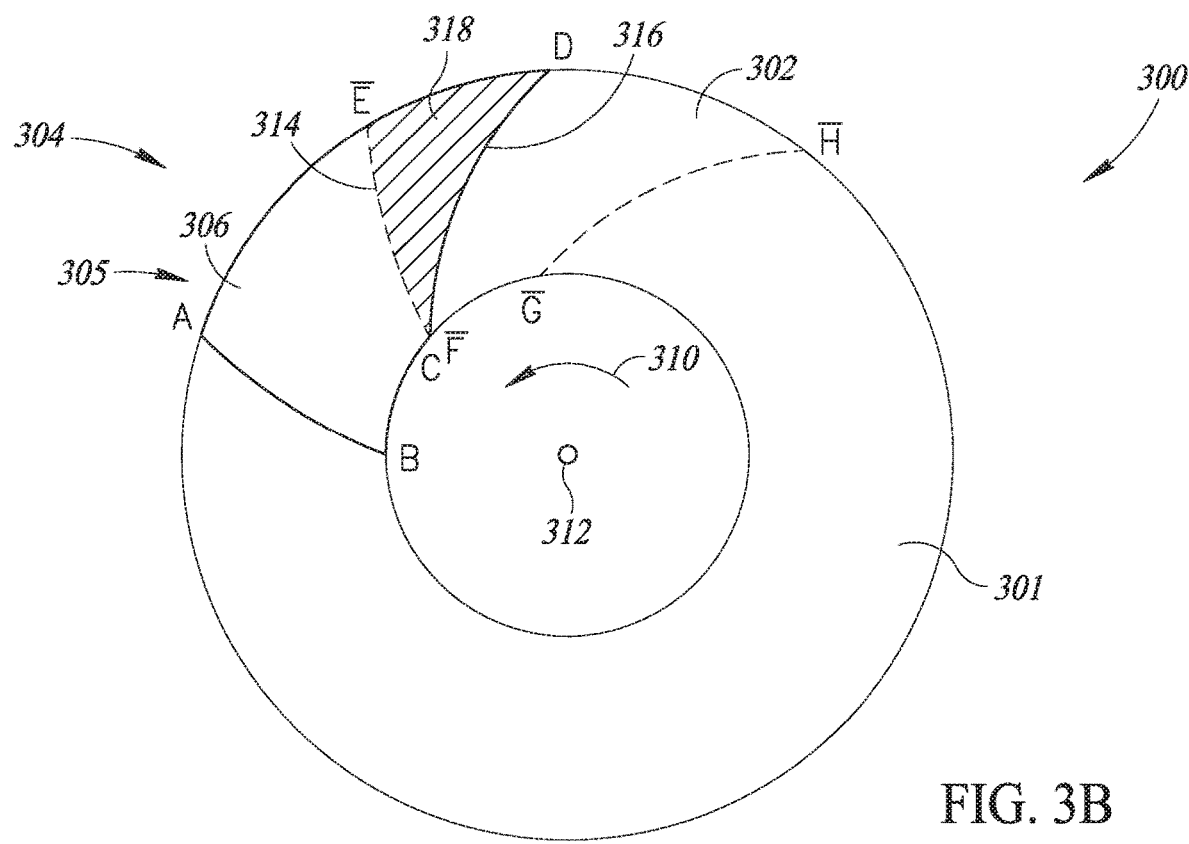
FIG. 3B is a plan view of a profile of a dotted line representation of a rotor electrode on a rotor beginning to overlap a portion of a correspondingly shaped stator electrode on a stator, in which both the rotor electrode and the stator electrode include swept portions along their respective inner curved edges, according to at least one illustrated implementation.

At time $t_0$, the leading edge (E-F) 314 of the rotor electrode 302 approaches the swept edge (C-D) 316 of the stator electrode 306 (FIG. 3A). As the leading edge (E-F) 314 of the rotor electrode 302 moves past the swept edge (C-D) 316 of the stator electrode 306, an overlapping area 318 (FIG. 3B) begins to form between the rotor electrode 302 and the stator electrode 306. Because of the configuration of the swept edge (C-D) 316, the overlapping area 318 between the rotor electrode 302 and the stator electrode 306 increases exponentially as the leading edge (E-F) 314 of the rotor electrode 302 moves with a constant angular velocity over the swept edge (C-D) 316 of the stator electrode 306. This exponential increase in the overlapping area 318 continues until time $t_1$ when the leading edge (E-F) 314 has moved completely past the swept edge (C-D) 316 (i.e., when point F on rotor electrode 302 moves past point C on the stator electrode 306 as shown in FIG. 3B). The overlapping area 318 between the rotor electrode 302 and the stator electrode 306 continues to linearly increase after time $t_1$ through time $t_2$ (FIG. 3C) when the rotor electrode 302 is aligned with the stator electrode 306.

Figure 3C:
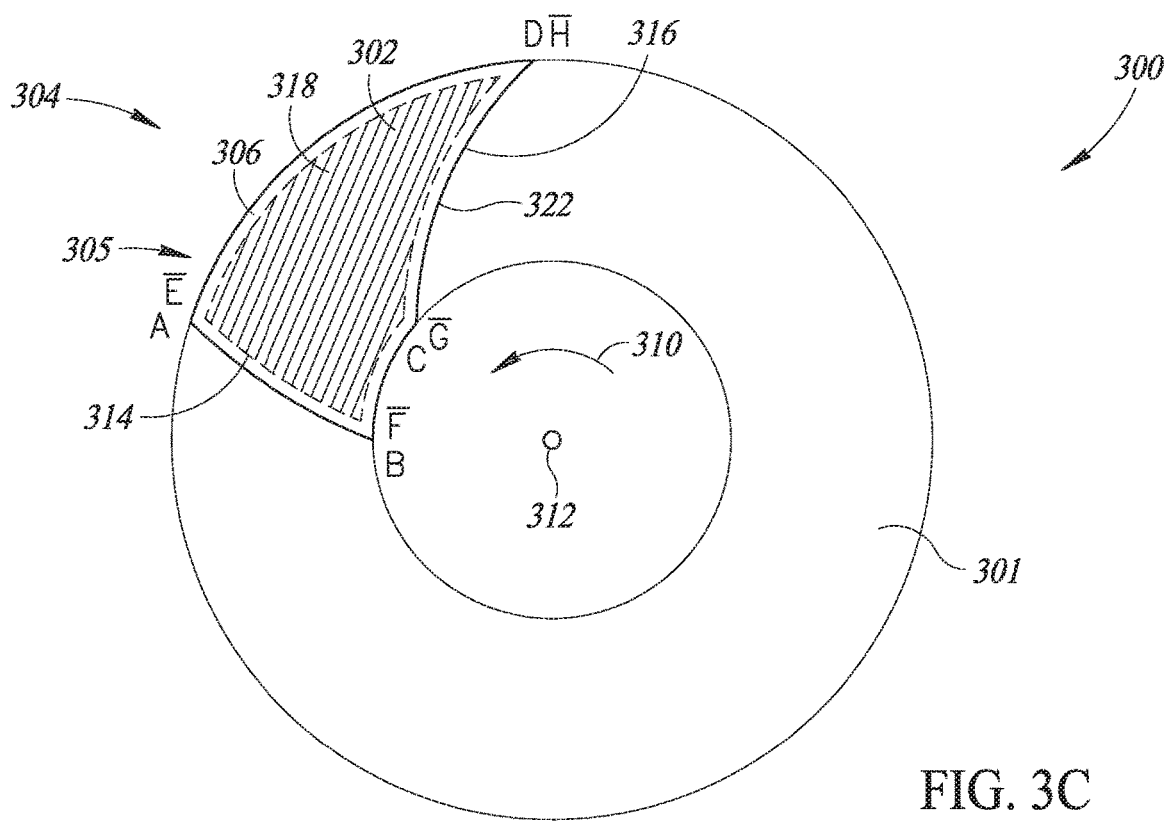
FIG. 3C is a plan view of a profile of a dotted line representation of a rotor electrode on a rotor aligned with a correspondingly shaped stator electrode on a stator, in which both the rotor electrode and the stator electrode include swept portions along their respective inner curved edges, according to at least one illustrated implementation.

In some implementations, the polarities of the rotor electrode 302 and the stator electrode 306 may be arranged to facilitate the rotation of the rotor 300. For example, in some implementations, at time $t_0$, the polarity of the rotor electrode 302 may be the opposite of the polarity of the stator electrode 306, and thereby provide an attractive force that acts to pull the rotor electrode 302 towards the stator electrode 306. The opposite polarities of the rotor electrode 302 and the stator electrode 306 may be maintained until just before the time $t_2$ when the rotor electrode 302 is aligned with the stator electrode 306 (FIG. 3C). In some implementations, the charges on the rotor electrode 302 may be removed such that the rotor electrode 302 has a neutral or reduced polarity at and/or around the time $t_2$.

After time $t_2$, the leading edge (E-F) 314 of the rotor electrode 302 moves past the connecting edge (A-B) 320 of the stator electrode 306 (FIG. 3D) as the rotor 300 continues to move in the counter-clockwise rotational direction 310 about the central axis 312. At this point, the overlapping area 318 between the rotor electrode 302 and the stator electrode 306 begins to linearly decrease. The linear decrease in the overlapping area continues from time $t_2$ through time $t_3$ (FIG. 3D) when the swept-backward edge ($\overline{G\text{-}H}$) 322 of the rotor electrode 302 begins to move past the connecting edge (A-B) 320 of the stator electrode 306 (i.e., when point $\overline{G}$ of the rotor electrode 302 moves past point B of the stator electrode 306). As the swept-backward edge ($\overline{G\text{-}H}$) 322 of the rotor electrode 302 moves past the connecting edge (A-B) 320 of the stator electrode 306 the overlapping area 318 decreases exponentially as the rotor electrode 302 moves with a constant angular velocity in the rotational direction 310. The exponential decrease in the overlapping area 318 continues until the rotor electrode 302 has moved past the stator electrode 306 at time $t_4$ (FIG. 3E when point H of the rotor electrode 302 has moved past point A of the stator electrode 306). During the period after time $t_2$, the polarity of the rotor electrode 302 may be made the same as the polarity of the stator electrode 306, thereby providing a force that pushes the rotor electrode 302 away from the stator electrode 306 in the counter-clockwise rotational direction 310. The polarities of the rotor electrode 302 and the stator electrode 306 may remain the same at least through time $t_4$ when the rotor electrode 302 no longer overlaps with the stator electrode 306.

In some implementations, the stator electrode 306 may be skewed with respect to the rotor electrode 302. As such, the position of the stator electrode 306 on the stator may be modified such that the stator electrode 306 does not align with the rotor electrode 302 but instead is offset from the rotor electrode 302. Such an offset may occur, for example, by rotating the stator electrode 306 within a plane formed by the stator relative to a point that is internal to the stator electrode 306 (e.g., the geometric center of the stator electrode 306). Such a rotation may be, for example, up to 3° or up to 5° or 10° more from a position at which the stator electrode 306 would align with the rotor electrode 302. In some implementations, the position of the stator electrode 306 may be modified by translating the stator electrode 306 within the plane formed by the stator. Such skewing may result in asymmetry effects that provide for higher torque at lower rotation rates.

Figure 4A:
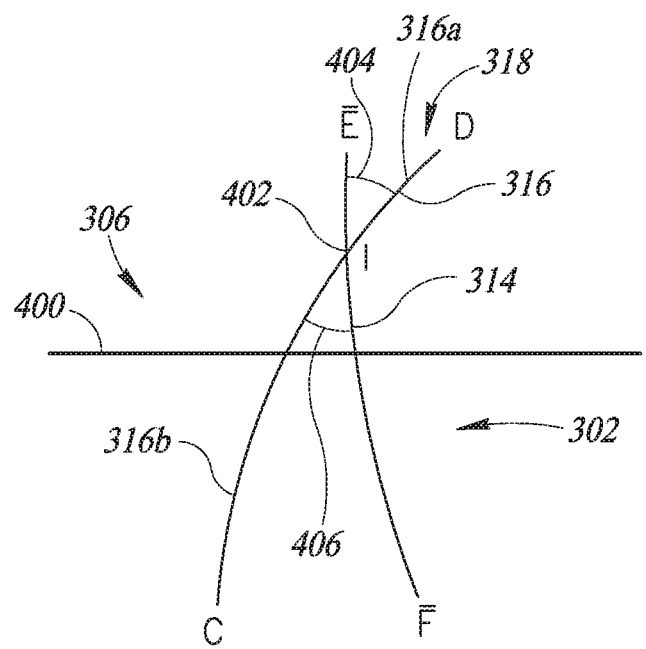
FIG. 4A is a graph that shows an intersection of a leading edge of a rotor electrode with a swept-edge portion of a stator electrode at a first time as the rotor electrode approaches the stator electrode, according to at least one illustrated implementation.
Figure 4B:
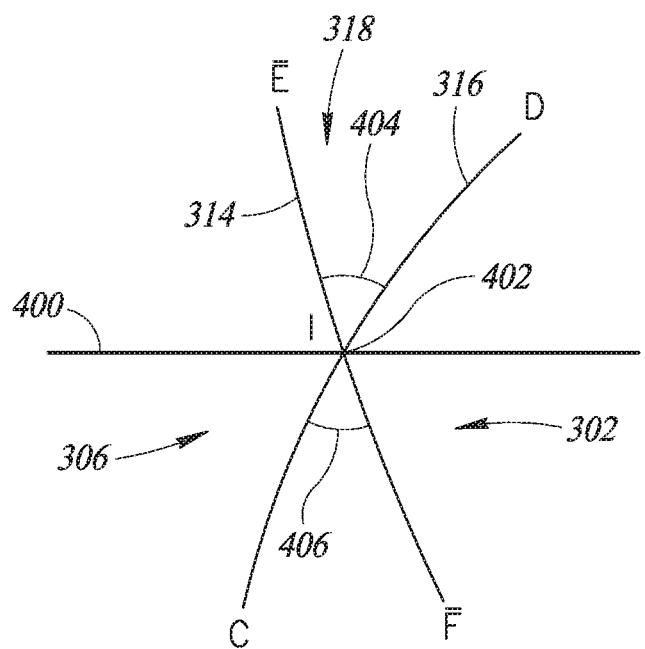
FIG. 4B is a graph that shows an intersection of a leading edge of a rotor electrode with a swept-edge portion of a stator electrode at a second time as the rotor electrode approaches the stator electrode, according to at least one illustrated implementation.
Figure 4C:
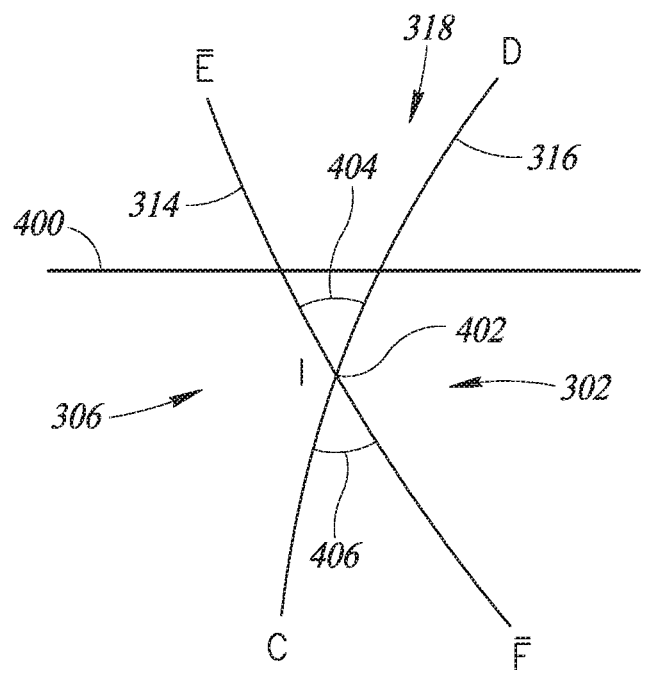
FIG. 4C is a graph that shows an intersection of a leading edge of a rotor electrode with a swept-edge portion of a stator electrode at a third time as the rotor electrode approaches the stator electrode, according to at least one illustrated implementation.

FIGS. 4A, 4B, and 4C show representations of the leading swept-backward edge ($\overline{E-F}$) 314 of the rotor electrode 302 relative to the swept edge (C-D) 316 of the stator electrode 306 as the rotor electrode 302 begins to overlap with the stator electrode 306 (e.g., between times $t_0$ and $t_1$ in FIGS. 3A and 3B). The swept edge (C-D) 316 is bisected by a center line 400 into an upper length 316a and a lower length 316b such that the upper length 316a equals the lower length 316b. The leading edge ($\overline{E-F}$) 314 of the rotor electrode 302 and the swept edge (C-D) 316 of the stator electrode 306 intersect at an intersection point I 402, and form an overlapping angle 404 approximately defined by point E of the rotor electrode 302, the intersection point I 402, and point D of the stator electrode 306. The overlapping angle 404 is positioned to face towards the overlapping area 318 of the rotor electrode 302 and the stator electrode 306. A corresponding null set angle 406 may be approximately defined by point $\overline{F}$ of the rotor electrode 302, the intersection point I 402, and point C of the stator electrode 306, and be directed towards an area in which the rotor electrode 302 and the stator electrode 306 do not overlap.

As shown in FIGS. 4A, 4B, and 4C, the overlapping angle 404 may increase as the leading edge ($\overline{E-F}$) 314 of the rotor electrode 302 moves past the swept edge (C-D) 316 of the stator electrode 306. As such, the overlapping angle 404 at time $t_{01}$ (FIG. 4A) may be less than the overlapping angle 404 at time $t_{03}$ (FIG. 4B), which may be less than the overlapping angle 404 at time $t_{03}$ (FIG. 4C). Note that the point of overlap migrates radially inward during the rotation.

Figure 3D:
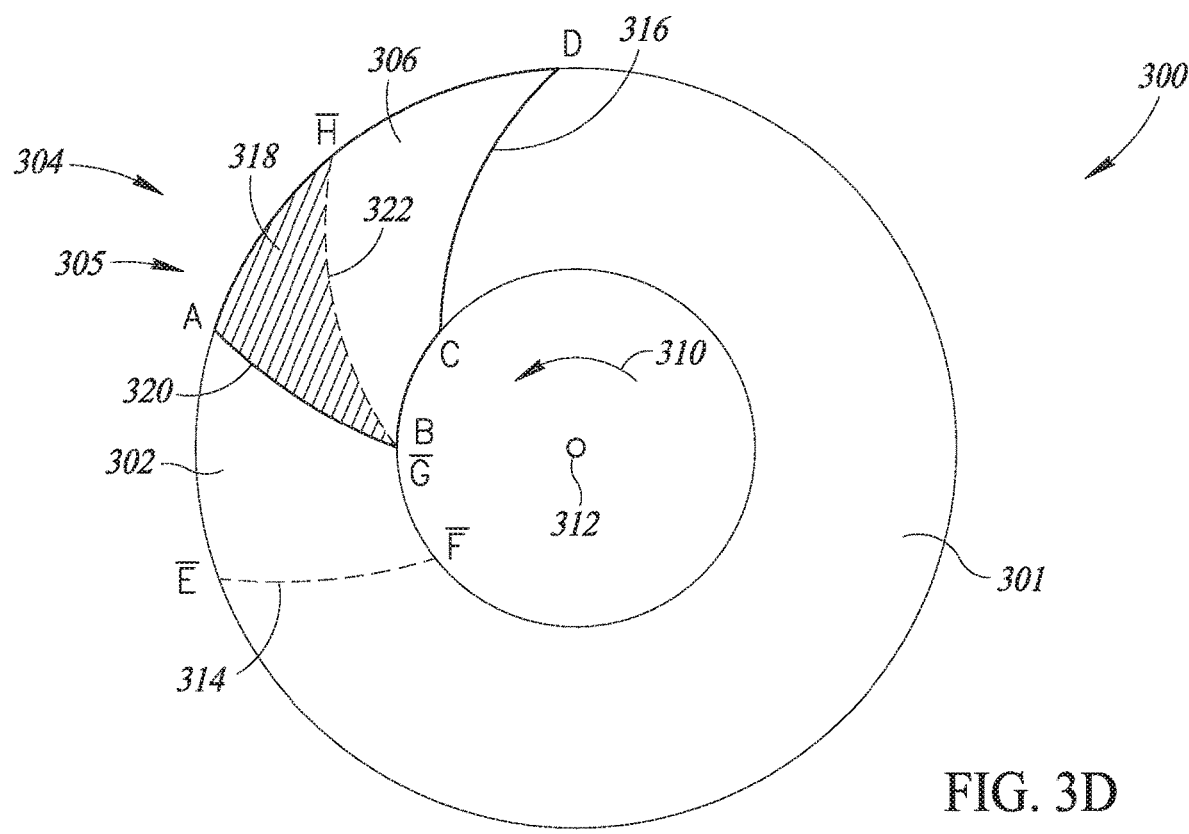
FIG. 3D is a plan view of a profile of a dotted line representation of a rotor electrode on a rotor beginning to withdraw from a correspondingly shaped stator electrode on a stator, in which both the rotor electrode and the stator electrode include swept portions along their respective inner curved edges, according to at least one illustrated implementation.
Figure 3E:
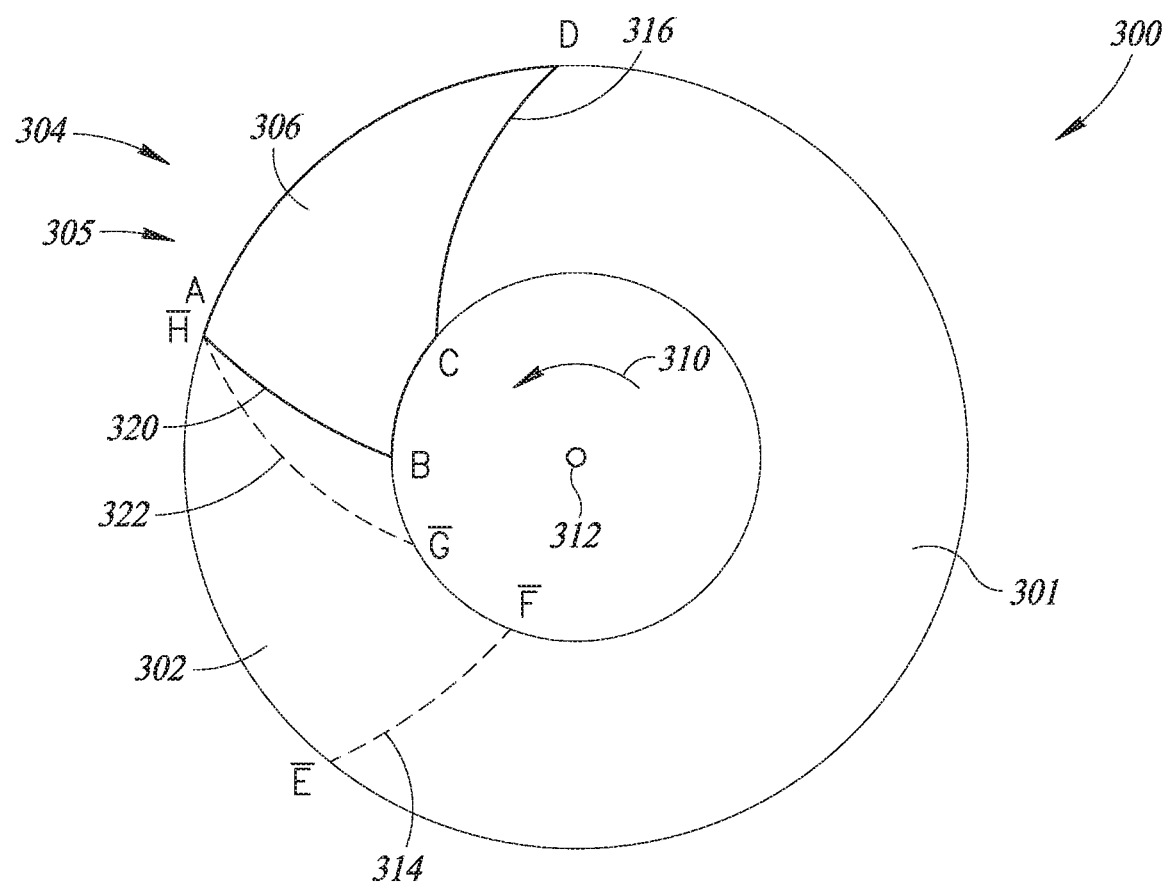
FIG. 3E is a plan view of a profile of a dotted line representation of a rotor electrode on a rotor completely withdrawn from a correspondingly shaped stator electrode on a stator, in which both the rotor electrode and the stator electrode include swept portions along their respective inner curved edges, according to at least one illustrated implementation.
Figure 5A:
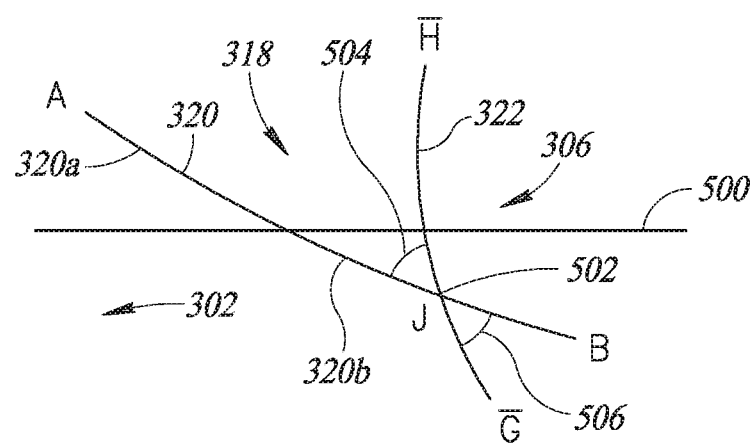
FIG. 5A is a graph that shows an intersection of a swept-edge of a rotor electrode with a connecting edge of a stator electrode at a first time as the rotor electrode withdraws from the stator electrode, according to at least one illustrated implementation.
Figure 5B:
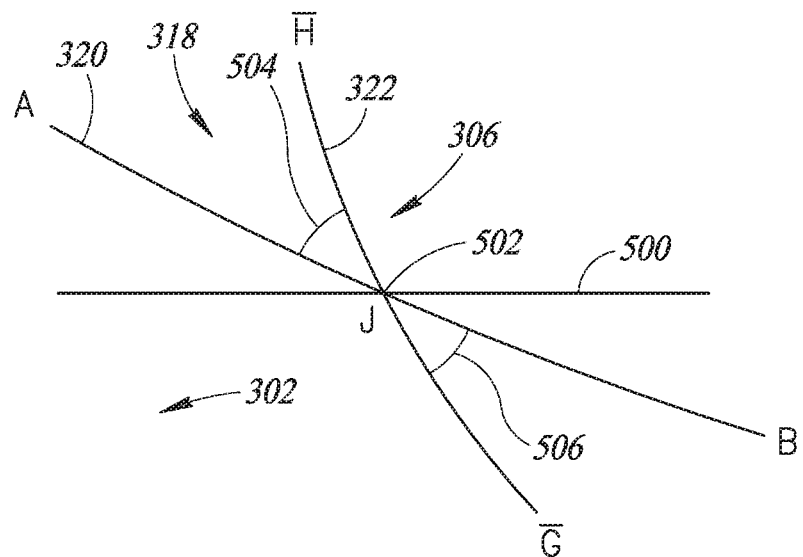
FIG. 5B is a graph that shows an angle of incidence of a swept-edge of a rotor electrode with a connecting edge of a stator electrode at a second time as the rotor electrode withdraws from the stator electrode, according to at least one illustrated implementation.
Figure 5C:
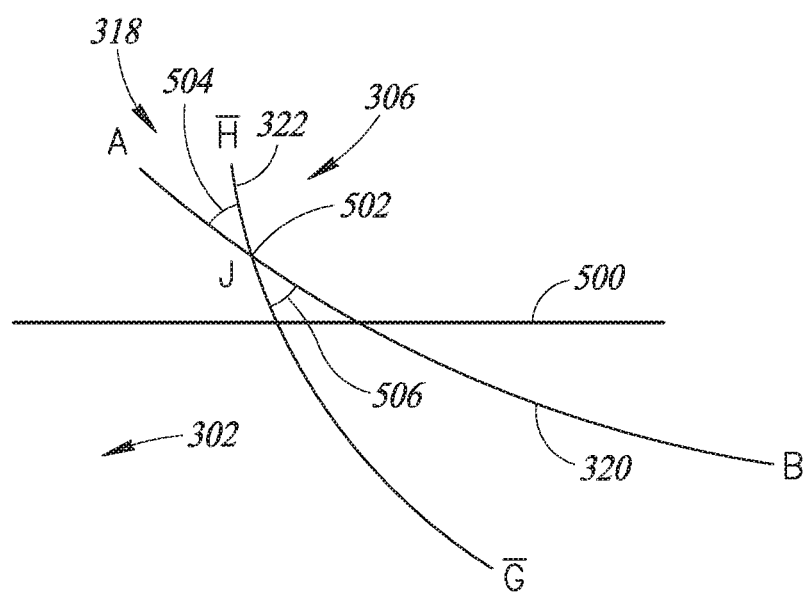
FIG. 5C is a graph that shows an angle of incidence of a swept-edge of a rotor electrode with a connecting edge of a stator electrode at a third time as the rotor electrode withdraws from the stator electrode, according to at least one illustrated implementation.

FIGS. 5A, 5B, and 5C show representations of the swept-backward trailing edge ($\overline{G-H}$) 322 of the rotor electrode 302 relative to the connecting edge (A-B) 320 of the stator electrode 306 as the rotor electrode 302 is withdrawing from the stator electrode 306 (e.g., between times $t_3$ and $t_4$ in FIGS. 3D and 3E). The connecting edge (A-B) 320 is bisected by a center line 500 into an upper length 320a and a lower length 320b such that the upper length 320a equals the lower length 320b. The swept-backward edge ($\overline{G-H}$) 322 of the rotor electrode 302 and the connecting edge (A-B) 320 of the stator electrode 306 intersect at an intersection point J 502, and form an overlapping angle 504 approximately defined by point $\overline{H}$ of the rotor electrode 302, the intersection point J 502, and point A of the stator electrode 306. The overlapping angle 504 is positioned to face towards the overlapping area 318 of the rotor electrode 302 and the stator electrode 306 as the rotor electrode 302 is withdrawing from the stator electrode. A corresponding null set angle 506 may be approximately defined by point $\overline{G}$ of the rotor electrode 302, the intersection point J 502, and point B of the stator electrode 306, and be directed towards an area in which the rotor electrode 302 and the stator electrode 306 do not overlap.

As shown in FIGS. 5A, 5B, and 5C, the overlapping angle 504 may decrease as the swept-backward edge ($\overline{G-H}$) 322 of the rotor electrode 302 withdraws from the connecting edge (A-B) 320 of the stator electrode 306. As such, the overlapping angle 504 at time $t_{21}$ (FIG. 5A) may be greater than the overlapping angle 504 at time $t_{22}$ (FIG. 5B), which may be greater than the overlapping angle 504 at time $t_{23}$ (FIG. 5C). Note that the point of overlap migrates radially outward during the rotation.

Figure 6A:
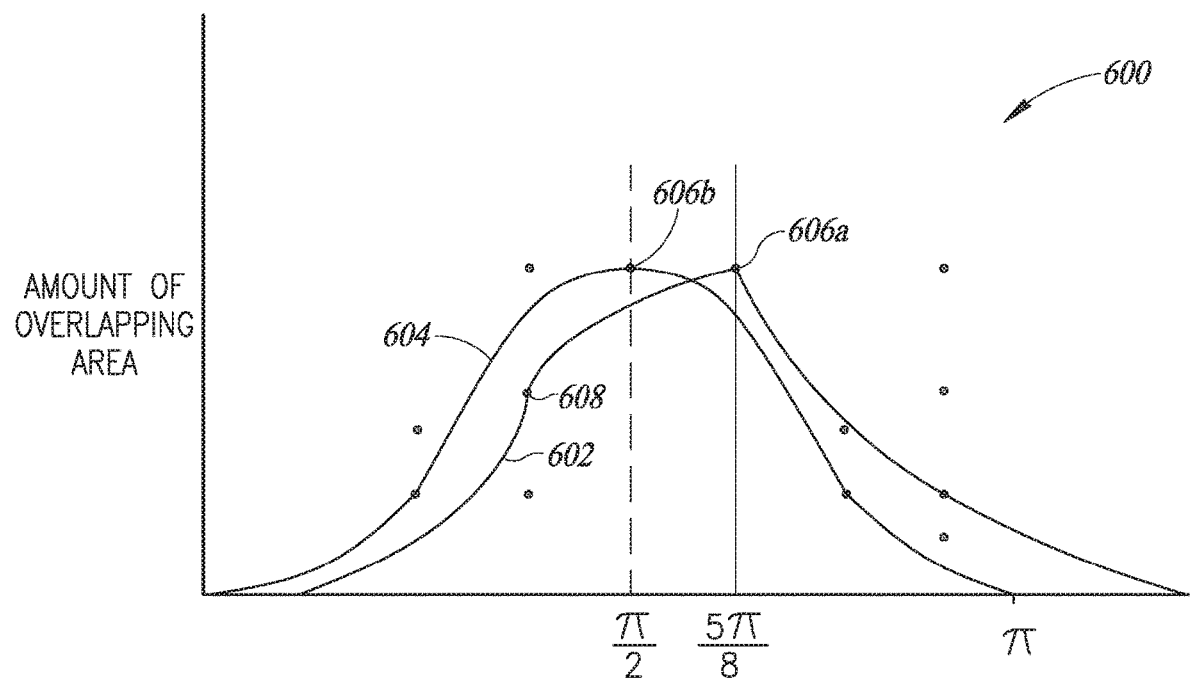
FIG. 6A is a graph that shows the amount of overlapping surface area related to a swept backwards rotor electrode and a complementary shaped stator electrode, along with a dotted line graph that shows the amount of overlapping surface area related to the conventional rotor electrode and stator electrode, according to at least one illustrated implementation.

FIG. 6A is a graph 600 that shows a first line 602 that represents an amount of overlap between a swept backwards rotor electrode 302 with a correspondingly swept backward stator electrode 306, along with a second line 604 that shows the amount of overlap of the conventional rotor and stator, according to at least one illustrated implementation. The rotation of the swept backward rotor electrode 302 may be used to shift a point of maximum overlap back to occur later during the rotation of the swept backward rotor electrode 302 relative to the swept backward stator electrode 306. As shown in FIG. 6A, the maximum overlap 606a for the swept backward configuration occurs at $5\pi/8$ as compared to the maximum overlap 606b of the conventional rotor and stator electrodes, which occurs $\pi/2$. The amount of overlap for the swept backward rotor electrode 302 and the swept backward stator electrode 306 increases exponentially through the first point 608. Such an exponential increase occurs as the leading edge 320 of the swept backward rotor electrode 302 (shown in FIG. 3A) begins to overlap the swept backward portion of the swept backward stator electrode 306. The amount of overlap continues to increase linearly from the first point 308 to the point of maximum overlap 606a at which the swept backward rotor electrode 302 and the swept backward stator electrode 306 align. The amount of overlap decreases from the point of maximum overlap 606a as the swept backward rotor electrode 302 withdraws from the swept backward stator electrode 306 until the swept backward rotor electrode 302 and the swept backward stator electrode 306 no longer overlap.

Figure 6B:
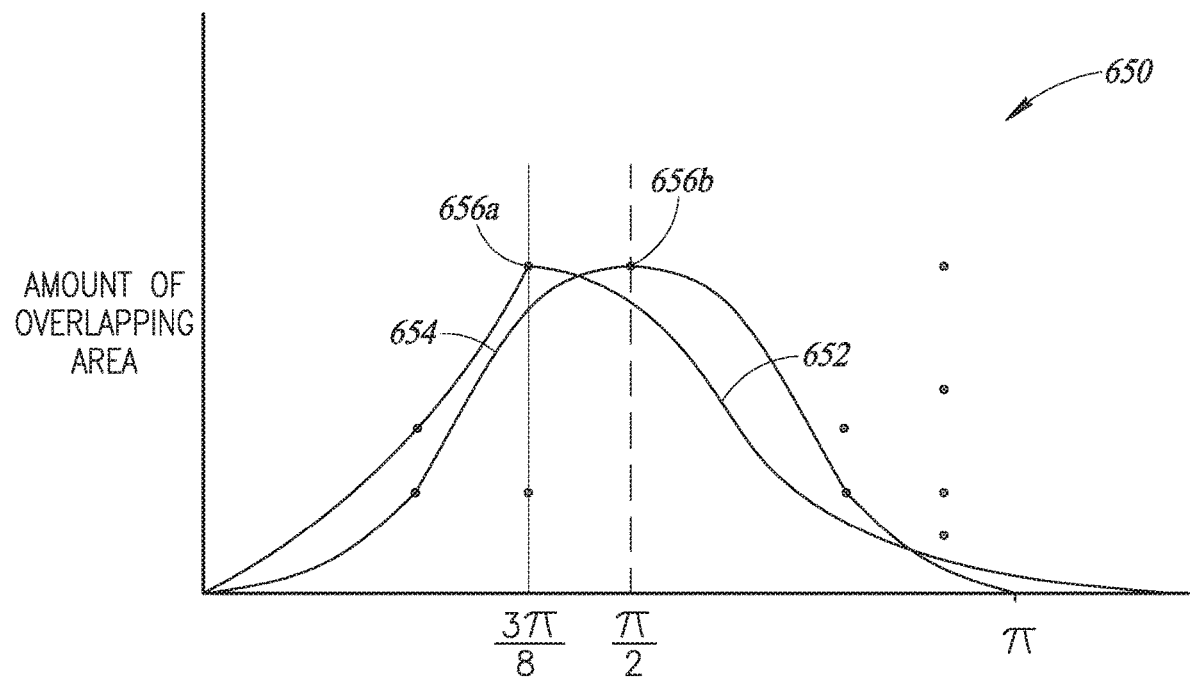
FIG. 6B is a graph that shows the amount of overlapping surface area related to a swept backwards rotor electrode and a complementary shaped stator electrode, along with a dotted line graph that shows the amount of overlapping surface area related to the conventional rotor electrode and stator electrode, according to at least one illustrated implementation.

FIG. 6B is a graph 650 that shows a third line 652 that represents an amount of overlap between a swept forward rotor electrode with a correspondingly swept forward stator electrode, along with a fourth line 654 that shows the amount of overlap of the conventional rotor and stator, according to at least one illustrated implementation. The rotation of the swept forwards rotor electrode may be used to shift the point of maximum overlap 656a forwards to occur earlier in the rotation of the swept forward rotor electrode relative to the swept forward stator electrode. As shown in FIG. 6B, the maximum overlap 656a for the swept forward configuration occurs at $3\pi/8$ as compared to the maximum overlap 656b of the conventional rotor and stator electrodes, which occurs $\pi/2$. The amount of overlap for the swept forward rotor electrode and the swept forward stator electrode increases exponentially through the point of maximum overlap 656a. Such an exponential increase occurs as the leading swept forward edge of the swept forward rotor electrode overlaps with the swept forward stator electrode. The amount of overlap decreases from the point of maximum overlap 656a as the swept forward rotor electrode withdraws from the swept forward stator electrode until the swept forward rotor electrode and the swept forward stator electrode no longer overlap.

Figure 7A:
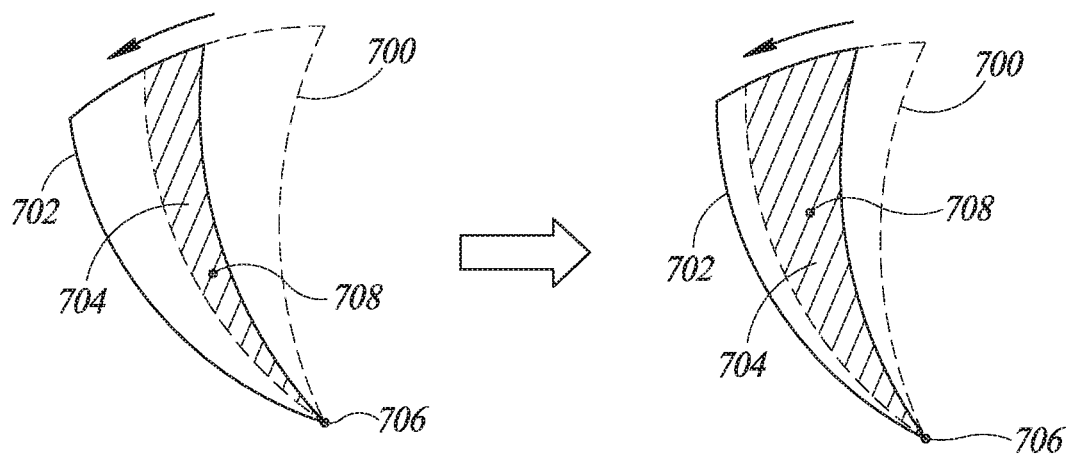
FIG. 7A is a plan view of a dotted line representation of a swept backwards electrode on a rotor and a corresponding electrode on a stator to show the change in the amount of overlap at two different points in the rotation of the rotor, such change resulting in a radial outward shift of a geometric center of the area of overlap, according to at least one illustrated implementation.

FIG. 7A is a plan view of a dotted line representation of a swept backwards rotor electrode 700 on a rotor and a corresponding stator electrode 702 on a stator to show the change in the amount of overlap area 704 at two different points in the rotation of the rotor, according to at least one illustrated implementation. The swept backwards rotor electrode 700 rotates about an axis of rotation 706 in the counter-clockwise direction, thereby increasing the overlap area 704 until the swept backwards rotor electrode 700 is aligned with the corresponding stator electrode 702. A geometric center 708 shows the geometric center for the overlap area 704 at each of the respective points in time. As shown, the geometric center 708 moves radially outward away from the center of rotation 706 as the swept backwards rotor electrode 700 rotates over the corresponding rotor electrode 704, resulting in an increased overlap area 704.

Figure 7B:
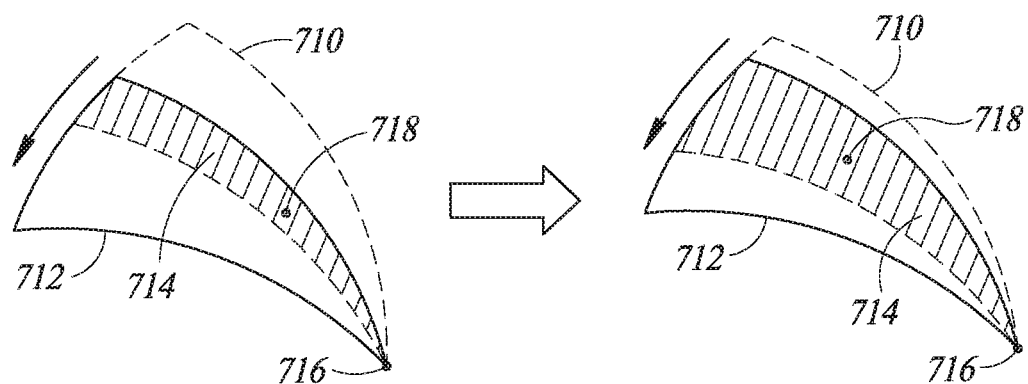
FIG. 7B is a plan view of a dotted line representation a swept forwards electrode on a rotor and a corresponding electrode on a stator to show the change in the amount of overlap at two different points in the rotation of the rotor, according to at least one illustrated implementation.

FIG. 7B is a plan view of a dotted line representation of a swept forwards rotor electrode 710 on a rotor and a corresponding stator electrode 712 on a stator to show the change in the amount of overlap area 714 at two different points in the rotation of the rotor, according to at least one illustrated implementation. The swept forwards rotor electrode 710 rotates about an axis of rotation 716 in the counter-clockwise direction, thereby increasing the overlap area 714 until the swept forwards rotor electrode 710 is aligned with the corresponding stator electrode 712. A geometric center 718 shows the geometric center for the overlap area 714 at each of the respective points in time. As shown, the geometric center 718 moves radially outward away from the center of rotation 716 as the swept backwards rotor electrode 710 rotates over the corresponding rotor electrode 714, resulting in an increased overlap area 714.

Figure 7C:
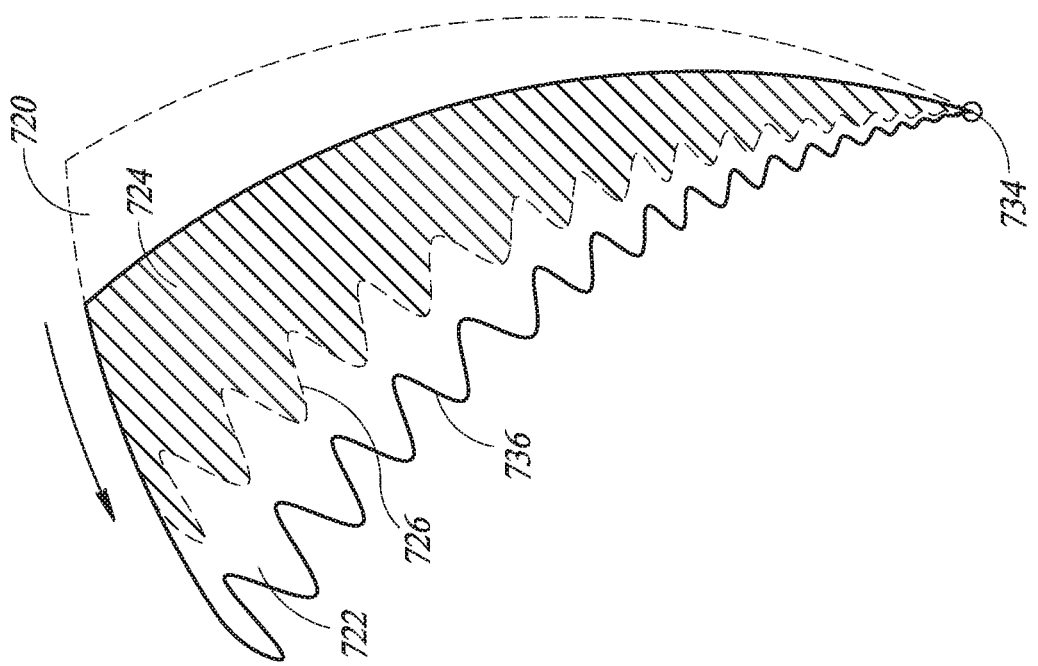
FIG. 7C is a plan view of a dotted line representation of a swept forward electrode on a rotor and a corresponding electrode on a stator to show the change in the amount of overlap at two different points during the rotation of the rotor, in which the rotor electrode has a modified leading edge, according to at least one illustrated implementation.
Figure 7C:
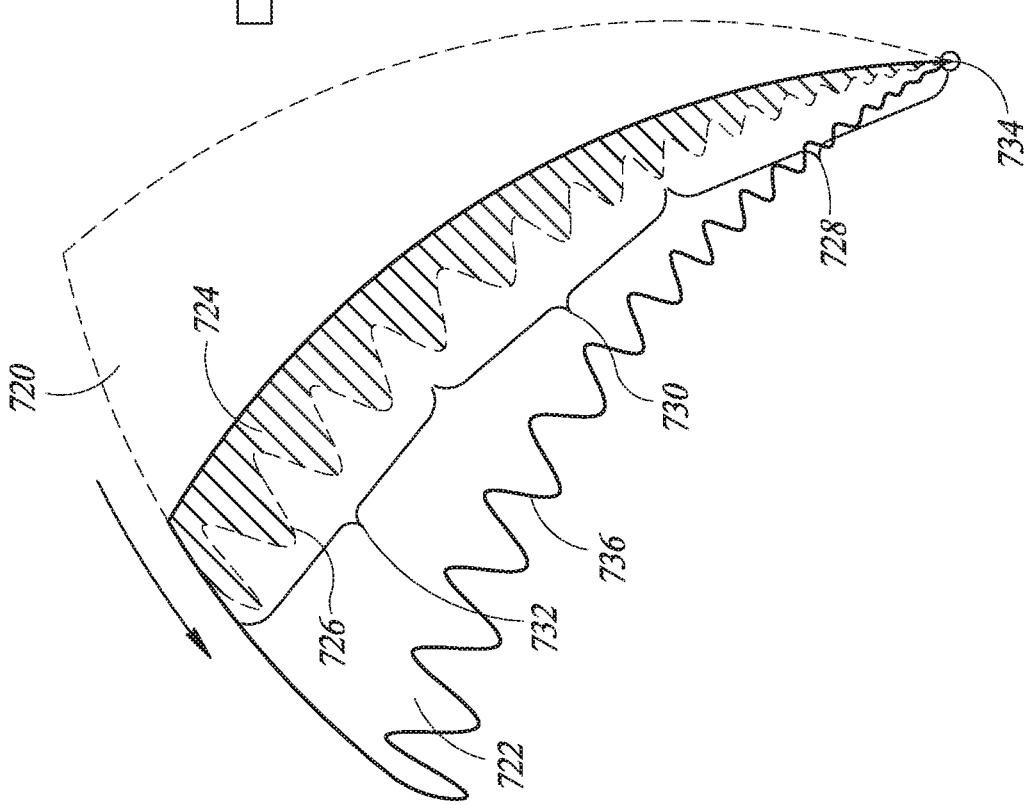

FIG. 7C is a plan view of a dotted line representation of a swept forward rotor electrode 720 on a rotor and a corresponding stator electrode 722 on a stator that shows the change in the amount of overlap area 724 at two different points in the rotation of the rotor when the swept forward rotor electrode 720 has a modified leading edge 726. The leading edge 726 may modified with a sinusoidal wave, or other type of wave form, with a variable amplitude and period. Because charges accumulate at boundaries, the relatively longer boundary provided by the modified leading edge may provide a higher linear charge density than the relatively shorter boundary provided by a smooth edge. In some implementations, the modified leading edge 726 may be used to smooth or sharpen the power band curve by altering the rate at which the area of the rotor and stator electrode overlap. In some implementations, the modified leading edge 726 may include three separate portions, an inside portion 728, a middle portion 730, and an outside portion 732. The three portions may be of the same or similar length (e.g., each portion may be about one-third of the length of the modified leading edge 726). The inside portion 728 may have a leading edge that has been modified with a sinusoidal wave with a relatively small amplitude and long period; the medium portion 730 may have a leading edge that has been modified with a sinusoidal wave with a medium amplitude and medium period; and the outside portion 732 may have a leading edge that has been modified with a sinusoidal wave with a relatively large amplitude and short period. The amplitudes and periods, and the relative lengths of each portion of the rotor electrodes may be modified to reduce the effects or harmful harmonics caused by the rotation of the swept forward rotor electrode 720. The swept forward rotor electrode 720 rotates in a counterclockwise direction around an axis of rotation 734 relative to a stator electrode 722. The stator electrode 722 may have a similar edge 736 that is shaped the same or substantially similar to the modified leading edge 726 of the swept forward rotor electrode 720.

In some implementations, the use of swept forward rotor electrodes 700 and/or swept backwards rotor electrodes 710 may advantageously be used to create power band phase angle shifts that allow for optimized power transfer and storage, stabilize the output voltage, and reduce the material strain placed on the rotor.

Figure 8:
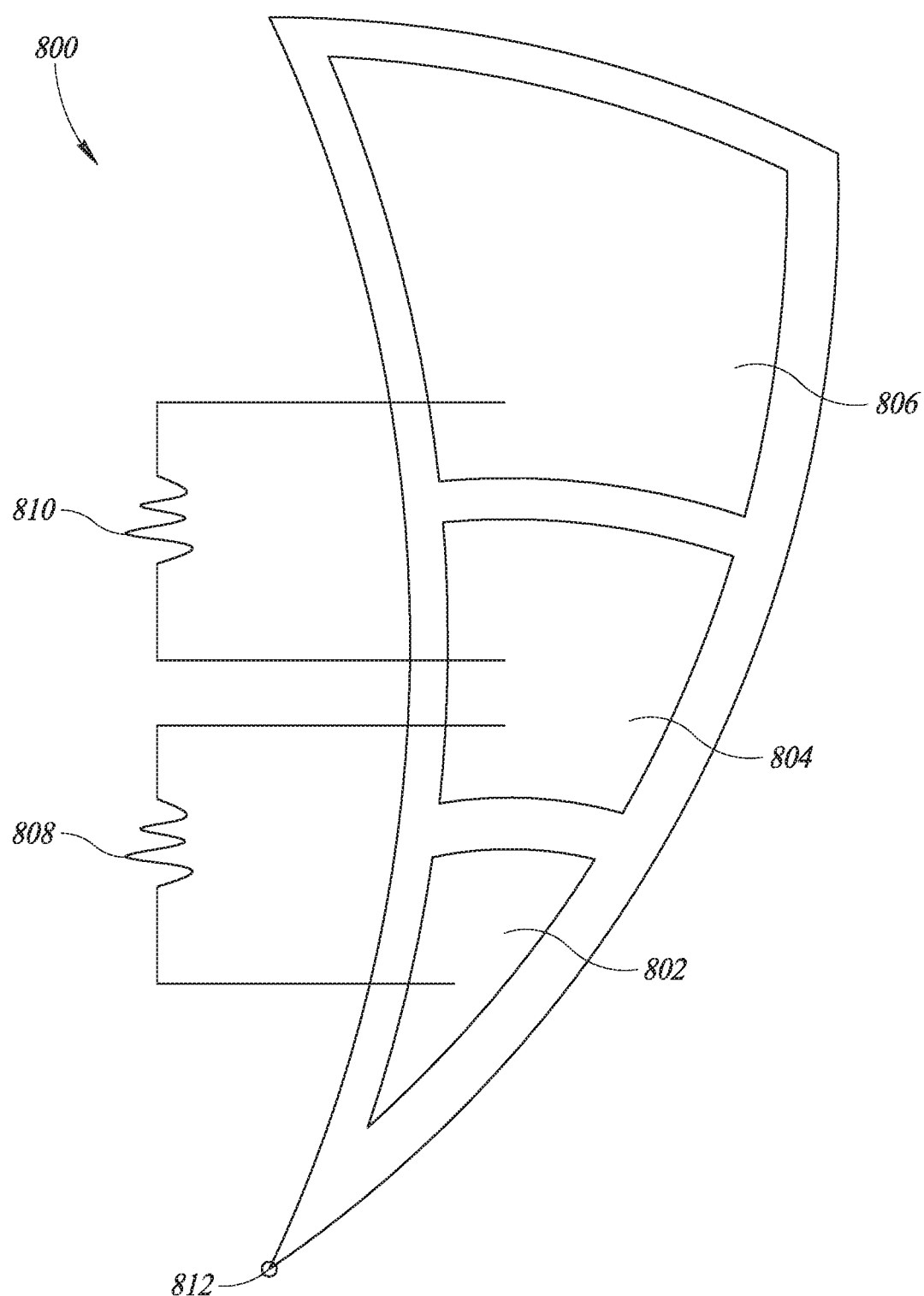
FIG. 8 is a plan view of a portion of a rotor electrode in which the rotor electrode has been divided into three different sections, each of which may have a separate voltage potential applied, according to at least one illustrated implementation.

FIG. 8 shows a rotor electrode 800 that has been divided into three different sections, an inner section 802, a middle section 804, and an outer section 806, each of which may have a separate voltage potential applied. In some implementations, the inner section 802 and the middle section 804 may be electrically coupled via a first resistor 808, and the middle section 804 and the outer section 806 may be electrically coupled via a second resistor 810. Although FIG. 8 discloses one resistor for each of the first resistor 808 and the second resistor 810, one or more resistors or other electrical components (e.g., capacitors, inductors) may be used to electrically couple the inner section 802 and middle section 804, and/or the middle section 804 and outer section 806. In some implementations, at least a portion of one or more of the inner section 802, the middle section 804, and the outer section 806 may overlap. The rotor electrode 800 rotates relative to an axis 812.

The first resistor 808 and the second resistor 810 may be used apply different torque configurations to the rotor electrode 800. For example, in some implementations, the first resistor 808 and the second resistor 810 may be used to drop the electrical voltage across the rotor electrode 800 when moving from the inner section 802 towards the outer section 806. Accordingly, the inner section 802 may be at a higher electrical potential than the outer section 806. Such a drop in voltage potential may be advantageous, for example, to more evenly distribute a torque force along the rotor electrode 800 caused by an oppositely charged stator electrode (causing an attractive force) or by a similarly charged stator electrode (causing a repulsive force). The drop in voltage potential may be used, for example, for switching the polarity of the rotor electrode 800 to facilitate rotation. The magnitude of the torque applied at a point is directly proportional to the distance of the point from a center of rotation:

$$\tau = rF \sin \theta \qquad \text{Equation 1}$$

τ=force of the torque
F=force
r=distance from the axis 812 to the point at which F is applied
θ=angle at which F is applied Assuming that the electrical force F arising from the charged stator electrode is applied at approximately 90° to the rotor electrode 800, the term sin θ reduces to 1, and Equation 1 becomes τ=rF. As a result, applying a force (F) at the outer section 806 will result in a higher torque value than applying the same force (F) at the inner section 802.

The force that arises between the charged rotor electrode 800 and a charged stator electrode is proportional to the respective charges stored on the separate electrodes, per Coulomb's law:

$$|F| = k_e \frac{|q_1 q_2|}{r^2} \quad \text{Equation 2}$$

F=Force
$k_e$=Coulomb's constant
$q_1$=charge at a first point
$q_2$=charge at a second point
r=separation distance between the first point and the second point.

The corresponding charge for a surface charge distribution, such as, for example, the charge on one of the inner section 802, the middle section 804, and the outer section 806, may be obtained via the following equation:

$$dq = \sigma(r')dA' \quad \text{Equation 3}$$

$\sigma(r')$=charge per unit area at position r
$dA'$=infinitesimal unit of area Accordingly, by reducing the voltage potential, and the corresponding charge, across the outer section 806 results in a lower electrical force (F) being applied to the outer section 806 as compared to the inner section 802. Moreover, the voltages applied to each of the inner section 802, the middle section 804, and the outer section 806 may be set and/or changed such that a substantially equal amount of torque is applied to the rotor electrode 800 at each of the inner section 802, the middle section 804, and the outer section 806. Such an implementation may result in strain relief for the rotor electrode 800.

Likewise, the voltages across each of the inner section 802, the middle section 804, and the outer section 806 may be manipulated such that the force applied at the outer section 806 is greater than the force applied at either of the inner section 802 or the middle section 804. Such a torque configuration may be useful, for example, to begin rotating the rotor electrode 800. As the rotor electrode 800 begins to rotate, the voltages being applied to each of the inner section 802, the middle section 804, and the outer section 806 may be further changed to substantially even out the respective torques being applied at each of these sections.

Although discussed with respect to the rotor electrode 800, the same or similar configurations and concepts may be applied to vary the torque configurations applied by a stator electrode to one or more rotor electrodes.

FIGS. 9A-9D show electrodes 900 (900a, 900b, 900c, and 900d) that have contact points 902 at varying locations along a perimeter 904 of the electrode 900. The perimeter 904 of the electrode 900 may be formed by an outer curved edge 906, a leading edge 908, an inner curved edge 910, and a trailing edge 912. The contact points 902 may be used to supply charged particles to the electrode 900, which may be comprised of conductive and/or semi-conductive material. Because the charged particles diffuse across the electrode 900, such a situation may result in a graduated concentration of charged particles along the electrode 900. In some implementations, such as those in which the electrode 900 is comprised of semi-conductive material or elements, such semi-conductive elements may facilitate the creation of locations of higher charge density to control the torque of an associated rotor (e.g., rotor 200). In such an implementation, the graduated charge distribution across the electrode 900 may be used to modify and/or vary the torque applied along the electrode 900 according to the concepts and equations discussed above. Such an electrode 900 may be incorporated into either or both of a rotor (e.g., rotor 200) and stator (e.g., stator 250).

Figure 9A:
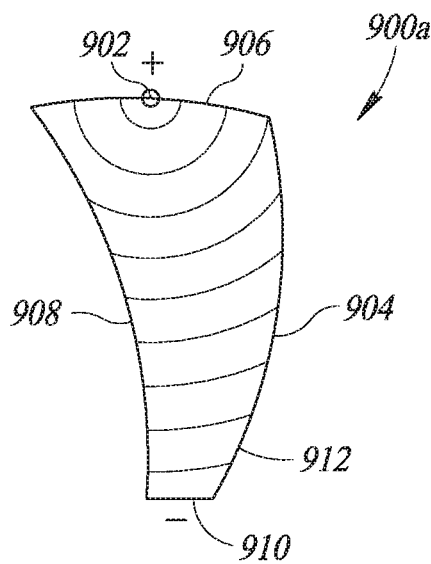
FIG. 9A is a plan view of an electrode in which electrical charge may be suppled via a connection point located along an outside edge of the electrode, according to at least one illustrated implementations.
Figure 9B:
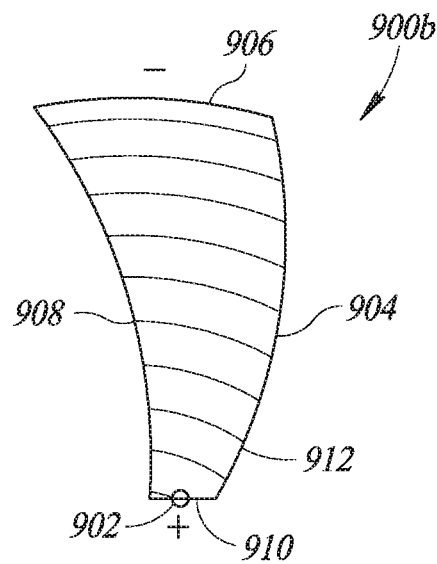
FIG. 9B is a top plan view of an electrode in which electrical charge may be suppled via a connection point located along an inside edge of the electrode, according to at least one illustrated implementations.
Figure 9C:
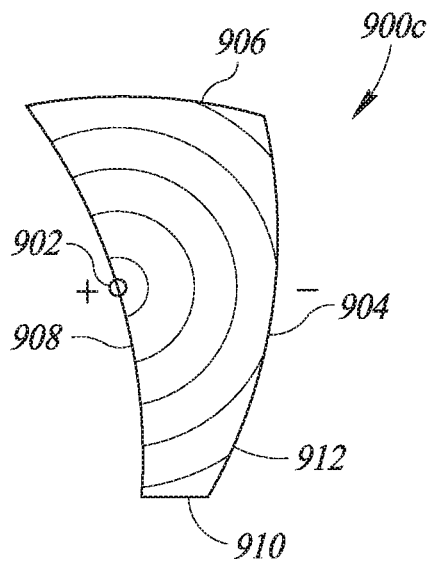
FIG. 9C is a top plan view of an electrode in which electrical charge may be suppled via a connection point located along a trailing edge of the electrode, according to at least one illustrated implementations.
Figure 9D:
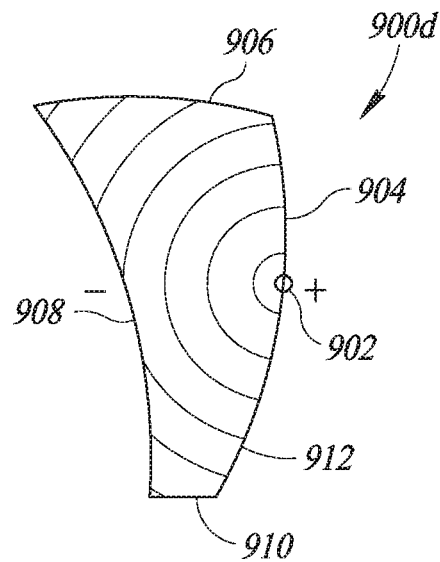
FIG. 9D is a top plan view of an electrode in which electrical charge may be suppled via a connection point located along a leading edge of the electrode, according to at least one illustrated implementations.

FIGS. 9A-9D show various charge distribution configurations that may be implemented on the electrode 900. As shown in FIG. 9A, for example, the contact point 902 is located along the outer curved edge 906, which results in a relatively higher concentration of charge at the outer curved edge 906. The charge concentration may gradually decrease moving radially away from the contact point 902 such that the lowest concentration of charge exists at the inner curved edge 910. As shown in FIG. 9B, the contact point 902 is located along the inner curved edge 910, which results in a relatively higher concentration of charge at the inner curved edge 910. The charge concentration gradually decreases moving radially away from the contact point 902 such that the lowest charge concentration may exist at the outer curved edge 906. As shown in FIG. 9C, the contact point 902 is located along the leading edge 908, which results in a relatively higher concentration of charge at the leading edge 908. The charge concentration gradually decreases moving radially away from the contact point 902 such that the lowest charge concentration may exist at or proximate the trailing edge 912. As shown in FIG. 9D, the contact point 902 is located along the trailing edge 912, which results in a relatively higher concentration of charge at the trailing edge 912. The charge concentration gradually decreases moving radially away from the contact point 902 such that the lowest charge concentration may exist at or proximate the leading edge 908.

The charge distribution across the electrode 900 may be varied and/or impacted by numerous considerations. For example, the amount of charge introduced at the contact point 902, the properties (e.g., conductivity) of the material that comprise the electrode 900, the strength of applied external electrical and magnetic fields, as well as environmental considerations such as temperature may impact the absolute charge and the charge distribution throughout the electrode 900. The electrode 900 may be comprised of materials, for example, such as metallic ceramics and/or manganese, molybdenum, or tungsten.

Figure 10A:
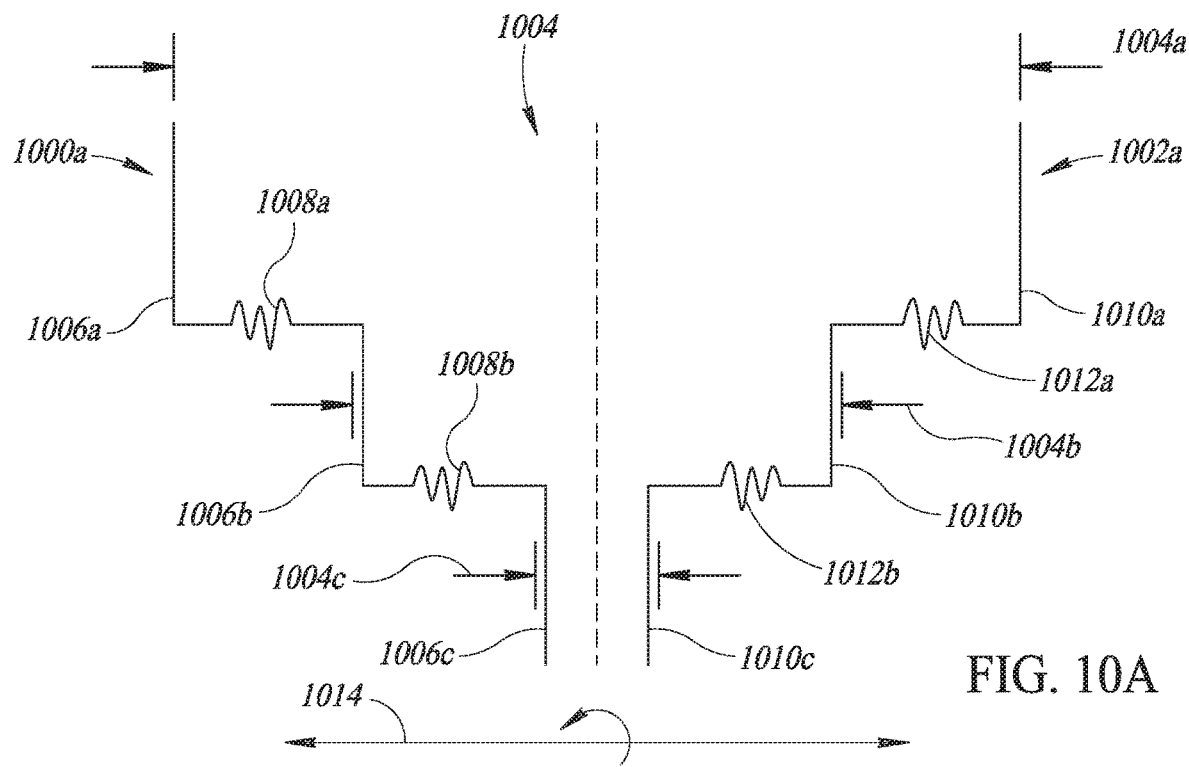
FIG. 10A is a side plan view of a rotor and an opposing stator in which the rotor and the stator are separated by a stepped, variable distance gap, according to at least one illustrated implementation.

FIG. 10A shows a rotor 1000a and an opposing stator 1002a separated by a set of stepped, variable-distance gaps 1004. The rotor 1000a may rotate relative to a rotational axis 1014 that extends between the rotor 1000a and the stator 1002a. The rotor 1000a is divided into three stepped sections, an outer section 1006a, a middle section 1006b, and an inner section 1006c. The outer section 1006a and the middle section 1006b of the rotor 1000a are electrically coupled via a first rotor resistor 1008a. The middle section 1006b and the inner section 1006c are electrically coupled via a second rotor resistor 1008b. The first rotor resistor 1008a and the second rotor resistor 1008b may be used to cause a voltage change between the outer section 1006a, the middle section 1006b, and the inner section 1006c of the rotor 1000a. The stator 1002a is similarly divided into three stepped sections, an outer section 1010a, a middle section 1010b, and an inner section 1010c, each of which opposes a corresponding section 1006 of the rotor 1000a. The outer section 1010a and the middle section 1010b of the stator 1002a are electrically coupled via a first stator resistor 1012a. The middle section 1010b and the inner section 1010c are electrically coupled via a second stator resistor 1012b. The first stator resistor 1012a and the second stator resistor 1012b may be used to cause a voltage change between the outer section 1010a, the middle section 1010b, and the inner section 1010c of the stator 1002a.

Each of the corresponding sections of the rotor 1000a and the stator 1002a are separated by a series of stepped gaps. Accordingly, the outer section 1006a of the rotor 1000a and the corresponding outer section 1010a of the stator 1002a are separated by an outer gap 1004a. The middle section 1006b of the rotor 1000a and the corresponding middle section 1010b of the stator 1002a are separated by a middle gap 1004b. The inner section 1006c of the rotor 1000a and the corresponding inner section 1010c of the stator 1002a are separated by an inner gap 1004c. As shown in FIG. 10A, the lengths of the stepped, variable-distance gaps 1004 step down when progressing radially inward from the outer gap 1004a to the inner gap 1004c. Accordingly, the length of the outer gap 1004a is larger than the length of the middle gap 1004b, and the length of the middle gap 1004b is larger than the length of the inner gap 1004c.

The difference in the lengths of the stepped, variable-distance gaps 1004 may be used to vary the electrical force applied to each of the corresponding sections between the rotor 1000a and the stator 1002a. As noted above in Equation 2, the electrical force F between two charged particles is inversely proportional to the distance between the two particles. Accordingly, the stepped, variable-distance gaps 1004 between each of the corresponding sections of the rotor 1000a and the stator 1002a will impact the force that will be applied between each corresponding section of the rotor 1000a and the stator 1002a. By using the stepped, variable-distance gaps 1004, the rotor 1000a and the stator 1002a may function similarly to a stepper motor, in which a higher voltage may be applied to the outer section 1006a of the rotor 1000a and the corresponding outer section 1010a of the stator 1002a.

Figure 10B:
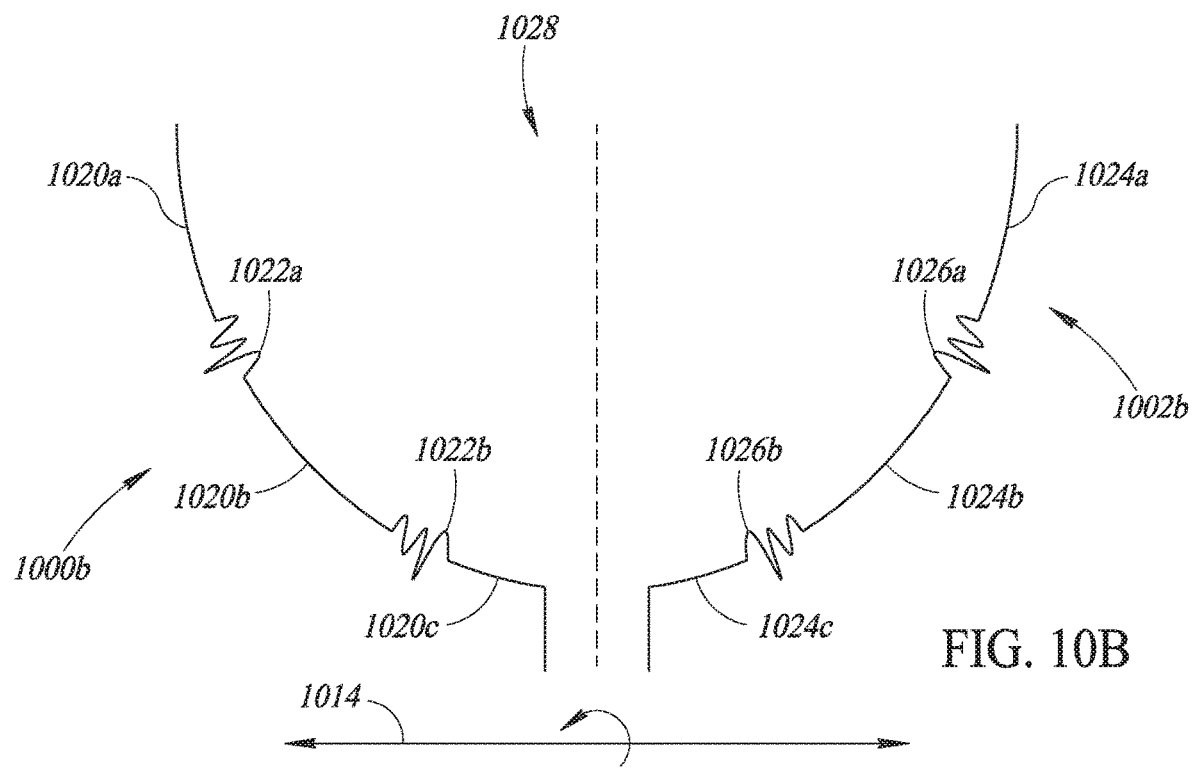
FIG. 10B is a side plan view of a rotor and an opposing stator in which the rotor and the stator are separated by a graduated, variable distance gap, according to at least one illustrated implementation.

FIG. 10B shows a rotor 1000b and an opposing stator 1002b separated by a exponentially variable distance gap 1028. The rotor 1000b may rotate relative to the rotational axis 1014. The rotor 1000b is divided into three stepped sections, an outer section 1020a, a middle section 1020b, and an inner section 1020c. The outer section 1020a and the middle section 1020b of the rotor 1000b are electrically coupled via a first rotor resistor 1022a. The middle section 1020b and the inner section 1020c are electrically coupled via a second rotor resistor 1022b. The first rotor resistor 1022a and the second rotor resistor 1022b may be used to cause a voltage change between the outer section 1020a, the middle section 1020b, and the inner section 1020c of the rotor 1000b. The stator 1002b is similarly divided into three stepped sections, an outer section 1024a, a middle section 1024b, and an inner section 1024c, each of which opposes a corresponding section 1020 of the rotor 1000b. The outer section 1024a and the middle section 1024b of the stator 1002b are electrically coupled via a first stator resistor 1026a. The middle section 1024b and the inner section 1024c are electrically coupled via a second stator resistor 1026b. The first stator resistor 1026a and the second stator resistor 1026b may be used to cause a voltage change between the outer section 1024a, the middle section 1024b, and the inner section 1024c of the stator 1002b.

The variable distance gap 1028 between the rotor 1000b and the stator 1002b may exponentially decrease when moving radially inward towards the rotational axis 1014. Because the distance of the variable distance gap 1028 varies gradually, the forces between the rotor 1000b and the stator 1002b, and the resulting stresses, are more evenly distributed along the rotor 1000b and the stator 1002b when compared to the rotor 1000a and the stator 1002a in FIG. 10A. Accordingly, such an implementation as shown in FIG. 10B may function as a variable speed motor that may be controlled by varying the voltages applied across each of the corresponding sections on the rotor 1000b and the stator 1002b.

Figure 10C:
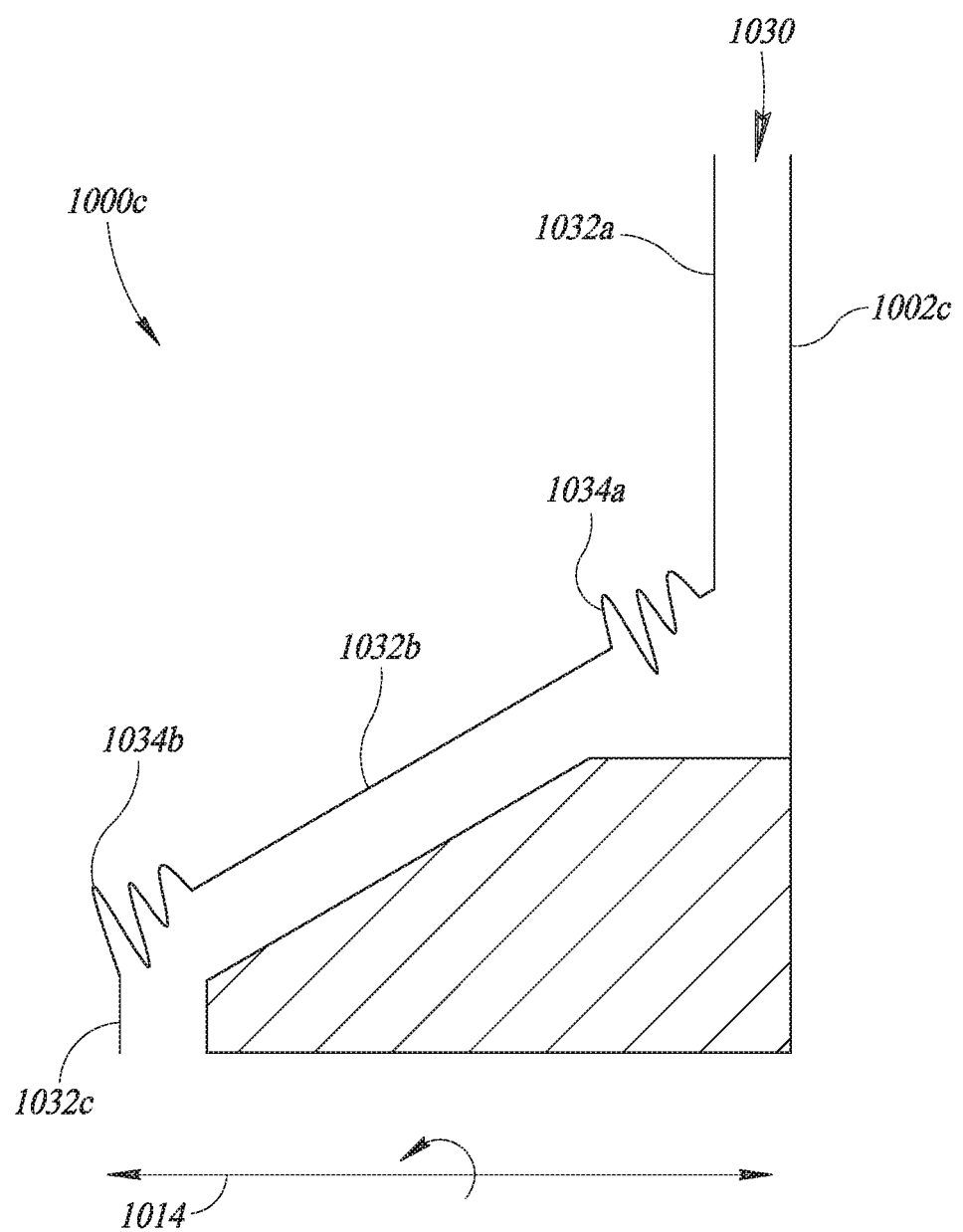
FIG. 10C is a side plan view of a rotor and an opposing stator in which the rotor and the stator are separated by a partially linearly variable distance gap, according to at least one illustrated implementation.

FIG. 10C shows a rotor 1000c and an opposing stator 1002c separated by a constant distance gap 1030. The rotor 1000c may rotate relative to the rotational axis 1014. The rotor 1000c is divided into three stepped sections, an outer section 1032a, a middle section 1032b, and an inner section 1032c. The outer section 1032a and the middle section 1032b of the rotor 1000c are electrically coupled via a first rotor resistor 1034a. The middle section 1032b and the inner section 1032c are electrically coupled via a second rotor resistor 1034b. The first rotor resistor 1034a and the second rotor resistor 1034b may be used to cause a voltage change between the outer section 1032a, the middle section 1032b, and the inner section 1032c of the rotor 1000c.

The outer section 1032a and the inner section 1032c may be included within planes that are substantially parallel to each other, with the middle section 1032b extending between the outer section 1032a and the inner section 1032c at a non-perpendicular angle. The stator 1002c may form a surface that maintains a constant distance gap 1030 to each of the outer section 1032a, the middle section 1032b, and the inner section 1032c of the rotor 1000c as the rotor 1000c rotates about the axis rotational 1014. Such an implementation with a constant distance gap 1030 may enable uniform charge distribution across the rotor 1000c and the stator 1002c resulting in a uniform electric field, which may allow for harmonic interference reduction through changes in the time required for charge redistribution, due to inherent resistive dampening, for either uniform or variable applied voltages.

Figure 11:
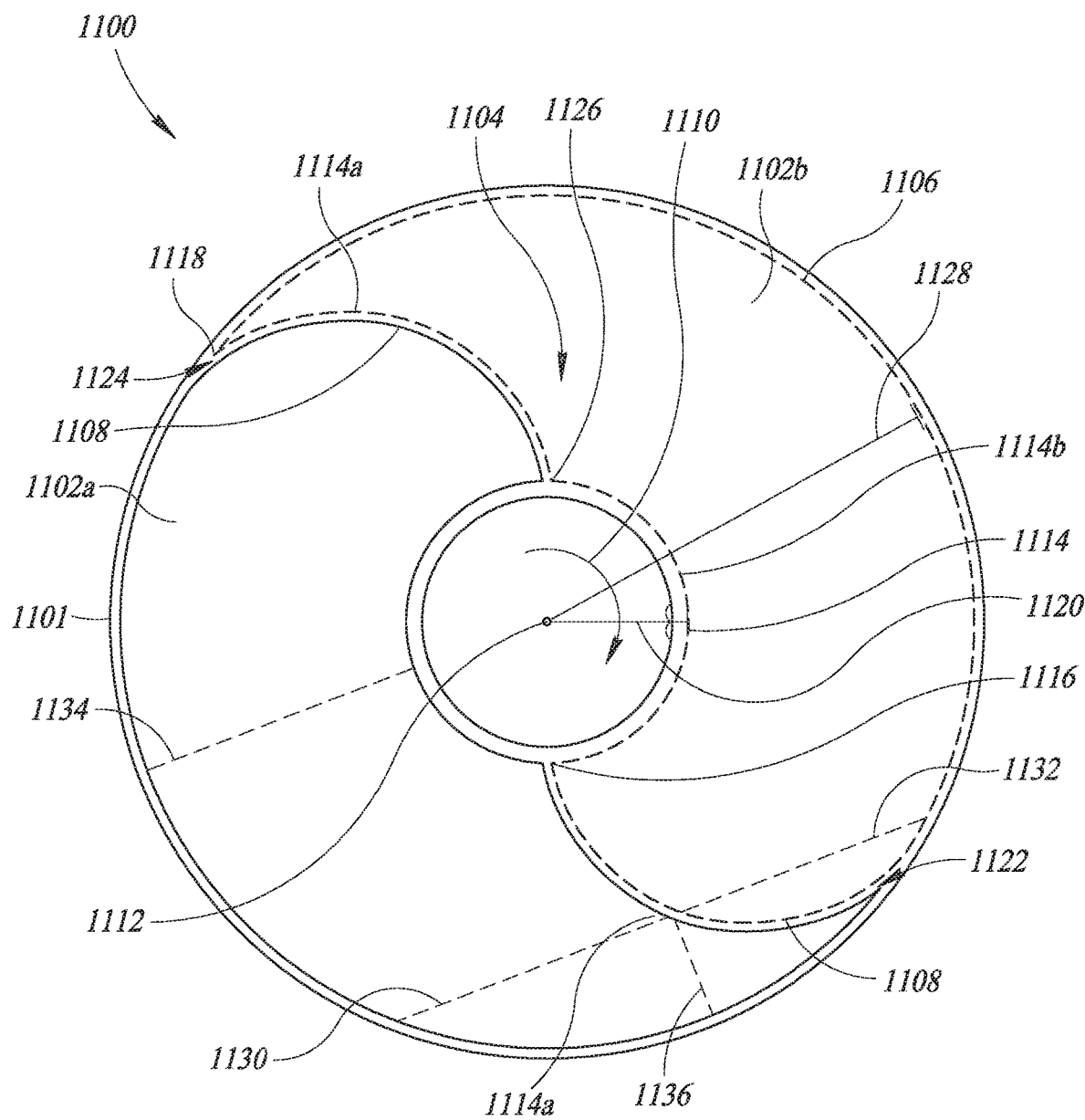
FIG. 11 is a plan view of a profile of a rotor with a pair of electrodes arranged in a Yin-Yang formation, according to at least one illustrated implementation.

FIG. 11 shows a rotor 1100 that includes a rotor disc 1101 that carries a pair of rotor electrodes 1102a, 1102b (collectively, "rotor electrodes 1102") arranged in a Yin-Yang formation. Note that the following discussion of the various features of the rotor 1100 and rotor electrodes 1102 may apply to a corresponding stator disc and stator electrodes. Each of the rotor electrodes 1102 includes an inner curved edge 1104, an outer curved edge 1106, and a leading edge 1108. The rotor 1100 may rotate in a clockwise direction 1110 about a central axis 1112. The first rotor electrode 1102a may be the same size and shape as the second rotor electrode 1102b, rotated about the central axis 1112 by 180°.

The inner curved edge 1104 may have a length 1114 that extends from a first end 1116 that joins with the leading edge 1108 to a second end 1118 that joins with the outer curved edge 1106. The inner curved edge 1104 may also be spaced apart from the central axis 1112 by a distance that forms a radius of curvature 1120. In some implementations, the length 1114 of the inner curved edge 1104 may include a variable radius portion 1114a having a variable radius of curvature such that the distance from the central axis 1112 to each point along the variable radius portion 1114a of the inner curved edge 1104 varies. In some implementations, the distance of the variable radius portion 1114a from the central axis 1112 may vary as a function of an involute curve centered about the central axis 1112. In some implementations, the variable radius portion 1114a of the inner curved edge 1104 of each rotor electrode (e.g., rotor electrode 1102a) may be sized and shaped to complement the size and shape of the leading edge 1108 of the other rotor electrode (e.g., the second rotor electrode 1102b). In such an implementation, the variable radius portion 1114a of the first rotor electrode 1102a may be separated from the leading edge 1108 of the second rotor electrode 1102b by a narrow gap 1122 that maintains a constant width separating the two electrodes. A similar narrow gap 1124 with a constant width may separate the variable radius portion 1114a of the second rotor electrode 1102b from the leading edge 1108 of the first rotor electrode 1102a.

In some implementations, the length 1114 of the inner curved edge 1104 may include a constant radius portion 1114b having a constant radius of curvature such that an equal distance separates each point along the constant radius portion 1114b from the central axis 1112. As such, the constant radius portion 1114b of the inner curved edge 1104 may form an arc relative to the central axis 1112. In some implementations, the variable radius portion 1114a and the constant radius portion 1114b of the inner curved edge 1104 may meet at a point of inflection or singularity 1126. In some implementations, the variable radius portion 1114a and the constant radius portion 1114b of the inner curved edge 1104 may join at a smooth transition such that there is no point of inflection or singularity separating the two sections.

The outer curved edge 1106 is spaced radially outward from the inner curved edge 1104 (i.e., the inner curved edge 1104 is spaced radially inward from the outer curved edge 1106). In some implementations, the outer curved edge 1106 may be proximate to, and extend along, a portion of an outer edge of the rotor 1100. In some implementations, some or all of the outer curved edge 1106 may be formed by a constant radius of curvature 1128 extending from the central axis 1112. As such, some or all of the outer curved edge 1106 may form an arc relative to the central axis 1112.

The leading edge 1108 may extend from the outer curved edge 1106 to the inner curved edge 1104. In some implementations, the leading edge 1108 may form a curved edge that bows outward from the remaining portion of the rotor electrode 1102 in the direction of rotation 1110. In such an implementation, the size and shape of the leading edge 1108 of each rotor electrode may be complementary to the size and shape of the variable radius portion 1114a of the other rotor electrode on the rotor 1100. In some implementations, a leading edge 1108 may meet the outer curved edge 1106 at a point of inflection or a singularity. In some implementations, such as that shown in FIG. 11, there may be no point of inflection or singularity between the leading edge 1108 and the outer curved edge 1106.

The rotor electrodes 1102 may be modified in various manners. For example, one or more of (i) the radius of curvature 1120 of the constant radius portion 1114b of the inner curved edge 1104 may include a radial gap distance, (ii) the size and/or shape of the leading edge 1108, (iii) the shape and/or radius of curvature 1128 of the outer curved edge 1106, (iv) the radius of curvature 1128 of the constant radius portion of the outer curved edge 1106, which may also impact the length of the narrow gap 1122, and (v) the size and shape of the variable radius portion 1114a of the inner curved edge 1104 may be modified. Such modification may take into account various measurements of the rotor electrodes 1102. For example, bisecting line 1130 and line 1132 may be parallel to a line 1134 that extends from the central axis 1112 through the surface center of mass for the first rotor electrode 1102a. Bisecting lines 1130, 1132 may bisect the leading edge 1108 such that a length of the leading edge 1108 on one side of the bisecting lines 1130, 1132 equals the length of the leading edge 1108 on the opposite side of the bisecting lines 1130, 1132. The perpendicular line 1136 may extend perpendicularly from the bisecting lines 1130, 1132 to the outer curved edge 1106. Accordingly, modifications to the rotor electrode 1102 may take into account, for example, one or more of the bisecting lines 1130, 1132, the perpendicular line 1136, and the radii of curvature 1120 (inner curved edge 1104) and 1128 (outer curved edge 1106).

The dimensions of the rotor electrodes 1102 and corresponding stator electrodes may be modified such that the amount of overlapping surface area builds quickly to maximum overlap and recedes slowly, such as, for example, in a parabolic, hyperbolic, exponential process. Such modifications to the dimensions of the electrodes may be used to provide different rotation speeds and/or different momentum transfer options.

Figure 12:
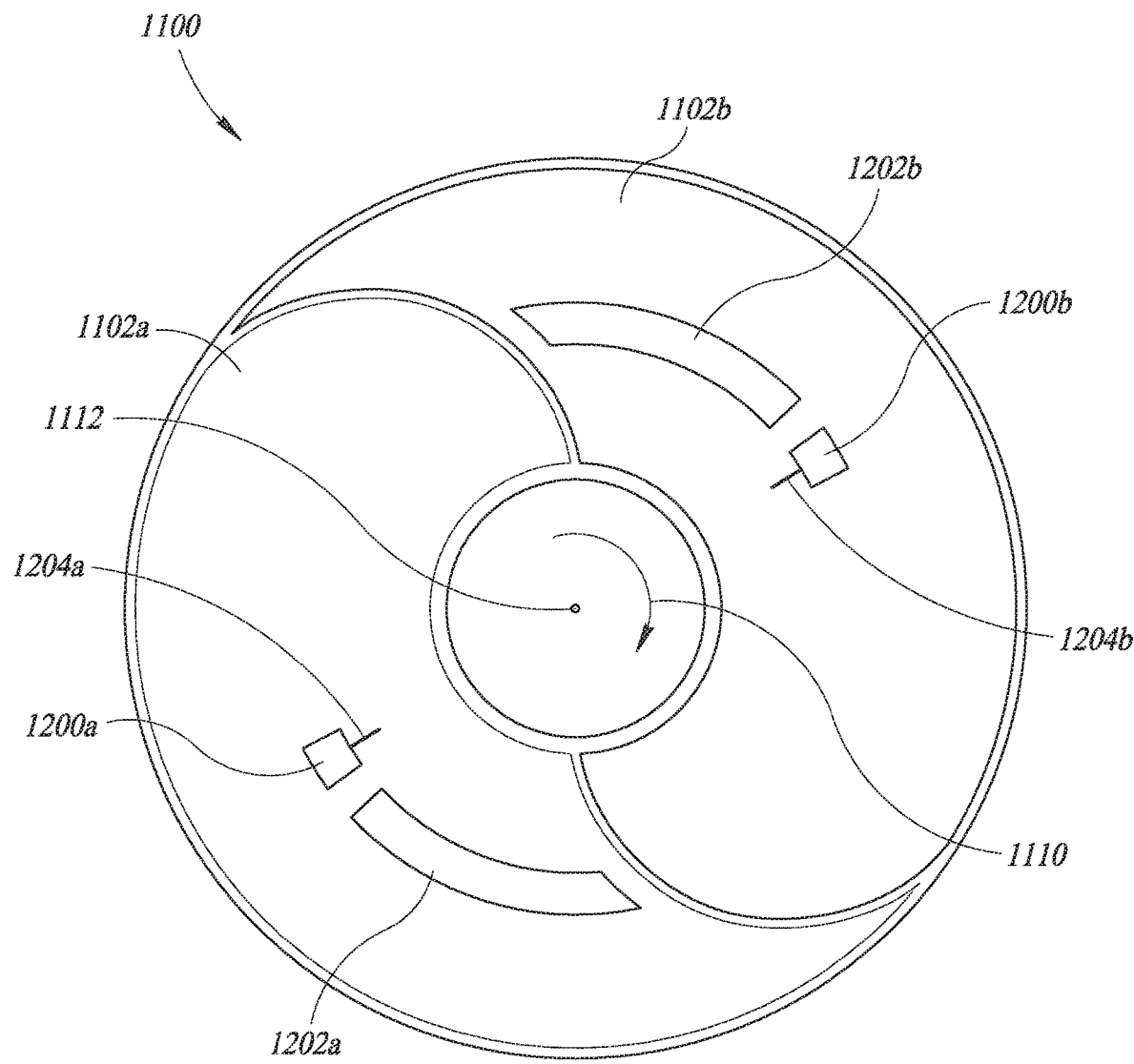
FIG. 12 is a plan view of the profile of the rotor and pair of electrodes in FIG. 11, in which a plurality of connectors for each electrode have been provided to enable the polarity of the electrode to be reversed as the rotor rotates, according to at least one illustrated implementation.
Figure 13A:
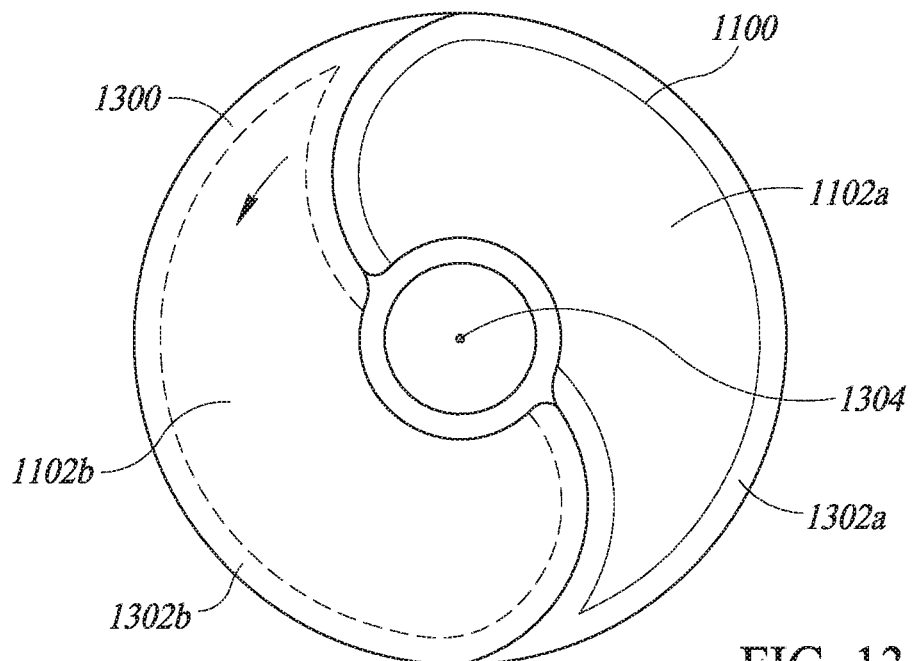
FIG. 13A is a plan view of a profile of a rotor with a pair of electrodes arranged in a Yin-Yang formation and aligned with a corresponding pair of electrodes on a stator, according to one illustrated implementation.
Figure 13B:
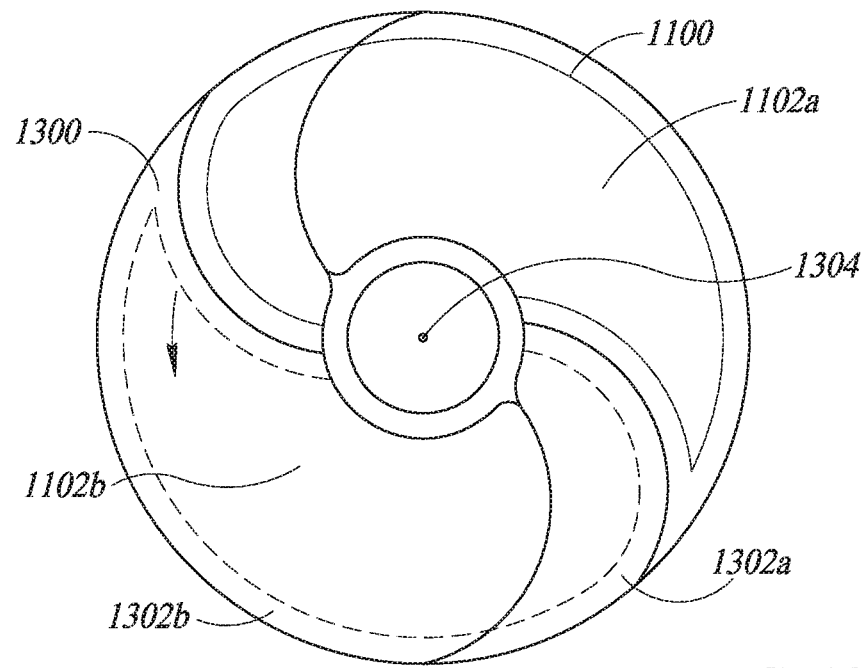
FIG. 13B is a plan view of a profile of the rotor and pair of electrodes in FIG. 13A rotated by $\pi/4$ radians from FIG. 13A.
Figure 13C:
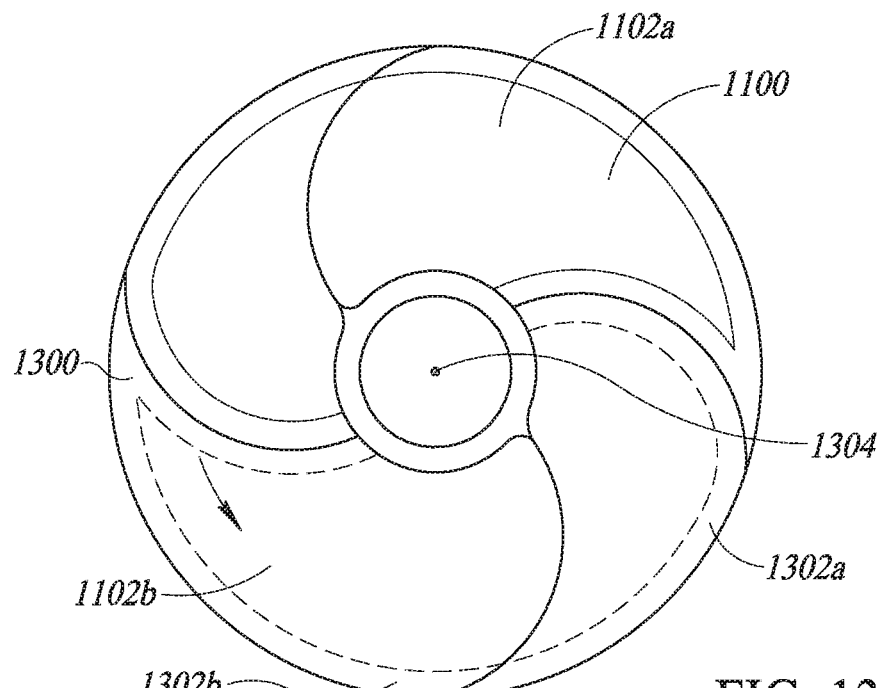
FIG. 13C is a plan view of a profile of the rotor and pair of electrodes in FIG. 13A rotated by $\pi/2$ radians from FIG. 13A.
Figure 13D:
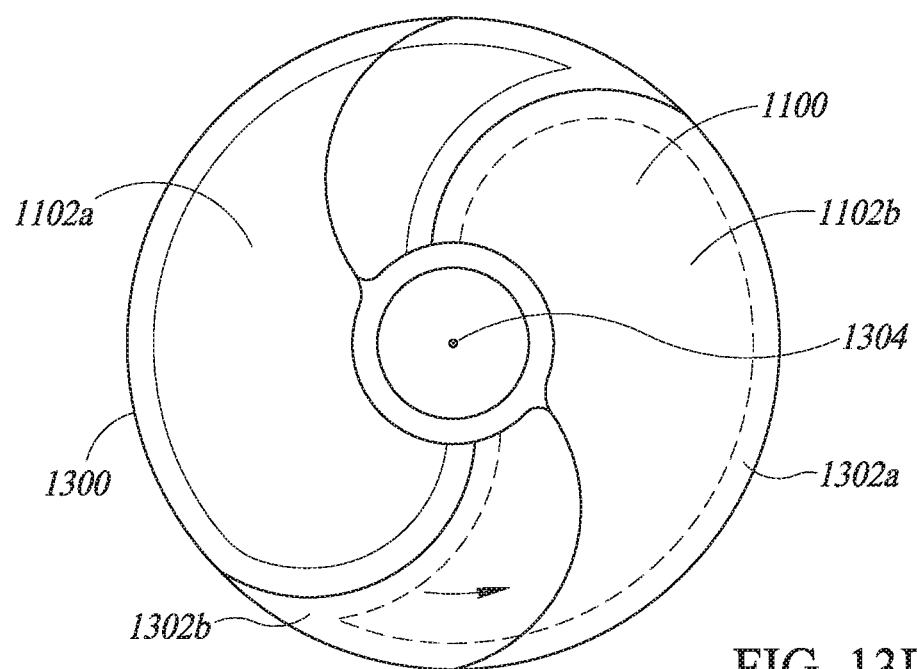
FIG. 13D is a plan view of a profile of the rotor and pair of electrodes in FIG. 13A rotated by $3\pi/4$ radians from FIG. 13A.
Figure 13E:
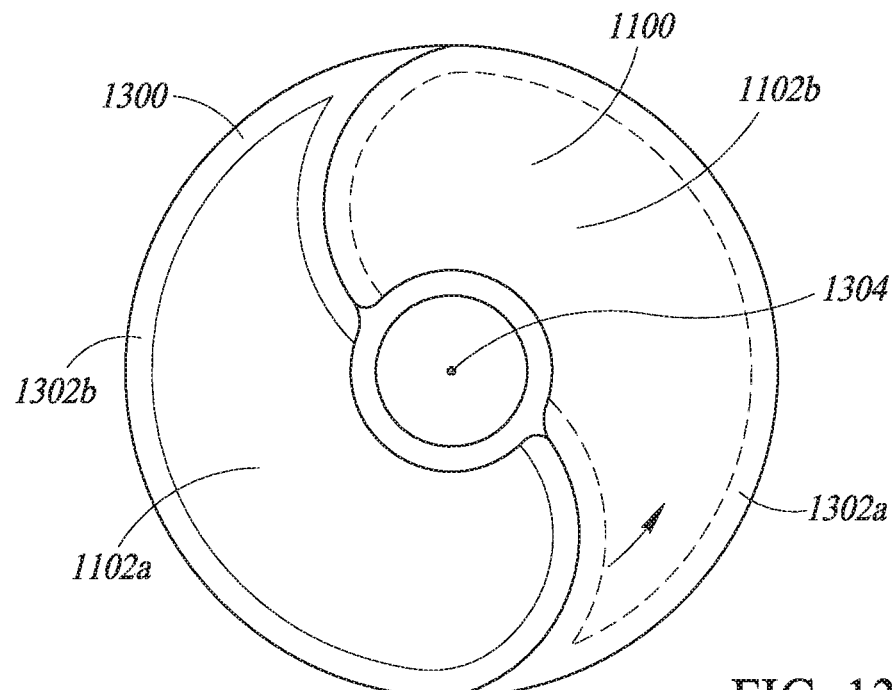
FIG. 13E is a plan view of a profile of the rotor and pair of electrodes in FIG. 13A rotated by $\pi$ radians from FIG. 13A.
Figure 13F:
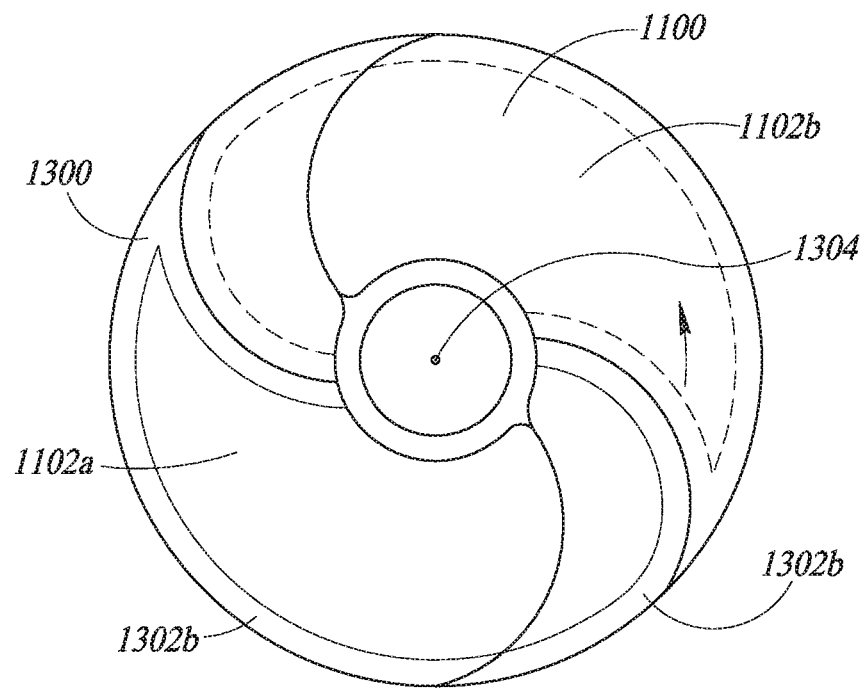
FIG. 13F is a plan view of a profile of the rotor and pair of electrodes in FIG. 13A rotated by $5\pi/4$ radians from FIG. 13A.
Figure 13G:
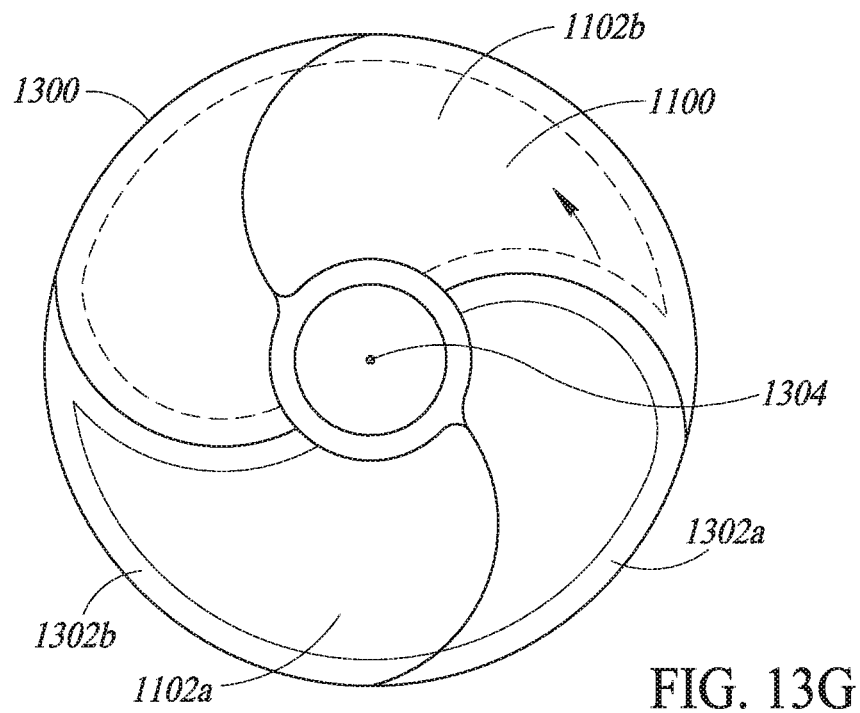
FIG. 13G is a plan view of a profile of the rotor and pair of electrodes in FIG. 13A rotated by $3\pi/2$ radians from FIG. 13A.
Figure 13H:
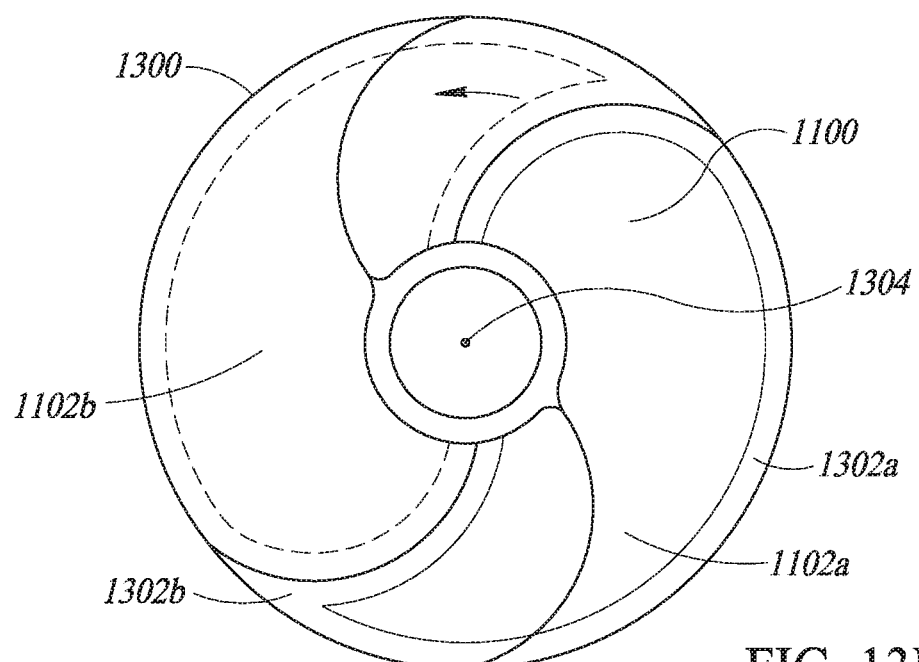
FIG. 13H is a plan view of a profile of the rotor and pair of electrodes in FIG. 13A rotated by $7\pi/4$ radians from FIG. 13A.

FIG. 12 shows the rotor 1100 and rotor electrodes 1102 from FIG. 11 in which one or more elevated connectors have been included on the rotor electrodes 1102 to enable the polarity of the rotor electrodes 1102 to be changed. The elevated connectors may include, for example, a neutral connector 1200, and a trailing connector 1202. The rotor electrodes 1102 may be placed opposite and rotate relative to one or more corresponding stator electrodes (e.g., FIG. 13) that may be located on a stator disc that is located in a plane that is parallel to and separated by a distance from the surface of the rotor 1100 shown in FIG. 12. The stator disc may include two stator electrodes (a first stator electrode and a second stator electrode) that may be mirror images of the two rotor electrodes 1102a, 1102b. Each of the two stator electrodes may have electrical couplers 1204a (for the first stator electrode) and 1204b (for the second stator electrode) that are positioned to electrically couple with the neutral connector 1200 and the trailing connector 1202 as the rotor 1100 rotates about the central axis 1112. Such electrical coupling may be made via direct contact, inductive coupling, tuned coupling, resonant coupling, and/or capacitive coupling. Each of the first stator electrode and the second stator electrode may hold charges of opposite polarities.

In some implementations, as the first rotor electrode 1102a approaches and begins to overlap with the first stator electrode, the trailing connectors 1202a may be in contact with the contact point of the second stator electrode such that the first rotor electrode 1102a carries a charge of the opposite polarity as the charge on the first stator electrode. As such, an attractive force arises between the first rotor electrode 1102a and the first stator electrode, thereby pulling the first rotor electrode 1102a in the direction of rotation 1110 towards the first stator electrode. When the first rotor electrode 1102a is approximately aligned with the first stator electrode, the neutral connector 1200a is electrically coupled to a ground and/or electrically coupled to form a ground (e.g., such as be coupling to an electric storage device), thereby draining the charge from the first rotor electrode 1102a. The angular momentum of the rotor 1100 causes the rotor 1100 to continue to move in the rotational direction until the trailing connector 1202a electrically couples to the electrical coupler 1204a of the first stator electrode. As such, the first rotor electrode 1102a is charged with the same polarity as the first stator electrode, which results in a repulsive force that pushes the first rotor electrode 1102a in the direction of rotation 1110 away from the first stator electrode. This polarity is also the opposite of the polarity of the second stator electrode, which the first rotor electrode 1102a will be approaching. Accordingly, addition to the repulsive force between the first stator electrode and the first rotor electrode 1102a, an attractive force in the direction of rotation 1110 arises between the first rotor electrode 1102a and the second stator electrode. The same process occurs with the second rotor electrode 1102b. Such a half-rotation cycle continues at the operational frequency of the motor.

FIGS. 13A-13H show various positions of the rotor 1100 having two rotor electrodes 1102a, 1102b arranged in a Yin-Yang formation as the rotor 1100 rotate relative to a complementary stator disc 1300 having two stator electrodes 1302a, 1302b that mirror the two rotor electrodes 1102a, 1102b. The rotor electrodes 1102a, 1102b may be included within a first plane formed by the rotor 1100, whereas the stator electrodes 1302a, 1302b may be included in a second plane formed by the stator disc 1300. In some implementations, the first plane and the second plane may be parallel to each other, and separated from each other by a distance. Each successive figure shows a rotation of π/4 radians in the counter-clockwise direction by the rotor 1100 about a central axis 1304.

As each rotor electrode 1102a, 1102b rotates about the central axis 1304, it approaches, aligns with, and withdraws from each successive stator electrode 1302a, 1302b. As discussed above in connection with FIG. 12, each of the stator electrodes 1302a and 1302b may be maintained at a constant charge and with an opposite polarity as each other (e.g., stator electrode 1302a may be held at a constant positive polarity, whereas stator electrode 1302b may be held at a constant negative polarity). The charges and polarity for the rotor electrodes 1102a, 1102b may alternate based upon the respective stator electrode 1302a or 1302b from which each rotor electrode 1102a, 1102b is withdrawing. In some implementations, inductive coupling may be used to vary the voltage across the rotor electrodes 1102a, 1102b to make such variation more efficient. Thus, for example, if the first rotor electrode 1102a is withdrawing from the negatively charged stator electrode 1302b, then the first rotor electrode 1102a may hold a negative charge, thus causing a repulsive force to arise between the first rotor electrode 1102a and the negatively charged stator electrode 1302b pushing the first rotor electrode 1102a in the counterclockwise direction. Because the first rotor electrode 1102a will concurrently be approaching the positively charged stator electrode 1302a, the opposite polarities will cause an attractive force to arise between the rotor electrode thereby pulling the first rotor electrode 1102a in the counter-clockwise direction.

The following chart shows the various forces that may be applied to each of the first rotor electrode 1102a, 1102b based upon the surface charges present on the surfaces of the rotor electrodes 1102a, 1102b and the stator electrodes 1302a, 1302b:

CHART 1

| FIG. | Rotation (Radians) | Rotor Electrode 1102a | Rotor Electrode 1102b | Stator Electrode 1302a | Stator Electrode 1302b | Effect |
|---|---|---|---|---|---|---|
| 13A | 0 | 0 | 0 | + | − | momentum |
| 13B | π/4 | + | − | + | − | hard push-soft pull |
| 13C | π/2 | + | − | + | − | push-pull |
| 13D | 3π/4 | + | − | + | − | hard pull-soft push |
| 13E | π | 0 | 0 | + | − | momentum |
| 13F | 5π/4 | − | + | + | − | hard push-soft pull |
| 13G | 3π/2 | − | + | + | − | pull-push |
| 13H | 7π/4 | − | + | + | − | hard pull-soft push |

Although the chart shows the interactions of the various forces as the polarity of the rotor electrodes 1102a, 1102b alternate, similar forces may arise when varying the polarity of the stator electrodes 1302a, 1302b using internal circuitry, high voltage switches, and timing constants, while keeping the polarity of the rotor electrodes 1102a, 1102b constant, as shown by the following chart:

| FIG. | Rotation (Radians) | Rotor 1102a | Rotor 1102b | Stator 1302a | Stator 1302b | Effect |
|---|---|---|---|---|---|---|
| 13A | 0 | + | − | + | − | hard push |
| 13B | π/4 | + | − | + | − | soft push-pull |
| 13C | π/2 | + | − | + | − | push-pull |
| 13D | 3π/4 | 0 | 0 | + | − | hard pull momentum |
| 13E | π | − | + | + | − | hard pull |
| 13F | 5π/4 | − | + | + | − | pull soft-push |
| 13G | 3π/2 | − | + | + | − | pull-push |
| 13H | 7π/4 | 0 | 0 | + | − | hard push |

Such forces may also apply to stator electrodes that are placed internally, such as, for example, a stator electrode placed between two rotors that include electrodes.

Such a design for the rotors and stators shown in FIGS. 11-13 may be used to alter and change a capacitive coupling between the rotor electrodes 1102 and the correspondingly shaped stator electrodes as compared to conventional rotor and stator electrodes (e.g., rotors 102 and corresponding stators). For example, primary field effects may occur in the conventional rotor and stator electrodes when the leading edges 110 of the electrodes in the rotors 102 initially meet with a leading edge of the corresponding electrodes in the stators, at which point current draw and charge movement may begin. The primary field effect may increase as the rotor and the stator increasingly overlap. The field forces on the electrodes on the rotor 102 continue to increase until the electrodes completely align with and overlay the corresponding stator electrodes such that the electric potentials on the rotor electrodes and stator electrodes are the same. At this point, the secondary portion of a waveform for the electric potentials begins. This process may result in a more uniform and sinusoidal waveform output.

The rotors and stators discussed in FIGS. 11-13 may change the electrical field effects and forces by altering the rotational surface angle and positional relationships between the rotor electrodes 1102 and the stator electrodes. Such alterations may result in an advantageously altered sinusoidal waveform output. Such changes may result in one or more of the following results: changing in the shifting of the third harmonic interferences that may be inherent in the conventional configuration and circuitry that is imposed in smoothing out the harmonic force overlays; reducing rotor-stator shaft strains by smoothing the output; during a braking mode, providing a field that opposes slowing or braking power production cycle, that smooths and/or reduces pulsate mode, and that provides better timing of the peaks and surface area overlap and timing; and pre-position through switching and use of over or under positioning, or radially positioning, in relative proximities over, under, or between specific rotor and stator electrode positions, thereby resulting in improved or even optimal fixed RPM ratings and improved effects on waveform production. Such may allow for the accumulation of additional inertia (rotational) prior to engaging a load, and may provide for shifts in the relative frequency of the input current and power output cycle.

In some implementations, capacitive coupling may be used to facilitate the rotation of the rotor electrode. Such capacitive coupling may be used to modify the surface charge density by controlling the frequency of the applied field to the electrodes. Increasing the charge density on the electrodes may be used to increase the attractive or repulsive forces between the rotor and stator electrodes to enhance the pull (attractive) or push (repulsive) provided from the stator electrode to the rotor electrode.

In some implementations, tuned coupled may be used to facilitate the rotation of the rotor electrode. Tuned coupling may be used to tune the output of one component to the input of another component at a narrow frequency band. Such tuned coupling across multiple frequencies may result in mutual inductances of the primary and secondary windings on the rotor and stator electrodes, in which such mutual inductances may be changed with the distance between the electrodes.

In some implementations, circuits and elements internal to the motor may be used to increase the power output of the generator without increasing the charging power supply voltage. As such, a band of resonant frequencies of a circuit comprised of the charging inductance and a variable capacity of the electrostatic motor/generator may overlap with the output frequency of the generator, thereby resulting in a resonance that may increase the AC voltage and power output without increasing the voltage of a charging power supply. In addition, such capacitances may be used such that applying power to the generator at a proper frequency and phase may result in a resonant enhancement for the power transfer rate that may be, for example, four times greater or more, than a motor/generator without such capacitance.

Figure 14:
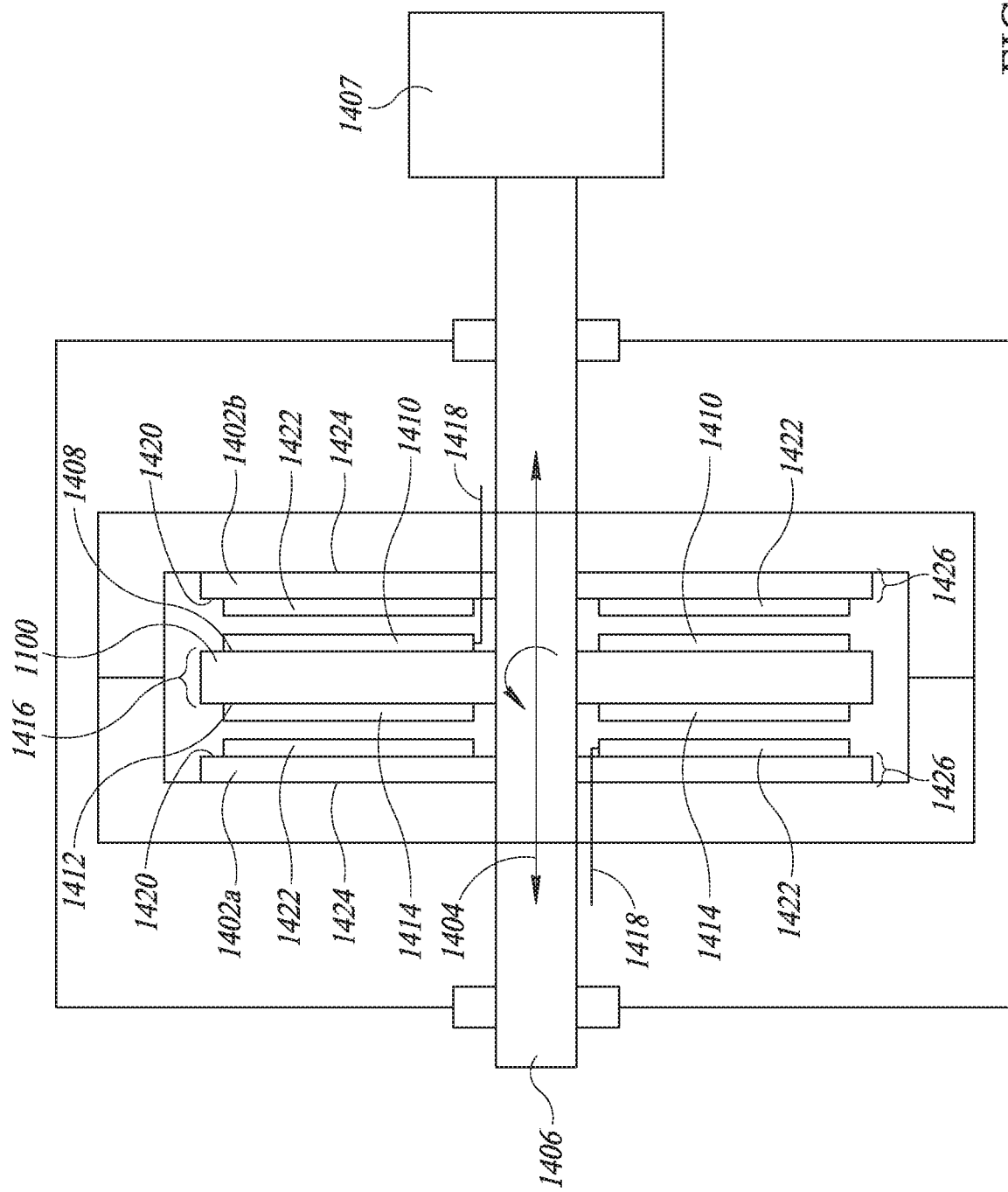
FIG. 14 is a side plan view of a rotor and two half stators arranged relative to an interior axle that runs along an axis of rotation, according to at least one illustrated implementation.

FIG. 14 shows a side view of a machine 1400 that includes a rotor 1100 and two half stators 1402a, 1402b, in which the rotor 1100 rotates relative to a central axis 1404. A shaft 1406 may run along the central axis 1404 and be mechanically coupled to the rotor 1100, such that the rotor 1100 may provide a rotation force on the shaft 1406, which may, in turn, be mechanically coupled and thereby transfer the rotational force to a gear box 1407. The rotor 1100 may have a first major face 1408 that carries a first set of rotor electrodes 1410 and that is directed towards the load, and a second major face 1412 that carries a second set of rotor electrodes 1414 and that is directed away from the load. The first set of rotor electrodes 1410 and/or the second set of rotor electrodes 1414 may be arranged radially around the central axis 1404. The first major face 1408 and the second major face 1412 may be parallel and opposed to each other across a thickness 1416. The first major face 1408 may carry the first set of rotor electrodes 1410 in a first plane, and the second major face 1412 may carry the second set of rotor electrodes 1414 in a second plane, where the first plane is parallel to the second plane. One or more electrical connections 1418 may be used to apply charge to or remove charge from the first set of rotor electrodes 1410 and/or the second set of rotor electrodes 1414.

The half stator 1402a, 1402b (generically, "half stator 1402") may have a first major face 1420 that carries a first set of stator electrodes 1422, and a second major face 1424. In some implementations, such as, for example, with the use of a full stator disc, the second major face 1424 may carry a second set of stator electrodes (not shown). The first set of stator electrodes 1422 may be arranged radially around the central axis 1404. The first major face 1420 and the second major face 1424 may be parallel and opposed to each other across a thickness 1426. The first major face 1420 may carry the first set of stator electrodes 1422 in a third plane, where the third plane is parallel to one or both of the first plane formed by the first set of rotor electrodes 1410 and the second plane formed by the second set of rotor electrodes 1414. In some implementations, the half stator 1402 may be comprised of a phenolic compound that is non-conductive and has a high tensile strength. In some implementations, the stator electrodes 1422 may be formed within the half stator 1402 such that the third plane may contain the first major face 1420, which may result in voltage variation to reduce switching electrical costs. In some implementations, additional rotors (e.g., two rotors, three rotors, or more rotors) may be mechanically coupled to the rotor 1100 along the central axis 1404 and provide a rotation force on the shaft 1406. Such additional rotors may have corresponding stators interleaved between the additional rotors. In some implementations, a pulse width modulated inverter may be used for control with low harmonic output distortion and with transistors for switching to avoid high frequency noise. Also to situations involving multiple rotors and rotor electrodes.

FIGS. 15A-15F show various configurations for providing a variable gap distance 1500 between a rotor electrode 1502 and an adjacent stator electrode 1504. The variable gap distances may be used, for example, to provide variable capacitance effects because capacitance is inversely proportional to the distance between two capacitive plates:

$$C = \frac{\varepsilon_0 A}{d} \qquad \text{Equation 4}$$

C=Capacitance
$\varepsilon_0$=permittivity of free space
A=overlapping area of capacitive plates
d=distance between parallel capacitive plates The variable gap distances may be used to provide variable electrical forces per Equation 2 when the rotor electrode 1502 and the stator electrode 1504 are electrically charged.

Figure 15A:
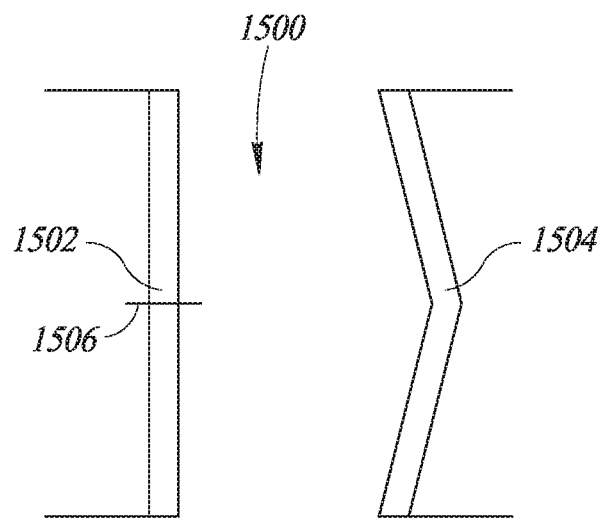
FIG. 15A is a side plan view of a rotor-stator interface in which the rotor is flat and the stator is deeply notched, according to at least one illustrated implementation.
Figure 15B:
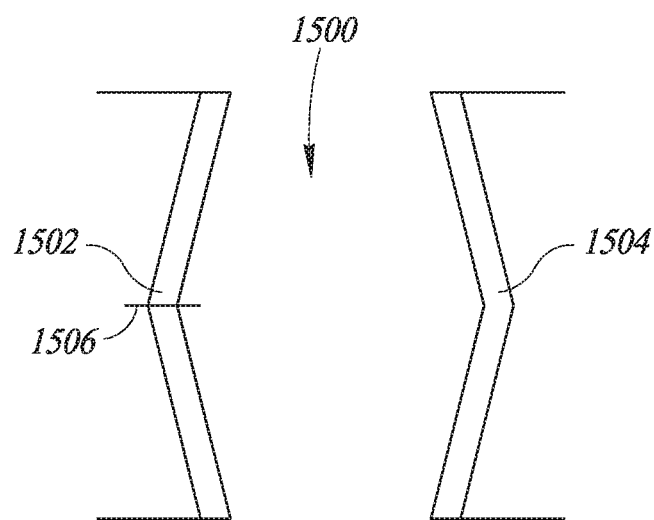
FIG. 15B is a side plan view of a rotor-stator interface in which the rotor is deeply notched and the stator is deeply notched, according to at least one illustrated implementation.
Figure 15C:
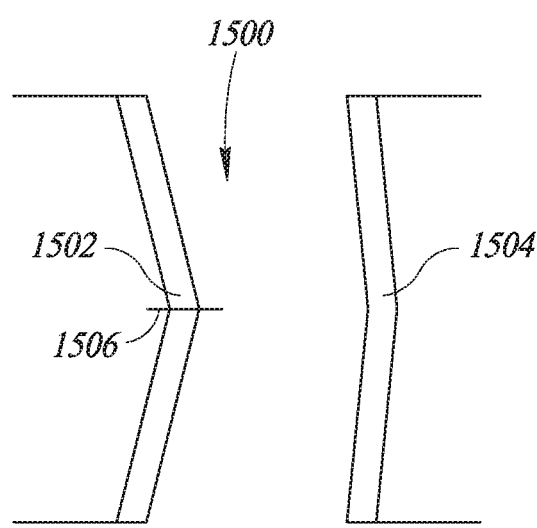
FIG. 15C is a side plan view of a rotor-stator interface in which the rotor is pointed and the stator is shallowly notched, according to at least one illustrated implementation.
Figure 15D:
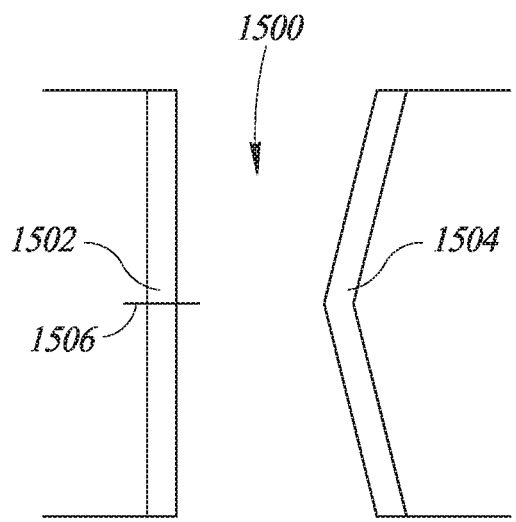
FIG. 15D is a side plan view of a rotor-stator interface in which the rotor is flat and the stator is pointed, according to at least one illustrated implementation.
Figure 15E:
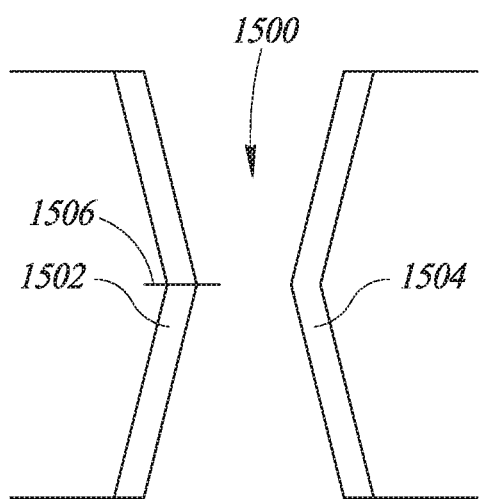
FIG. 15E is a side plan view of a rotor-stator interface in which the rotor is pointed and the stator is pointed, according to at least one illustrated implementation.
Figure 15F:
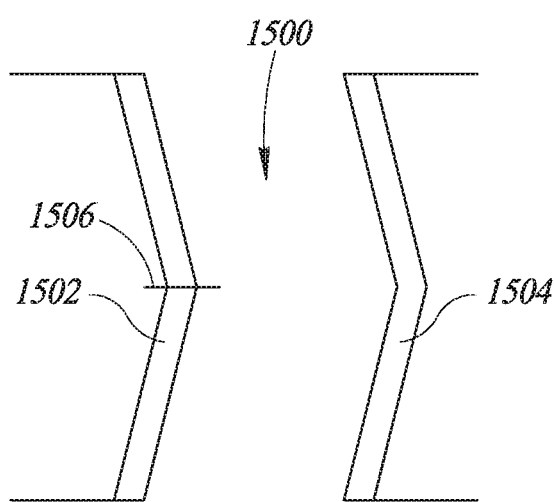
FIG. 15F is a side plan view of a rotor-stator interface in which the rotor is pointed and the stator is shallowly notched, according to at least one illustrated implementation.

As shown in FIG. 15A the rotor electrode 1502 may have a flat face and the stator electrode 1504 may have a deeply notched face. FIG. 15B shows the rotor electrode 1502 with a deeply notched face and the stator electrode 1504 with a deeply notched face. FIG. 15C shows the rotor electrode 1502 with a pointed face and the stator electrode 1504 with a shallow notched face. FIG. 15D shows the rotor electrode 1502 with a flat face and the stator electrode 1504 with a pointed face. FIG. 15E shows the rotor electrode 1502 with a pointed face and the stator electrode 1504 with a pointed face. FIG. 15F shows the rotor electrode 1502 with a pointed face and the stator electrode 1504 with a shallow notched face. The rotor electrode 1502 rotates about a center of rotation 1506. Such variations in the rotor electrode 1502 and the stator electrode 1504 result in a variable gap distance 1508 that varies radially when moving from the center of rotation 1506 outwards towards an outer edge of the rotor electrode 1502. The variable gap distance 1508 may be used to control the distribution of strain on the rotor electrode 1502 and the stator electrode 1504 because the amount of strain present on the rotor electrode 1502 during rotation is inversely proportional to the gap distance 1508 between the rotor electrode 1502 and the stator electrode 1504. As such, the location(s) of greatest strain on the rotor electrode 1502 may be modified across the radius of the rotor electrode 1502 by changing the location(s) at which the variable gap distance 1508 is the least. The location(s) of the least strain on the rotor electrode 1502 may be modified across the radius of the rotor electrode 1502 by changing the location(s) at which the variable gap distance 1508 is the greatest. The location at which the greatest strain is placed on the rotor electrode 1502 may depend, at least in part, on a number of factors, including for example, the material strength for the rotor, the stator, and the respective rotor electrodes 1502 and stator electrodes 1504, the angular velocity at which the rotor electrode 1502 rotates, the thickness of the rotor and rotor electrode 1502, and the stator and stator electrode 1504, and the load being driven by the rotors. The variable gap distance 1508 may be used to shift the frequency spectrum of vibrations generated by the rotor when rotating. Such shifts may be useful, for example, to counteract, disperse, or otherwise partially or fully negate the occurrence of harmful harmonics (e.g., the third harmonic) that arises due to the rotation.

In some implementations, the structures of the rotor electrode 1502 and the stator electrode 1504 may impact the stability of the rotor during rotation. For example, implementations in which the rotor electrode 1502 and the stator electrode 1504 form complementary concave and convex surfaces (e.g., FIGS. 15C and 15F) may cause a centering force to arise in which the rotor electrode 1502 maintains rotation around the center of rotation 1506. In some implementations in which the rotor electrode 1502 and the stator electrode 1504 have opposing convex or concave surfaces (e.g., FIGS. 15B and 15E) may increase instability during rotation, by introducing a wobbling force when the rotor electrode 1502 rotates about the center of rotation 1506.

Figure 16A:
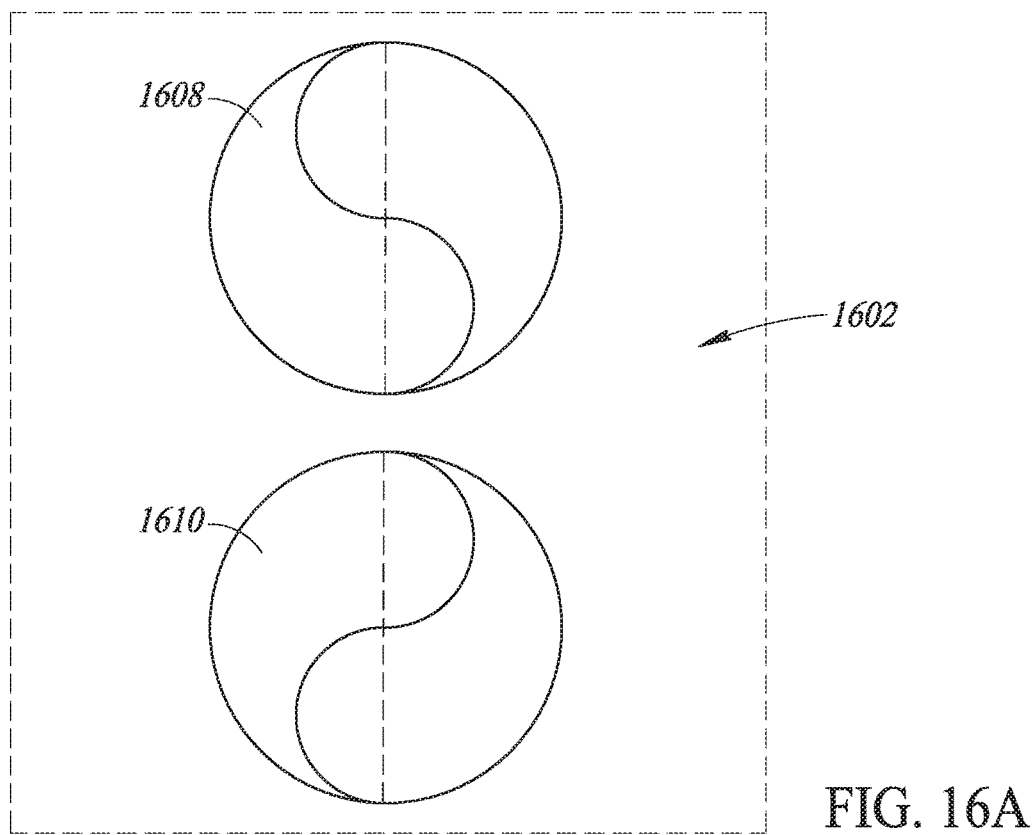
FIG. 16A is a plan view of profiles of two opposing sides of a rotor with two electrodes on each of the two opposing sides arranged in a Yin-Yang formation, according to at least one illustrated implementation.
Figure 16B:
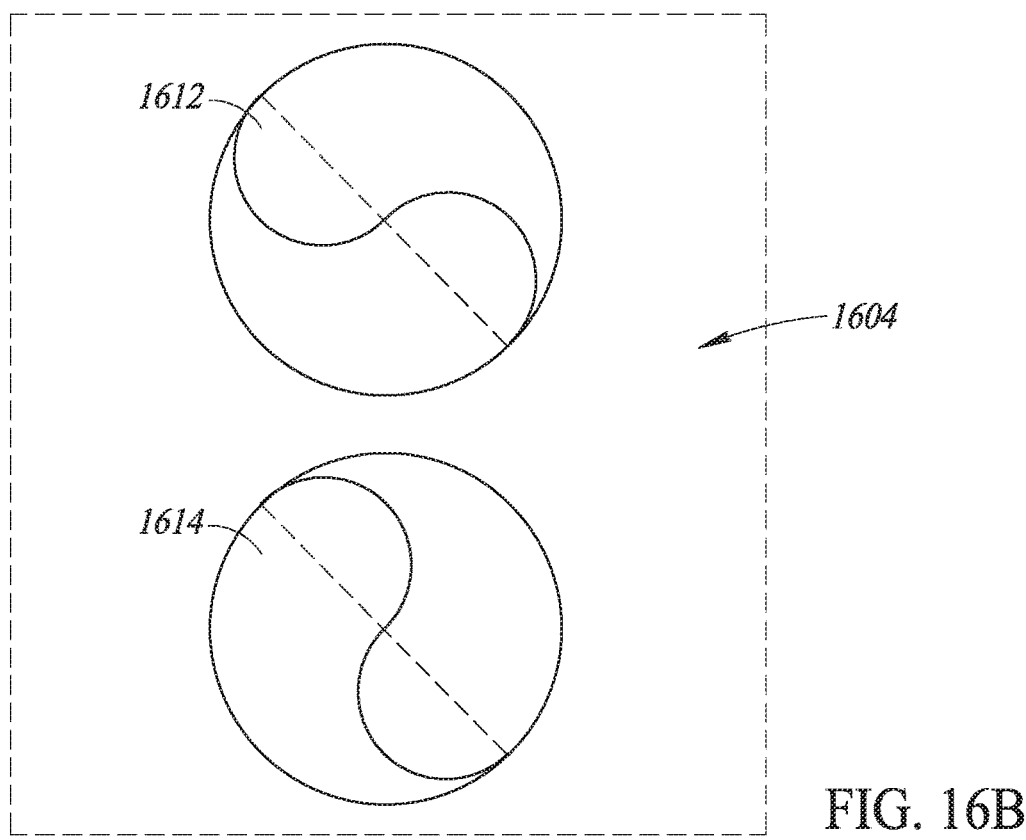
FIG. 16B is a plan view of profiles of two opposing sides of a rotor that is symmetric to the one shown in FIG. 16A and offset by $2\pi/3$ radians, according to at least one illustrated implementation.
Figure 16C:
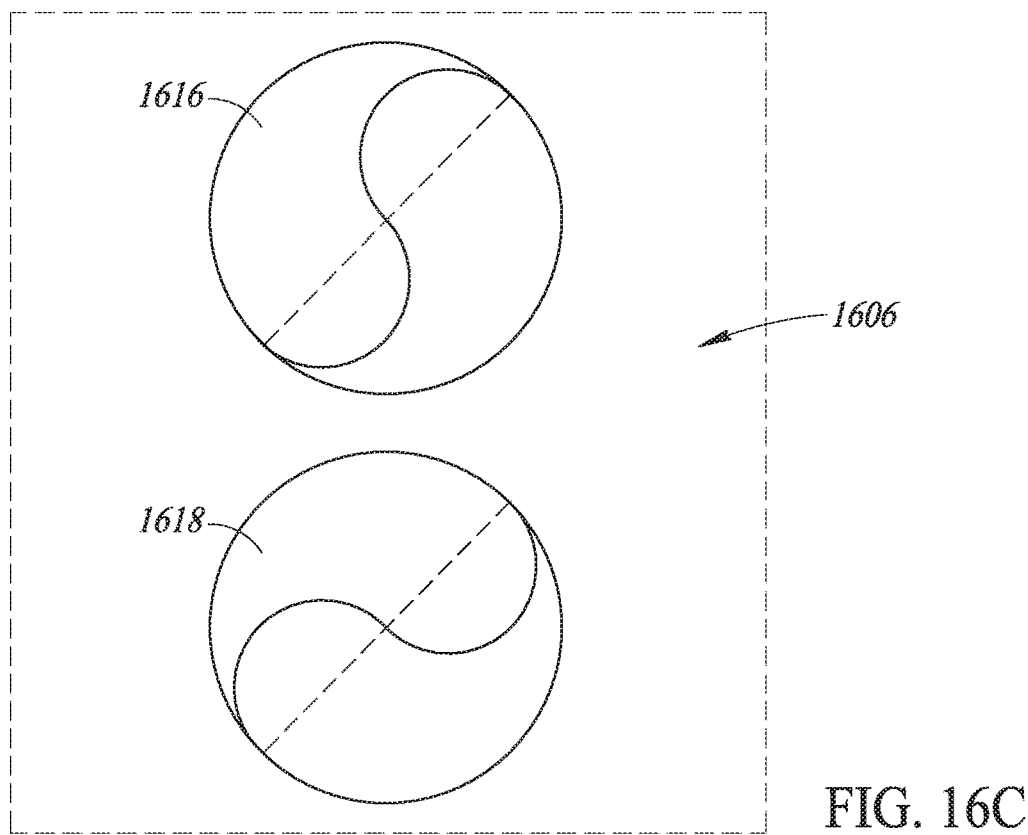
FIG. 16C is a plan view of profiles of two opposing sides of a rotor that is symmetric to the one shown in FIG. 16A and offset by $4\pi/3$ radians, in which the rotors shown in FIGS. 16A, 16B, and 16C may be used in a multi-rotor device, according to at least one illustrated implementation.

FIGS. 16A-16C show the major faces for a set of symmetrical rotor discs, first rotor 1602, second rotor 1604, and third rotor 1606, that may collectively be used in a multi-rotor machine. The first rotor 1602 may have a first major face 1608 and an opposing second major face 1610, each of which includes a symmetric set of two rotor electrodes. The second rotor 1604 may have a first major face 1612 and an opposing second major face 1614, each of which includes a symmetric set of two rotor electrodes. The symmetric set of two rotor electrodes carried by the second rotor 1604 may be offset from the symmetric set of two rotor electrodes carried by the first rotor 1602 by $2\pi/3$ radians. The third rotor 1606 may have a first major face 1616 and an opposing second major face 1618, each of which includes a symmetric set of two rotor electrodes. The symmetric set of two rotor electrodes carried by the third rotor 1606 may be offset from the symmetric set of two rotor electrodes carried by the first rotor 1602 by $-2\pi/3$ radians. By offsetting each set of symmetrical electrodes on the first rotor 1602, the second rotor 1604, and the third rotor 1606, the rotational force provided by the set of discs may be substantially smoothed out. In some implementations, such a configuration of the first rotor 1602, the second rotor 1604, and the third rotor 1606 may provide capacitive load change compensation through phase shift control and modulation as the first rotor 1602, second rotor 1604, and third rotor 1606 rotate relative to the central shaft. In some implementations, the offsetting of each set of electrodes may result in shifting the fundamental frequency of the system during operation and may thereby interfere with potential harmful harmonic frequencies (e.g., the third harmonic) that might occur.

Figure 17A:
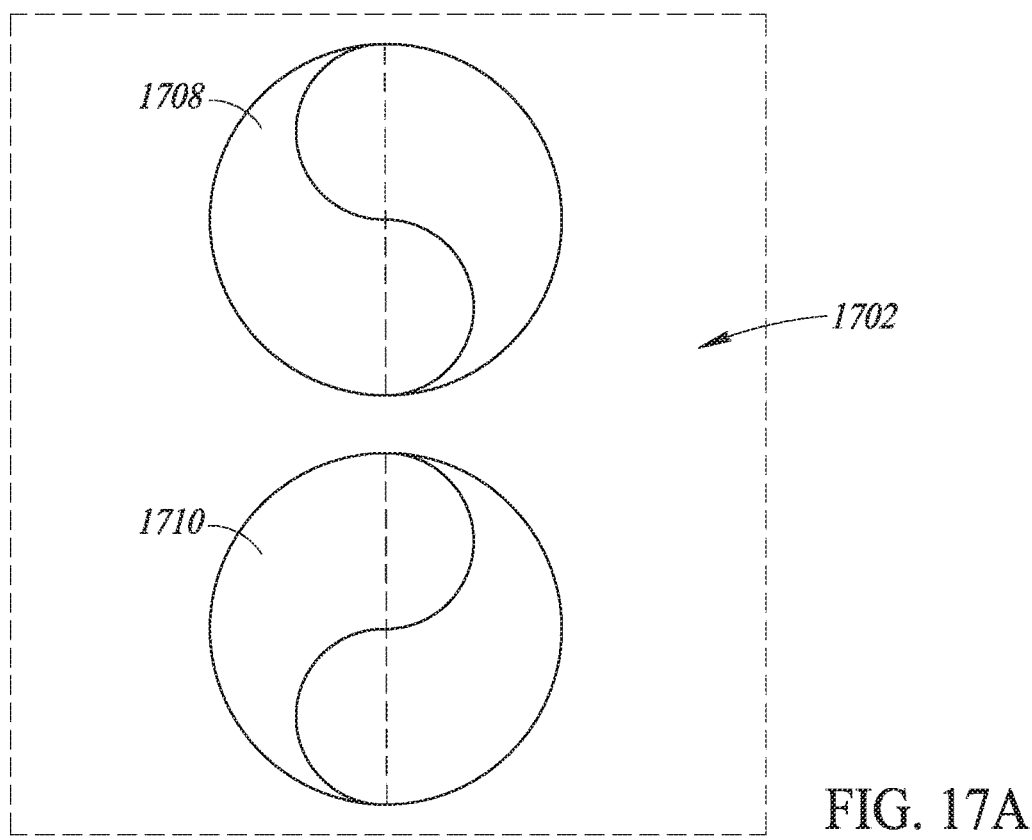
FIG. 17A is a plan view of profiles of two opposing sides of a rotor with two electrodes on each of the two opposing sides arranged in a Yin-Yang formation, according to at least one illustrated implementation.
Figure 17B:
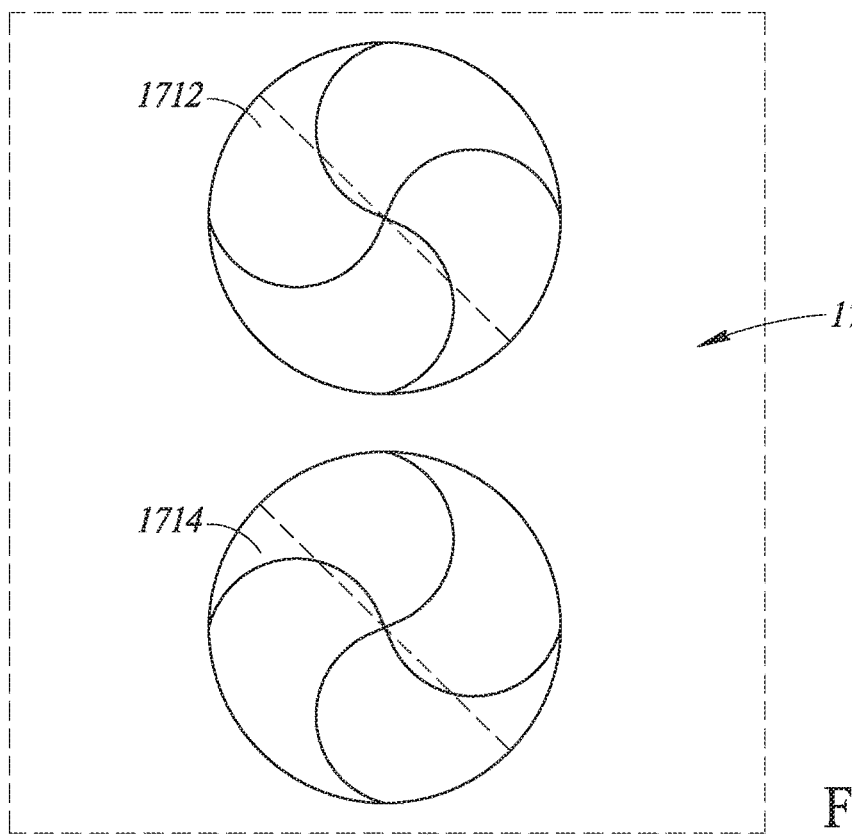
FIG. 17B is a plan view of profiles of two opposing sides of a rotor with four electrodes on each side, according to at least one illustrated implementation.
Figure 17C:
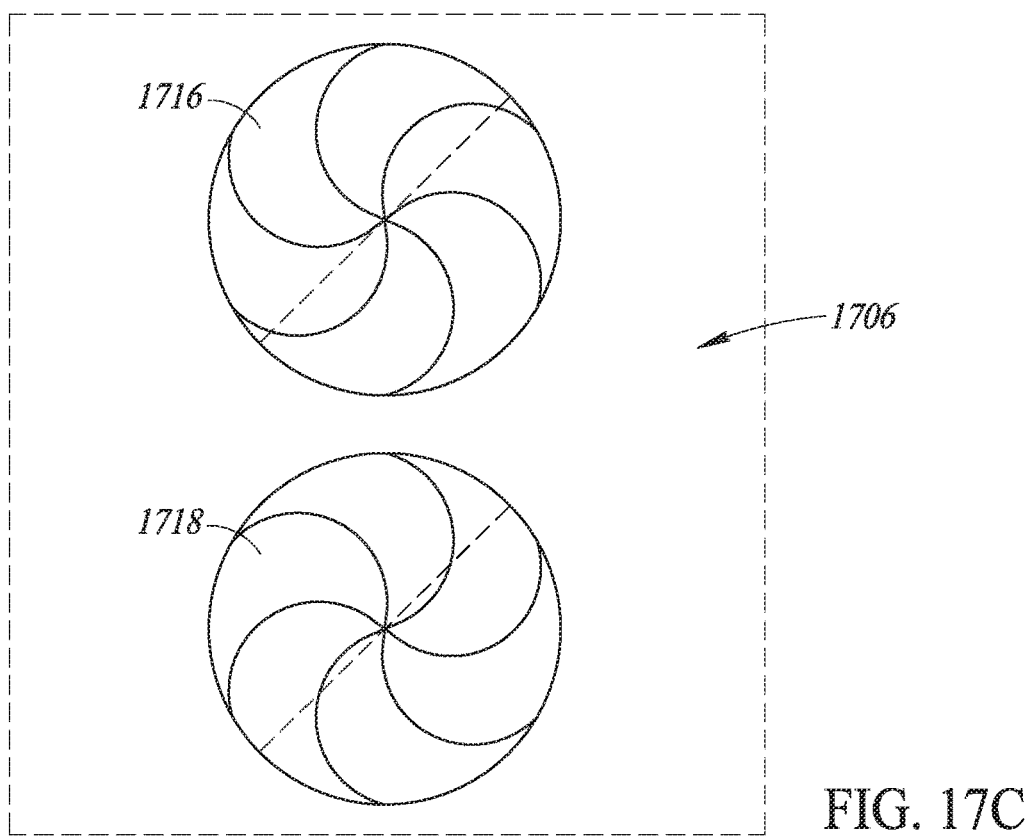
FIG. 17C is a plan view of profiles of two opposing sides of a rotor with eight electrodes on each side, in which the rotors shown in FIGS. 17A, 17B, and 17C may be used in a multi-rotor device, according to at least one illustrated implementation.

FIGS. 17A-17C show the major faces for a set of symmetrical rotor discs, first rotor 1702, second rotor 1704, and third rotor 1706, that may collectively be used in a multi-rotor machine, in at least one illustrated implementation. Each of the first rotor 1702, the second rotor 1704, and the third rotor 1706 may be physically coupled to and rotate relative to a common shaft that extends through the center of each rotor disc. Each successive rotor disc may carry an increasing number of rotor electrodes. For example, in at least some implementations, each major face 1708, 1710 of the first rotor 1702 carries two rotor electrodes, each major face 1712, 1714 of the second rotor 1704 carries four rotor electrodes, and each major face 1716, 1718 of the third rotor 1706 carries eight rotor electrodes. In some implementations, the symmetric set of four rotor electrodes carried by the second rotor 1704 may be offset from the symmetric set of two rotor electrodes carried by the first rotor 1702 by $2\pi/3$ radians; the symmetric set of eight rotor electrodes carried by the third rotor 1706 may be offset by $-2\pi/3$ radians from the symmetric set of two rotor electrodes carried by the first rotor 1702.

In some implementations, the first rotor 1702 with two sets of two rotor electrodes may be located closest to a load mechanically coupled via the central shaft. The second rotor 1704 may be located relatively further away from the load in comparison to the first rotor 1702, and may be separated from the first rotor 1702 by a first interleaved stator disc. The third rotor 1706 may be located relatively further away from the load in comparison to the second rotor 1704, and may be separated from the second rotor 1704 by an second interleaved stator disc. Such a configuration of the first rotor 1702, the second rotor 1704, and the third rotor 1706 may reduce the strain placed on the rotors located relatively further away from the load. In some implementations, such a configuration may enable a wider range of rotational speeds for a given power input, and potentially reduce harmful harmonics that might arise. In some implementations, the third rotor 1706 may be placed closest to that load and have a higher applied potential than either the second rotor 1704 or the first rotor 1702. Such an implementation may enable a wider range of rotational speeds for a given power input, and potentially reduce harmful harmonics that might arise.

Figure 17D:
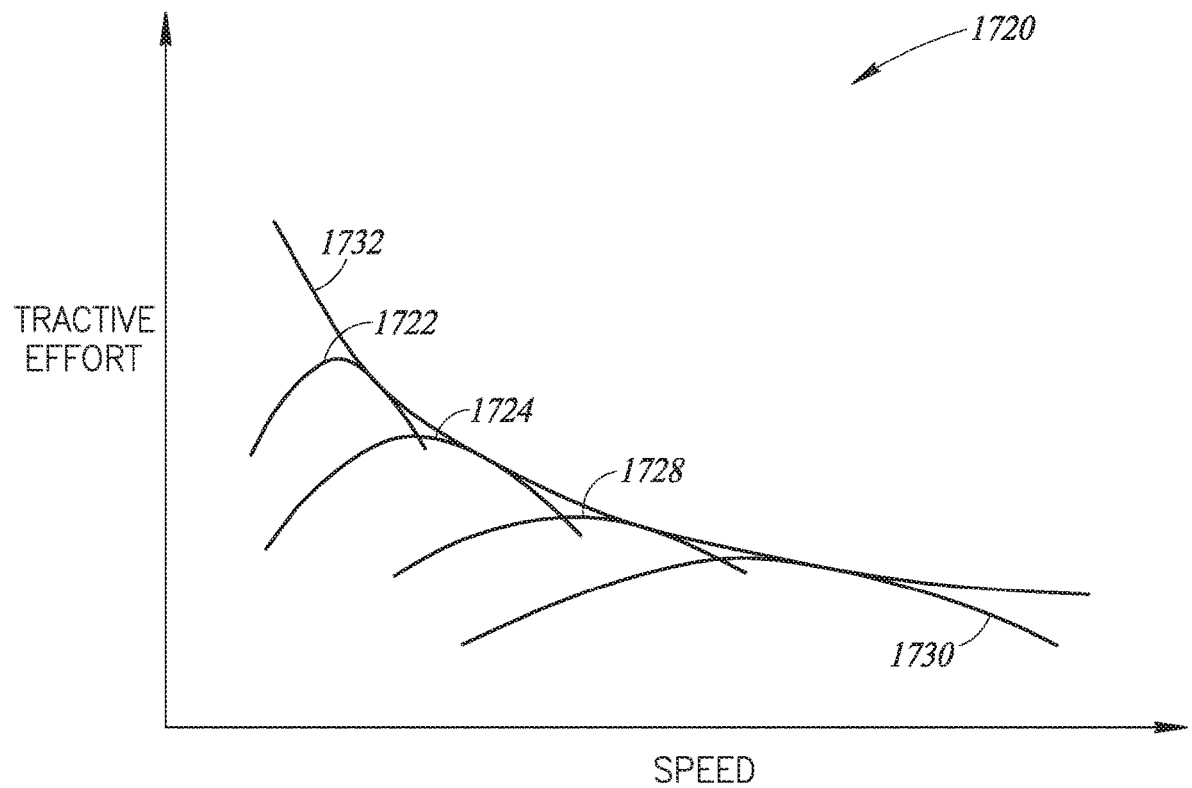
FIG. 17D is a graph showing an exemplary plot of a traction provided by the rotors having a variable number of rotor electrodes as compared to the speed of the rotor, according to at least one illustrated implementation.

FIG. 17D shows an exemplary plot 1720 that shows the traction provided by a set of rotors each having a different number of rotor electrodes, as compared to the speed of the rotors. The first arc 1722 may represent a speed-traction curve for a rotor with two rotor electrodes. The second arc 1724 may represent a speed-traction curve for a rotor with four rotor electrodes. The third arc 1728 may represent a speed-traction curve for a rotor with three rotor electrodes. The fourth arc 1730 may represent a speed-traction curve for a rotor with eight rotor electrodes. As shown, the rotors with an increasing number of rotor electrodes may rotate at a higher speed but provide less traction. The four curves for the four rotors may result in an overall speed-traction curve 1732 in which the rotors may operate as respective gears for the motor-generator. The amount and extent of any overlap, may be modified to change the speed-traction curve associated each rotor. Such modification may be used to reduce the size and/or depth of the gaps that occur between curves for successive rotors.

Figure 18A:
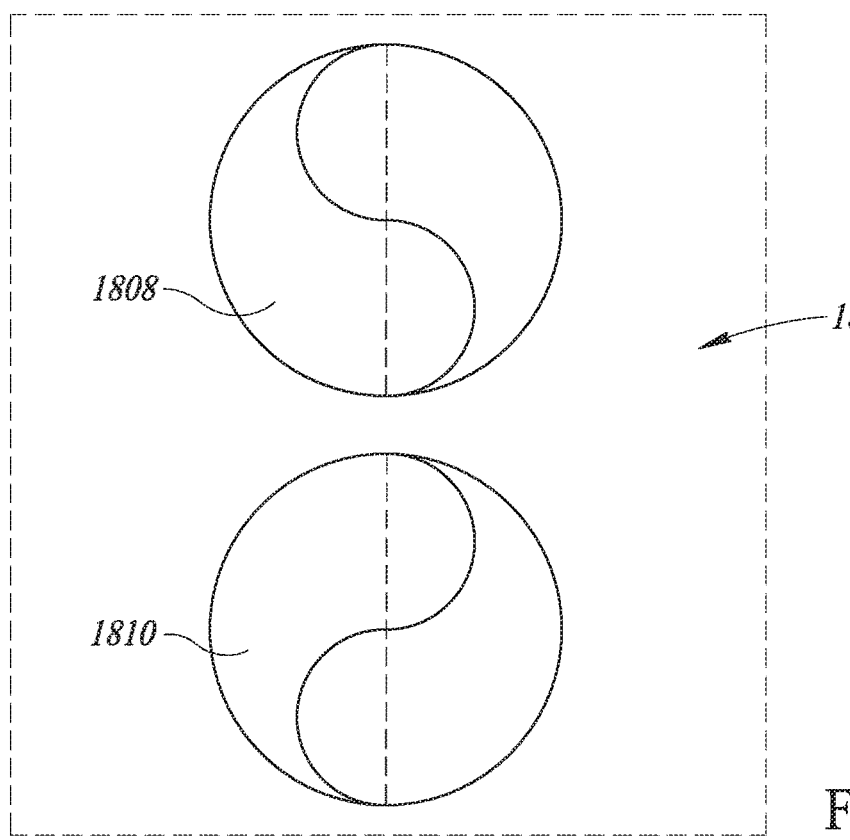
FIG. 18A is a plan view of profiles of two opposing sides of a rotor with two electrodes on each of two opposing sides arranged in a Yin-Yang formation, according to at least one illustrated implementation.
Figure 18B:
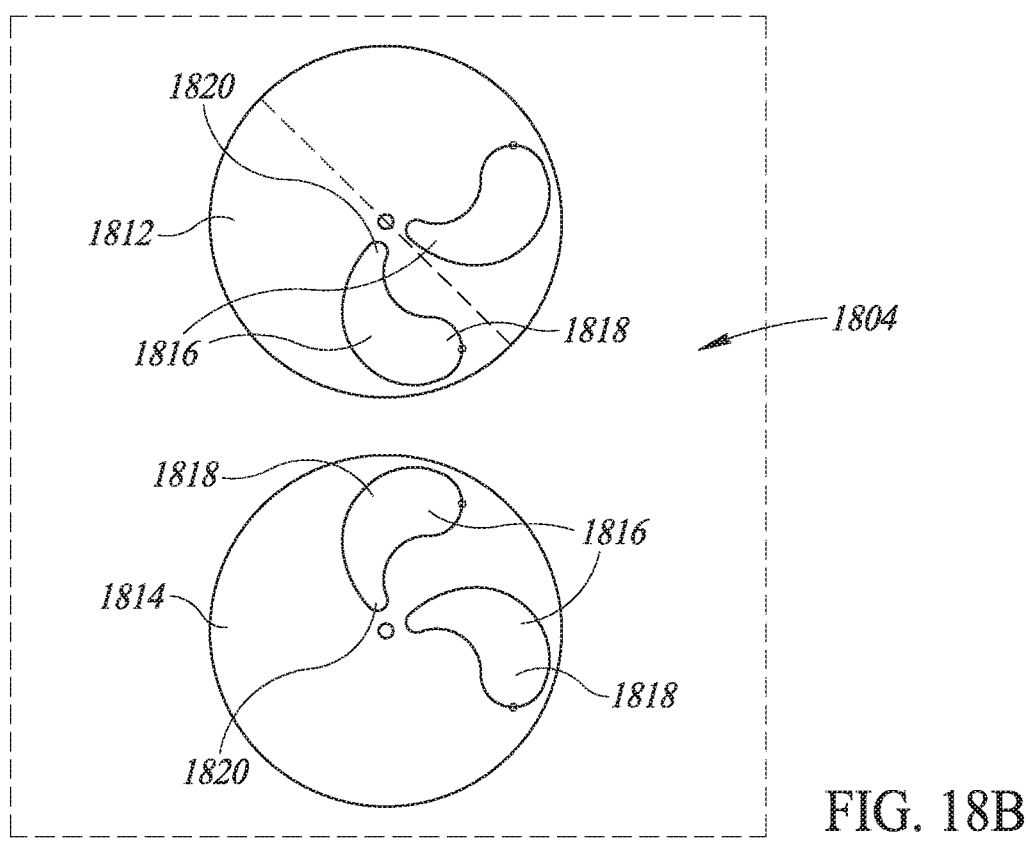
FIG. 18B is a plan view of profiles of two opposing sides of a rotor with four electrodes on each side, with each of the electrodes arranged with tips facing inward, according to at least one illustrated implementation.
Figure 18C:
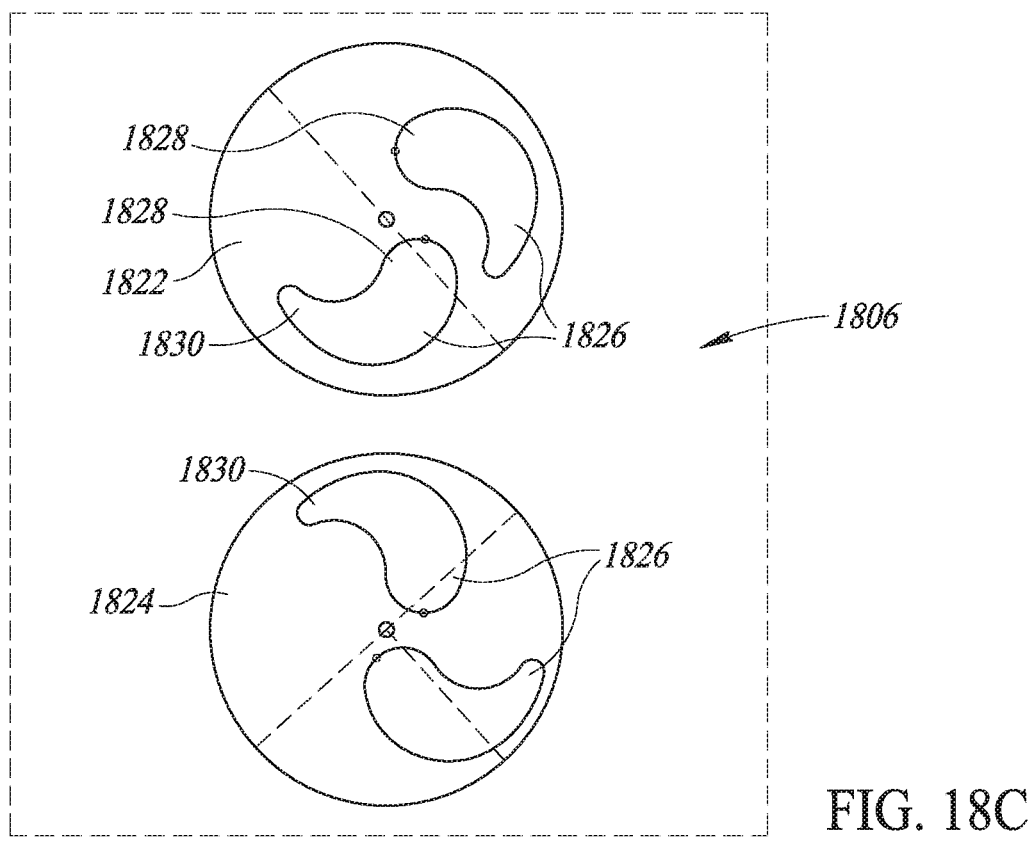
FIG. 18C is a plan view of profiles of two opposing sides of a rotor with four electrodes on each side, with each of the electrodes arranged with tips facing outward, in which the rotors shown in FIGS. 18A, 18B, and 18C may be used in a multi-rotor device, according to at least one illustrated implementation.

FIGS. 18A-18C show the major faces for a set of symmetrical rotor discs, first rotor 1802, second rotor 1804, and third rotor 1806, that may collectively be used in a multi-rotor machine. Each of the first rotor 1802, the second rotor 1804, and the third rotor 1806 may be physically coupled to and rotate relative to a common central shaft that extends through the center of each rotor disc. Each major face 1808, 1810 of the first rotor 1802 carries two rotor electrodes arranged in a Yin-Yang configuration. Each major face 1812, 1814 of the second rotor 1804 includes two tip-out rotor electrodes 1816 where the electrode tip occurs at the larger end of the electrodes 1816. Each tip-out rotor electrode may include a relatively larger, bulbous end 1818 that includes the tip and that gradually curves radially inward towards the center of the second rotor 1804 and tapers to a rounded tail 1820. Each major face 1822, 1824 of the third rotor 1806 includes two tip-in rotor electrodes 1826. Each tip-in rotor electrode may include a relatively larger, bulbous end 1828 that gradually curves radially outward towards the circumference of the third rotor 1806 and tapers to a rounded tail 1830.

In some implementations, the first rotor 1802 may be located closest to a load mechanically coupled via the central shaft. The second rotor 1804 may be located relatively further away from the load in comparison to the first rotor 1802, and may be separated from the first rotor 1802 by a first interleaved stator disc. The third rotor 1806 may be located relatively further away from the load in comparison to the second rotor 1804, and may be separated from the second rotor 1804 by an second interleaved stator disc. Such a configuration of the first rotor 1802, the second rotor 1804, and the third rotor 1806 may provide capacitive load change compensation through phase shift control and modulation as the first rotor 1802, second rotor 1804, and third rotor 1806 rotate relative to the central shaft. By offsetting each set of symmetrical electrodes on the first rotor 1802, the second rotor 1804, and the third rotor 1806, the rotational force provided by the set of rotors may be substantially smoothed out and customized to meet load demand through advances and delays in rotational inertia. Offsetting the electrodes on the set of rotors 1802, 1804, and 1806 may result in shifting the fundamental frequency of the system during operation and may thereby interfere with potential harmful harmonic frequencies (e.g., the third harmonic) that might occur.

Figure 19A:
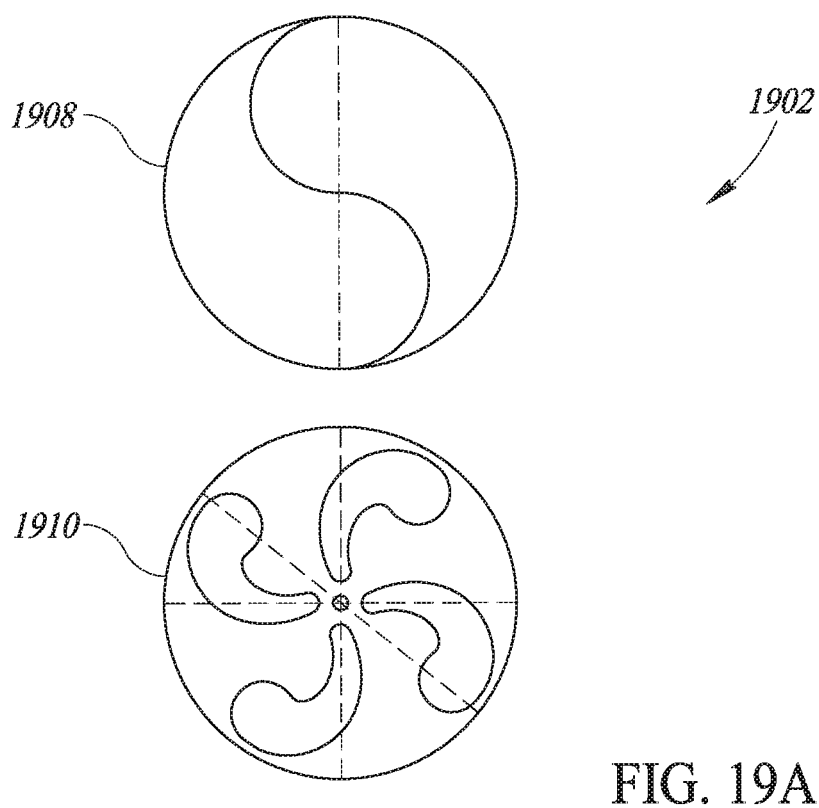
FIG. 19A is a plan view of profiles of two opposing sides of an asymmetric rotor with two electrodes on a first side arranged in a Yin-Yang formation and four electrodes on a second side arranged with tips facing inward, according to at least one illustrated implementation.
Figure 19B:
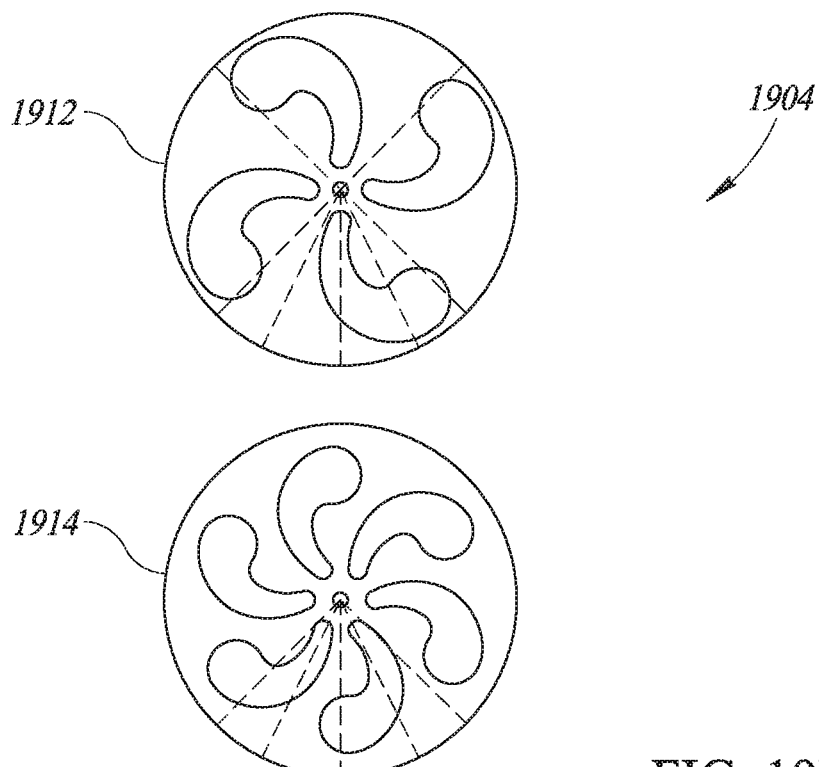
FIG. 19B is a plan view of profiles of two opposing sides of an asymmetric rotor with four electrodes on a first side arranged with tips facing inward and six electrodes on a second side arranged with tips facing inward, according to at least one illustrated implementation.
Figure 19C:
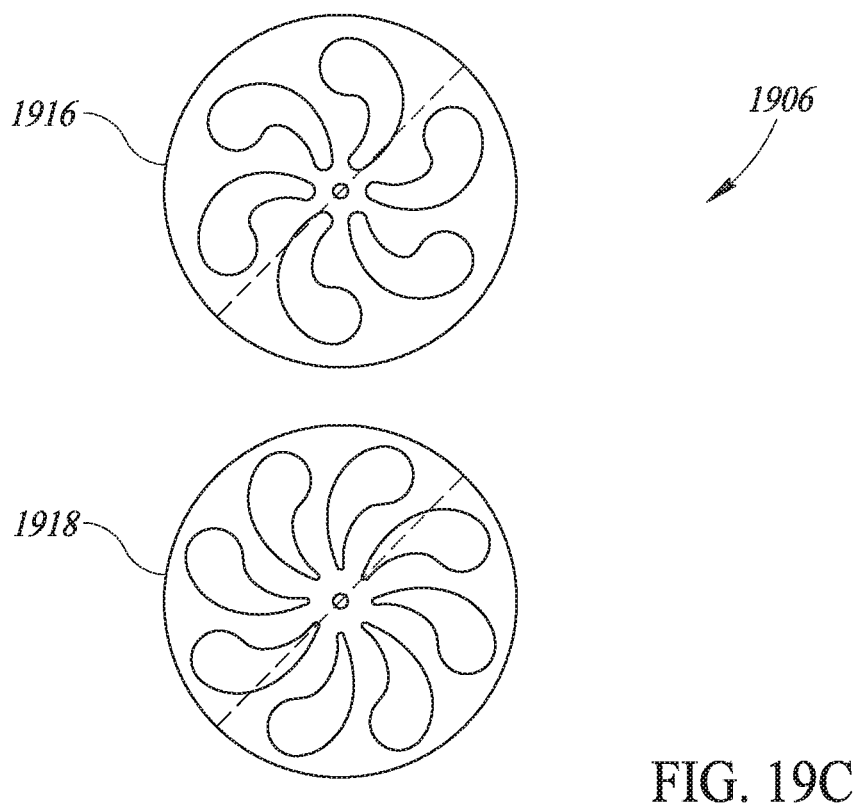
FIG. 19C is a plan view of profiles of two opposing sides of an asymmetric rotor with six electrodes on a first side arranged with tips facing inward and eight electrodes on a second side arranged with tips facing inward, in which the rotors shown in FIGS. 19A, 19B, and 19C may be used in a multi-rotor device, according to at least one illustrated implementation.

FIGS. 19A-19C show the major faces for a set of asymmetrical rotor discs, first rotor 1902, second rotor 1904, and third rotor 1906, that may collectively be used in a multi-rotor machine. The inside major face 1908 of the first rotor 1902 closest to the load carries two rotor electrodes arranged in a Yin-Yang configuration. The outside major face 1910 of the first rotor 1902 facing away from the load carries four tip-out rotor electrodes arranged symmetrically around the center of the outside major face 1910. The inside major face 1912 of the second rotor 1904 facing towards the load carries four tip-out rotor electrodes arranged symmetrically around the center of the inside major face 1912. The outside major face 1914 of the second rotor 1904 facing away from the load carries six tip-out rotor electrodes arranged symmetrically around the center of the outside major face 1914. The inside major face 1916 of the third rotor 1906 facing towards the load carries six tip-out rotor electrodes arranged symmetrically around the center of the inside major face 1916. The outside major face 1918 of the third rotor 1906 facing away from the load carries eight tip-out rotor electrodes arranged symmetrically around the center of the outside major face 1918.

In some implementations, the first rotor 1902 may be located closest to a load mechanically coupled via the central shaft. The second rotor 1904 may be located relatively further away from the load in comparison to the first rotor 1902, and may be separated from the first rotor 1902 by a first interleaved stator disc. The third rotor 1906 may be located relatively further away from the load in comparison to the second rotor 1904, and may be separated from the second rotor 1904 by a second interleaved stator disc. Such a configuration of the first rotor 1902, the second rotor 1904, and the third rotor 1906 may provide expanded power output range and internal load change compensation through reactive power transfer. In some implementations, the rotational force provided by the set of rotors 1902, 1904, and 1906 may be substantially smoothed out and customized to meet load demand through advances and delays in rotational inertia.

Figure 20:
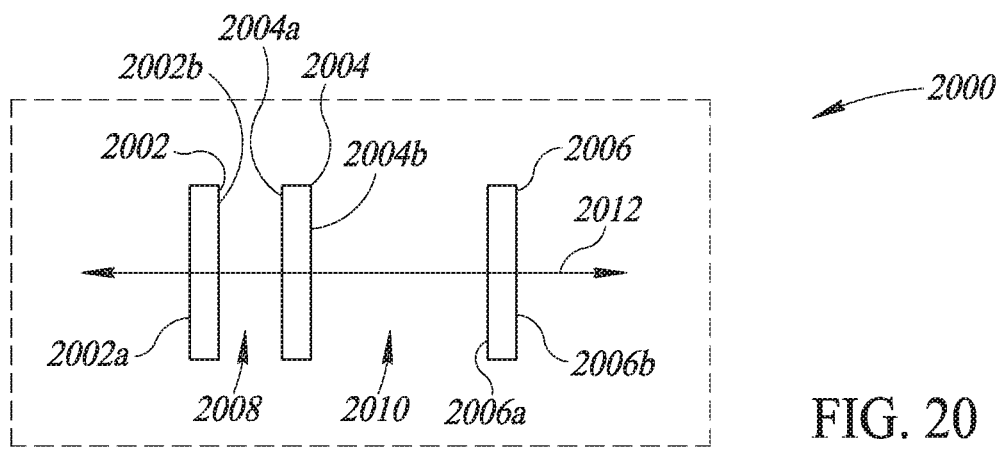
FIG. 20 is a side plan view of a multi-rotor device that has differential gaps between successive adjacent rotors, according to at least one illustrated implementation.

FIG. 20 shows a multi-rotor device 2000 that has differential gaps between successive adjacent, parallel rotors, a first rotor 2002, a second rotor 2004, and a third rotor 2006. Accordingly, in some implementations, the first rotor 2002 and the second rotor 2004 may be separated by a first constant gap 2008, and the second rotor 2004 and the third rotor 2006 may be separated by a second constant gap 2010, where the first constant gap 2008 is less than the second constant gap 2010. Each of the first rotor 2002, the second rotor 2004, and the third rotor 2006 may be optionally coupled to, and may rotate relative to a central shaft 2012 that extends through the center of the rotors. The first rotor 2002, the second rotor 2004, and the third rotor 2006 may be coupled individually or in groups of two or more to the central shaft 2012. In some implementations, a force may be applied to begin rotation of the central shaft 2012 may start-up by applying a voltage potential between the first rotor 2002 and the second rotor 2004 across the first constant gap 2008. In one implementation, optimum momentum transfer to the load may be provided at the intended operating rate by applying a voltage potential between the second rotor 2004 and the third rotor 2006 across the second constant gap 2010.

Figure 21A:
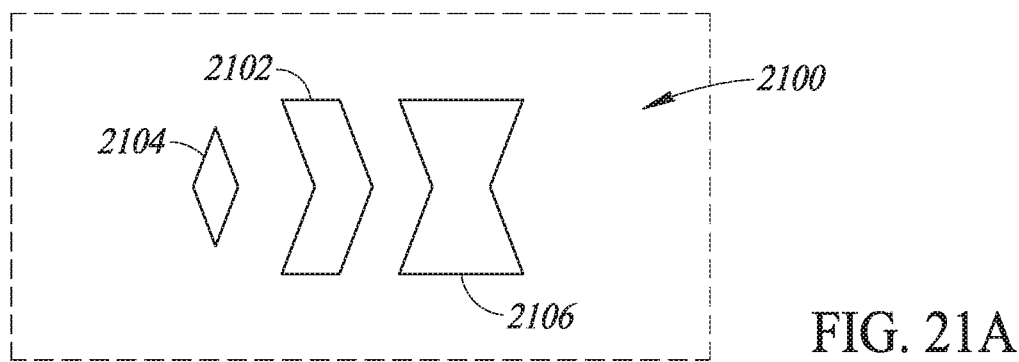
FIG. 21A is a side plan view of a hub motor assembly with one synchronizer located between a power storage coupler and a hub, according to at least one illustrated implementation.
Figure 21B:
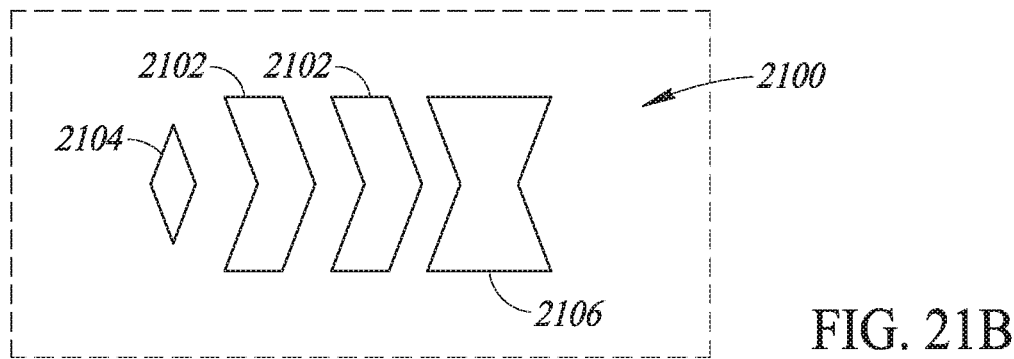
FIG. 21B is a side plan view of a hub motor assembly with two synchronizers located between a power storage coupler and a hub, according to at least one illustrated implementation.

FIGS. 21A and 21B show a hub motor assembly 2100 that includes one or more synchronizers 2102 between a power storage coupler 2104 and a hub 2106, in which the hub may include multiple gears. In such a configuration, the synchronizers 2102 may decouple the impact of changes in a rotation rate of the hub 2106 on the input power supply and provide the equivalent of gear ratio adjustments to the output power band. As such, the synchronizers 2102 may provide for differential rotation for the hub 2106 in which the hub 2106 may transfer energy via the power storage coupler 2104 through a range of rotational velocities. In some implementations, the synchronizers 2102 may provide for the isolation within the hub of low gears and/or high gears from the other gears located in the hub in which power may be applied to or from any gear section. In some implementations, the synchronizers 2102 may be used to store charge and/or angular momentum, and may allow for regenerative braking at a wide range of speeds because of elevated contact surface voltages. The ability to store angular momentum may result in between band smoothing when shifting between gears in the hub 2106, faster cycling times between gears, and smoother force transitions when releasing a gear.

Figure 22:
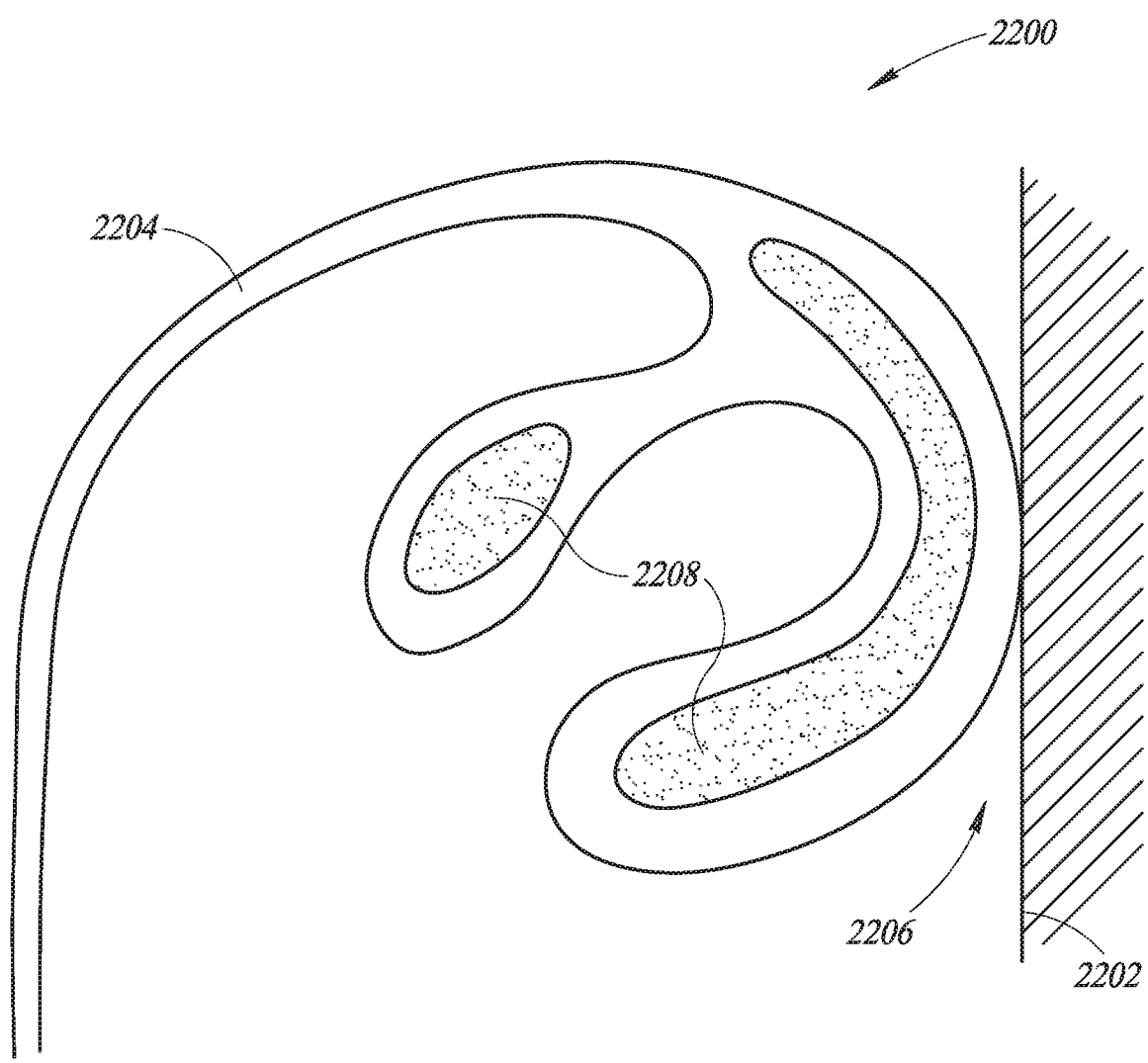
FIG. 22 is a cut-away plan view of a power feed, according to at least one illustrated implementation.

FIG. 22 shows a power feed 2200 that may be used to transfer power to and from the rotor to a high-voltage input 2202. In some implementations, the power feed 2200 may be included as part of the electrical connection 1418 (FIG. 14) and or as part of the elevated connections (e.g., neutral connector 1200 and/or the trailing connector 1202 in FIG. 12). The power feed 2200 may include a conductive layer 2204 that includes a rounded edge 2206 that makes contact with the high voltage input surface 2202. The round edge 2206 may cause the charge density for the power feed 2200 to be lower than the charge density for a power feed with a pointed or flat contact, correspondingly reducing the possibility that arcing may occur between the power feed 2200 and high voltage input surface 2202. The conductive layer 2204 may enclose one or more dielectric layers 2208. Such a structure may maintain static voltage on a portion of the conductive layer 2204 farthest from the high voltage input surface 2202. In some implementations, the power feed 2200 may include three layers in which a middle layer may be used to bleed off charge from the internal elements. In such an implementation, three or more power feeds 2200 may be used.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An electric machine, comprising:
 a first set of stator electrodes arrayed about an axis, each of the stator electrodes of the first set of stator electrodes having a respective profile when viewed along the axis, the respective profile of the stator electrodes of the first set of stator electrodes including an outer curved edge and an inner curved edge, the inner curved edge spaced radially inward of the outer curved edge with respect to the axis, the inner curved edge of the stator electrodes of the first set of stator electrodes having a respective length and a respective radius of curvature; and
 a first set of rotor electrodes arrayed about the axis and rotatable about the axis with respect to the stator electrodes of the first set of stator electrodes, each of the rotor electrodes of the first set of rotor electrodes having a respective profile when viewed along the axis, the respective profile of the rotor electrodes of the first set of rotor electrodes including an outer curved edge and an inner curved edge, the inner curved edge spaced radially inward of the outer curved edge with respect to the axis, and the inner curved edge of the rotor electrodes of the first set of rotor electrodes having a respective length and a respective radius of curvature, the respective radius of curvature of the inner curved edge of the rotor electrodes of the first set of rotor electrodes which continually varies with respect to the axis along at least a non-zero portion of the length of the inner curved edge thereof.

2. The electric machine of claim 1 wherein the respective radius of curvature of the inner curved edge of the stator electrodes of the first set of stator electrodes varies with respect to the axis along a non-zero portion of the length of the inner curved edge thereof.

3. The electric machine of claim 1 wherein the outer curved edge of the rotor electrodes of the first set of rotor electrodes have a respective length and a respective radius of curvature, the respective radius of curvature of the outer curved edge of the rotor electrodes of the first set of rotor electrodes is constant with respect to the axis along the length of the outer curved edge thereof.

4. The electric machine of claim 1 wherein, in profile, the outer curved edge of the rotor and the inner curve edge of the rotor meet at a point.

5. The electric machine of claim 4 wherein the rotor electrodes of the first set of rotor electrodes rotate about the axis in a first rotational direction, and the point at which the outer curved edge and the inner curve edge of the rotor electrodes of the first set of rotor electrodes meet is at a trailing portion of the rotor electrode with respect to the first rotational direction.

6. The electric machine of claim 5 wherein, in profile, the inner edge of each of the rotor electrodes of the first set of rotor electrodes include a singularity or point of inflection along a length thereof, has a constant radius of curvature to a first side of the singularity or point of inflection and a constantly varying radius of curvature to a second side of the singularity or point of inflection.

7. The electric machine of claim 6 wherein, in profile, each of the rotor electrodes of the first set of rotor electrodes include a leading edge, the leading edge which extends between the outer curved edge of the rotor and the inner curve edge of the rotor electrode at a leading portion of the rotor with respect to the first rotational direction.

8. The electric machine of claim 7 wherein the leading edge of each of the rotor electrodes of the first set of rotor electrodes is a curved edge as viewed in profile.

9. The electric machine of claim 3 wherein the outer curved edge of the stator electrodes of the first set of stator electrodes have a respective length and a respective radius of curvature, the respective radius of curvature of the outer curved edge of the stator electrodes of the first set of stator electrodes is constant with respect to the axis along the length of the outer curved edge thereof.

10. The electric machine of claim 1 wherein the outer curved edge of the stator electrodes of the first set of stator electrodes have a respective length and a respective radius of curvature, the respective radius of curvature of the outer curved edge of the stator electrodes of the first set of stator electrodes is constant with respect to the axis along the length of the outer curved edge thereof.

11. The electric machine of any of claim 10 wherein, in profile, the outer curved edge of the stator and the inner curve edge of the stator of the first set of stator electrodes meet at a point.

12. The electric machine of claim 11 wherein, in profile, the inner edge of each of the stator electrodes of the first set of stator electrodes include a singularity or point of inflection along a length thereof, has a constant radius of curvature to a first side of the singularity or point of inflection and a constantly varying radius of curvature to a second side of the singularity or point of inflection.

13. The electric machine of claim 12 wherein, in profile, each of the stator electrodes of the first set of stator electrodes include a connecting edge, the connecting which extends between the outer curved edge of the stator electrode and the inner curve edge of the stator electrode.

14. The electric machine of claim 12 wherein the inner edge of each of the stator electrodes of the first set of stator electrodes includes a plurality of points of inflection along the length thereof, the plurality of points of inflection divide the length of the inner edge of each stator electrode into a plurality of sections, and each of the plurality of sections has a different radius of curvature, at least one of which is constant.

15. The electric machine of claim 1 wherein the respective profile of each of the stator electrodes of the first set of stator electrodes matches the respective profile of each of the rotor electrodes of the first set of rotor electrodes.

16. The electric machine of claim 1, further comprising:
a first rotor disc, the rotor electrodes of the first set of rotor electrodes carried by the first rotor disc.

17. The electric machine of any of claim 16 wherein the first rotor disc has a first major face and a second major face, the second major face opposed across a thickness of the respective rotor disc from the first major face thereof.

18. The electric machine of claim 17, further comprising:
a first stator disc, the stator electrodes of the first set of stator electrodes carried by the first stator disc, wherein first stator disc has a first major face and a second major face, the second major face opposed across a thickness of the first stator disc from the first major face thereof, and at least one of the first or the second major faces of the first stator disc is parallel with at least one of the first or the second major faces of the first rotor disc.

19. The electric machine of claim 18 wherein the rotor electrodes of the first set of rotor electrodes are arrayed about the axis in a single plane.

20. The electric machine of claim 19 wherein the stator electrodes of the first set of stator electrodes are arrayed about the axis in a single plane that is parallel to, and laterally spaced from the single plane in which the rotor electrodes of the first set of rotor electrodes reside.

* * * * *